(12) United States Patent
Ohno et al.

(10) Patent No.: US 8,368,946 B2
(45) Date of Patent: Feb. 5, 2013

(54) IMAGING DEVICE, INFORMATION PROCESSING DEVICE, INFORMATION PROCESSING SYSTEM, RECORDING CONTROL METHOD THEREOF, AND PROGRAM FOR CAUSING A COMPUTER TO EXECUTE THE METHOD

(75) Inventors: Masayoshi Ohno, Tokyo (JP); Shigeru Kashiwagi, Tokyo (JP); Hideo Obata, Kanagawa (JP); Mitsuhiro Hirabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1490 days.

(21) Appl. No.: 11/936,341

(22) Filed: Nov. 7, 2007

(65) Prior Publication Data

US 2008/0151291 A1 Jun. 26, 2008

(30) Foreign Application Priority Data

Dec. 22, 2006 (JP) ................................. 2006-345958

(51) Int. Cl.
*G06K 15/00* (2006.01)
*H04N 5/225* (2006.01)
*G06F 7/00* (2006.01)

(52) U.S. Cl. ..................... 358/1.18; 348/207.2; 707/756

(58) Field of Classification Search ........................ None
See application file for complete search history.

(56) References Cited

FOREIGN PATENT DOCUMENTS
JP 2003-250124 9/2003
JP 2005-189982 7/2005

*Primary Examiner* — Marivelisse Santiago Cordero
*Assistant Examiner* — Mesfin Getaneh
(74) *Attorney, Agent, or Firm* — Oblon, Spivak, McClelland, Maier & Neustadt, L.L.P.

(57) ABSTRACT

An information processing system includes: an imaging device including a first recording medium recording a content file, and a management information storage unit storing management information for managing the content file in the first recording medium; an information processing device including a second recording medium recording a predetermined content file; and a control unit controlling so as to detect difference information relating to the storage state of the content file recorded in the first recording medium, based on the results of comparing present management information stored in the management information storage unit, with past management information which has been recorded before the present management information and is management information of the point-in-time at which the content file in the first recording medium was saved to the second recording medium, and record, in the second recording medium, the content file in the first recording medium, based on the detected difference information.

10 Claims, 43 Drawing Sheets

| FIG. 12A | FIG. 12B |

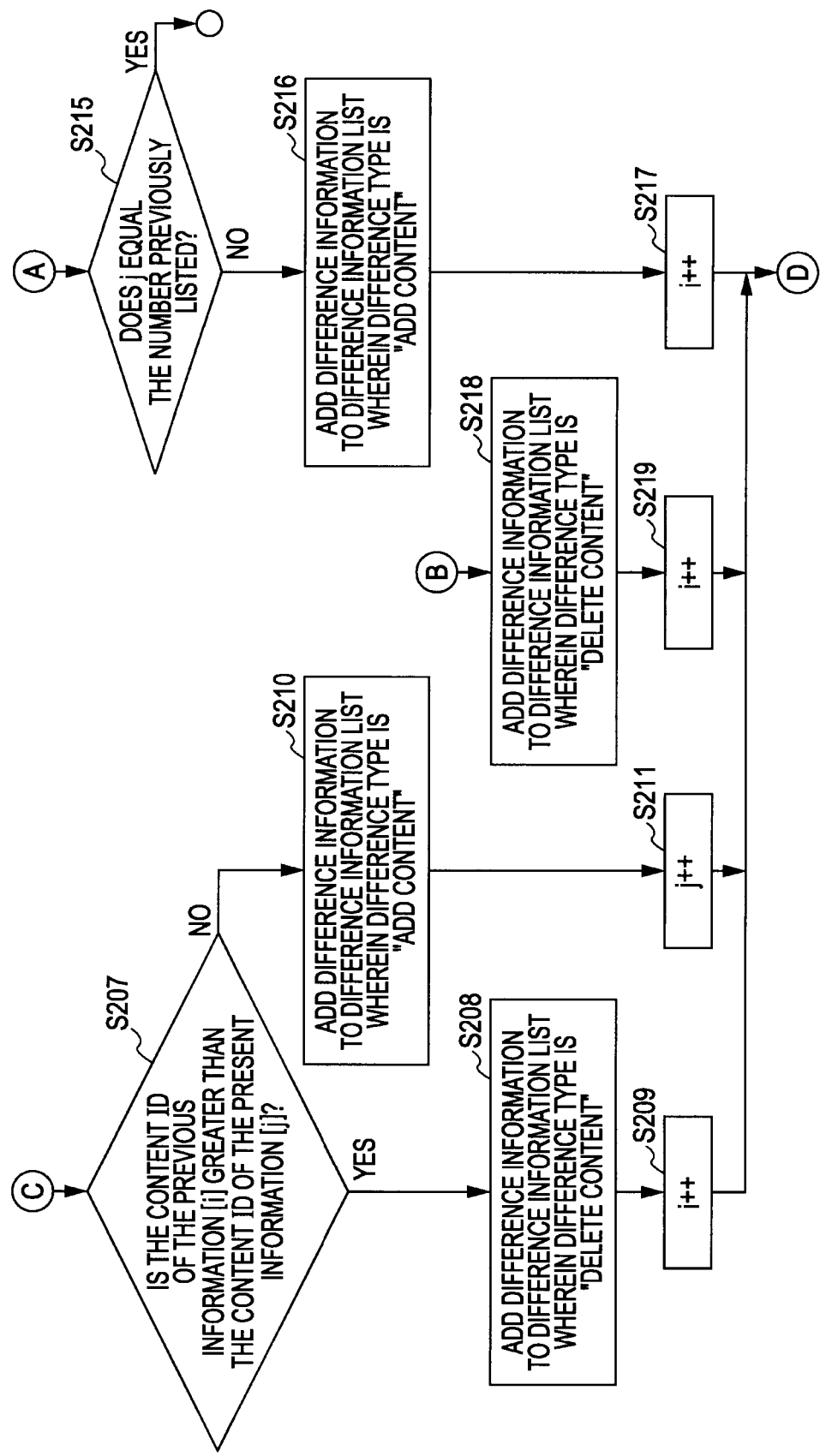

FIG. 32
(a)
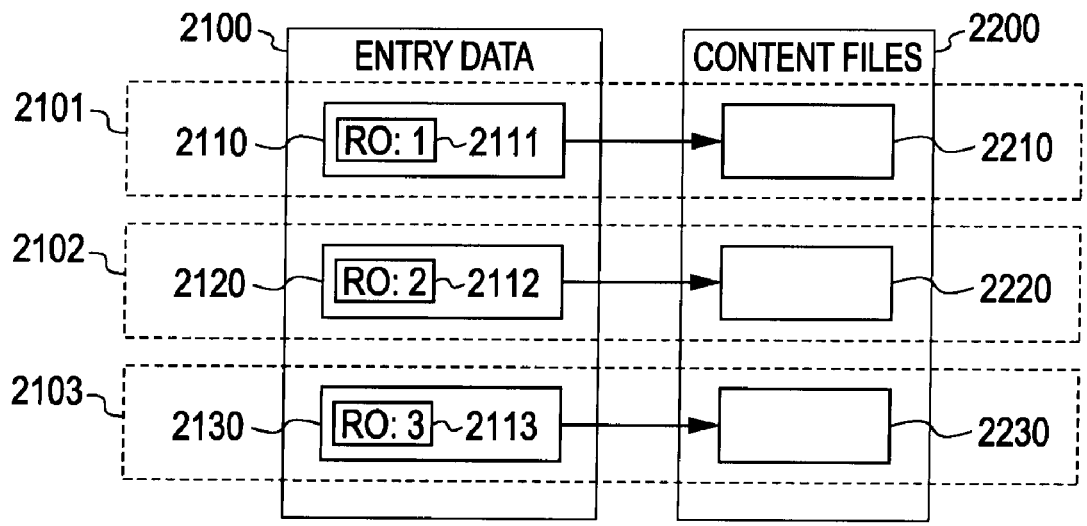
DIVIDE CONTENT B
(b)
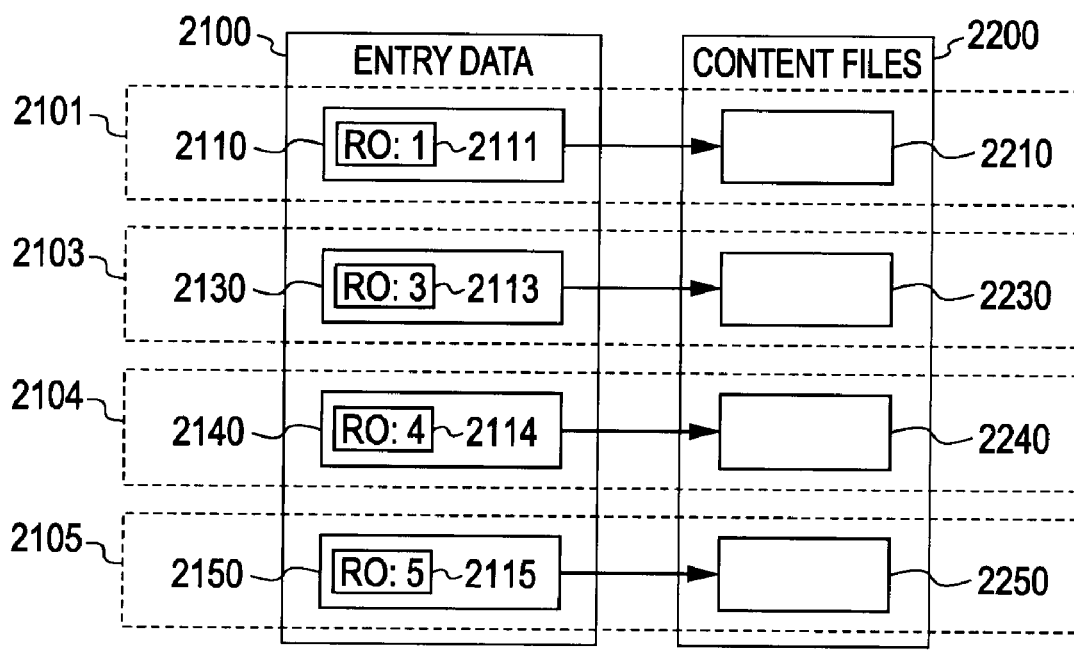

FIG. 33
(a)
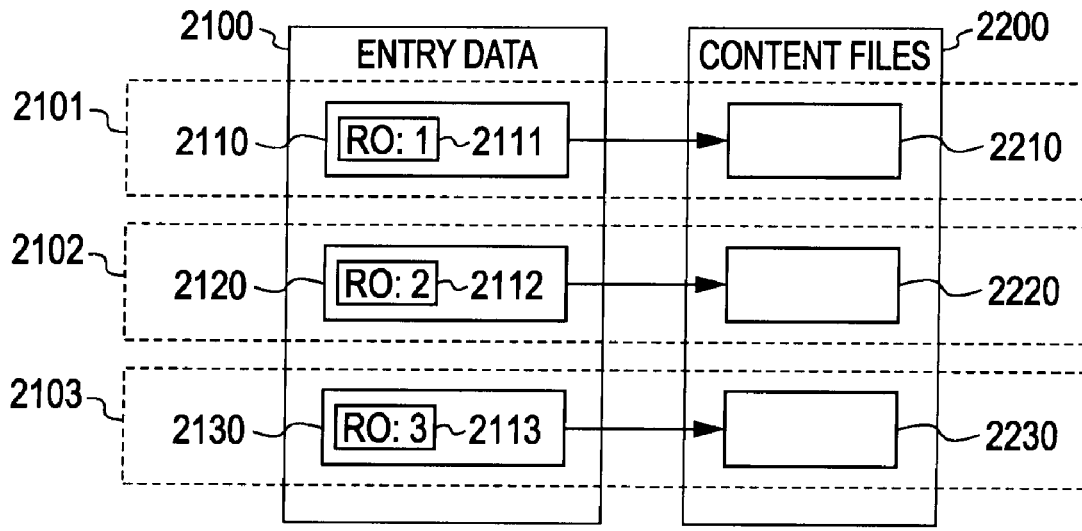
↓ DIVIDE CONTENT B
(b)
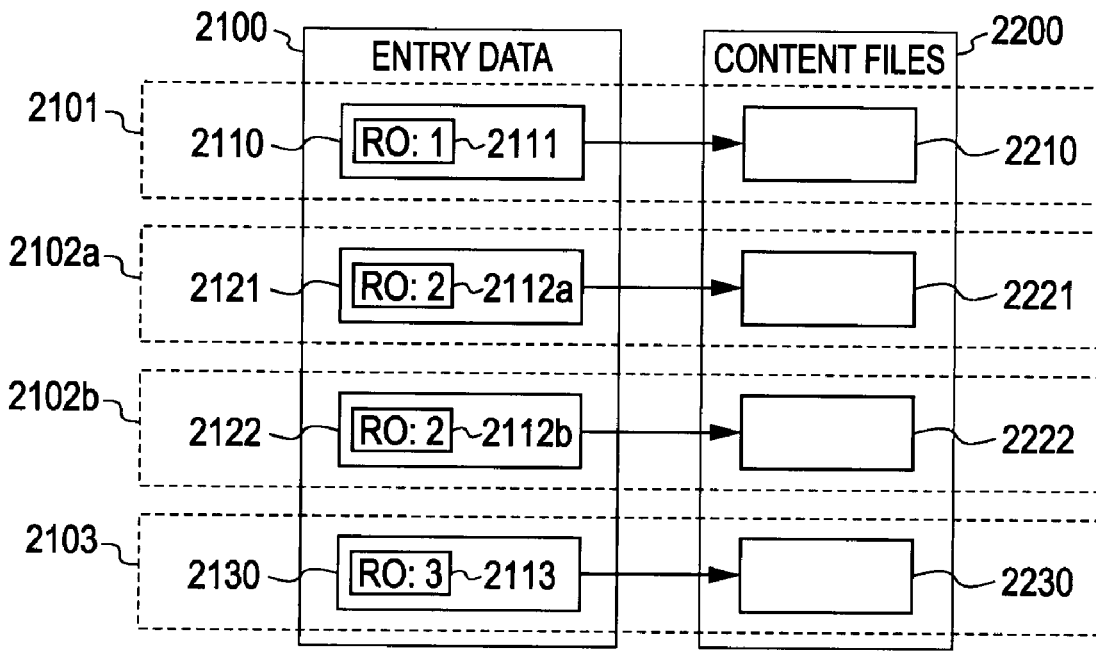

FIG. 35
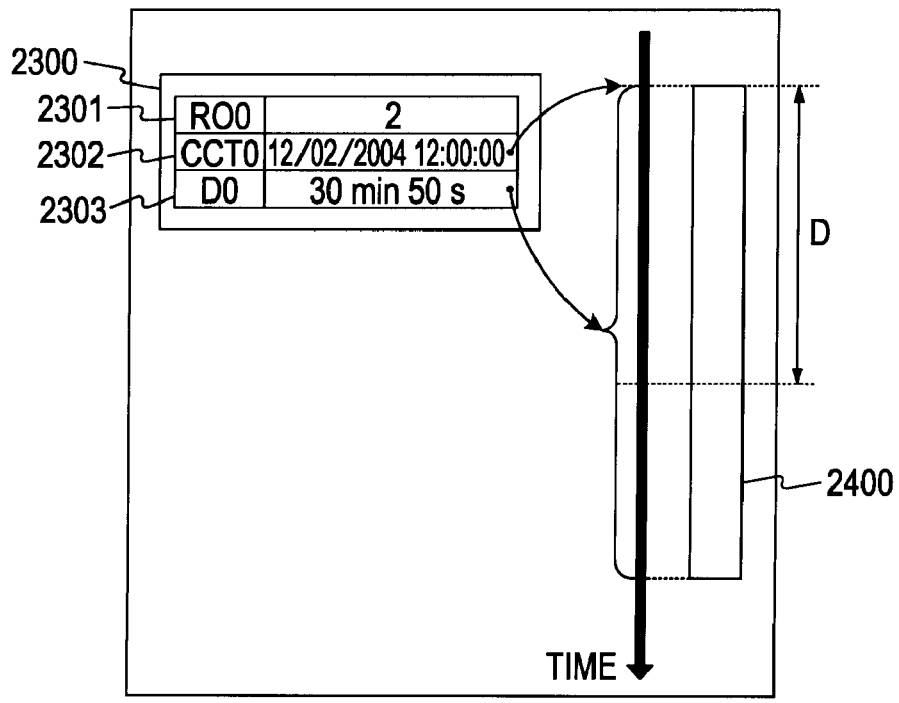
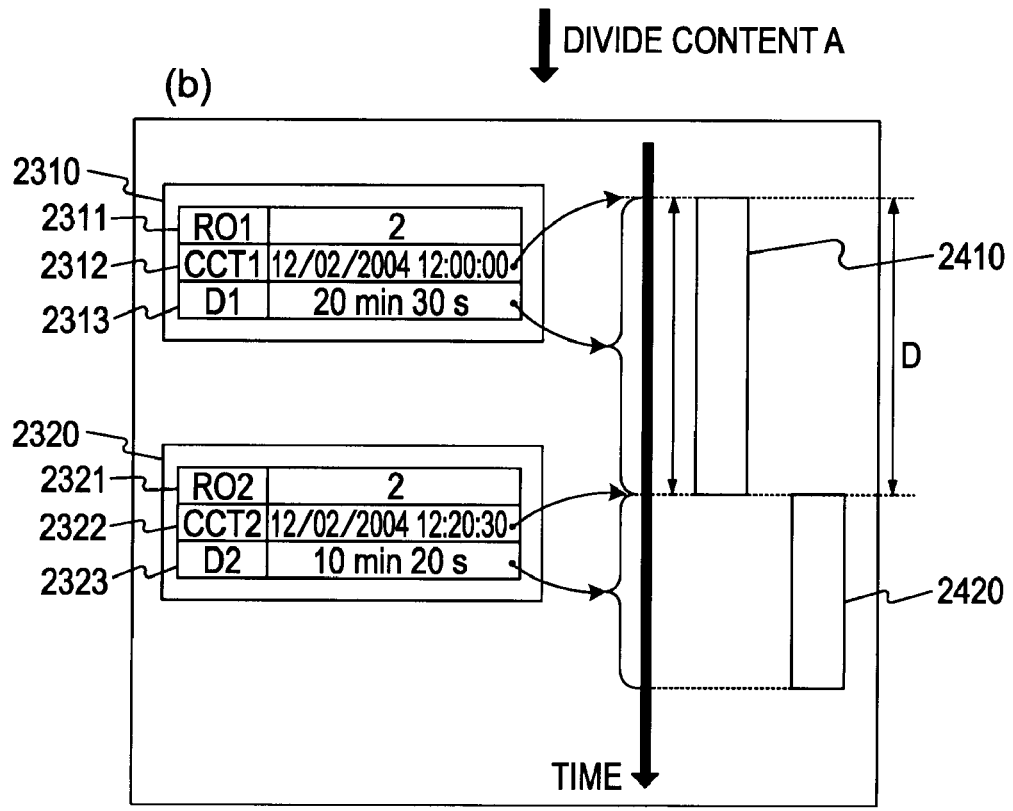

IMAGING DEVICE, INFORMATION PROCESSING DEVICE, INFORMATION PROCESSING SYSTEM, RECORDING CONTROL METHOD THEREOF, AND PROGRAM FOR CAUSING A COMPUTER TO EXECUTE THE METHOD

CROSS REFERENCES TO RELATED APPLICATIONS

The present invention contains subject matter related to Japanese Patent Application JP 2006-345958 filed in the Japanese Patent Office on Dec. 22, 2006, the entire contents of which are incorporated herein by reference.

BACKGROUND OF THE INVENTION

1. Field of the Invention

The present invention relates to an information processing device and a content saving method thereof which, with regard to a recording/playback device configured so as to manage content files recorded in a first recording medium with first management information, save in a predetermined second recording medium, content files recorded in the first recording medium, and also relates to a program to be executed by an information processing device.

2. Description of the Related Art

With a moving/still image recording/playback device such as a digital video camera for example, management of contents recorded in a recording medium heretofore has been performed by a file system such as the FAT (File Allocation Table) system, for example. It is widely known that the FAT file system is a file system configured to manage stored files with a tree directory structure. In this case, file management is realized by using directory entries and table information serving as a FAT.

On the other hand, in recent years, there has been an increase in the number of contents which can be recorded in a recording medium due to increased storage capacity of recording media, and also there has been demand for effectively managing much more related information than the content-related information which a file system has (such as file name information and so forth). Accordingly, arrangements have been implemented wherein, separate from the above-described management by file system, content management is performed using even more dedicated management information.

For example, at the time of playing moving images, there are cases wherein thumbnail images of content files are displayed as an index. Arrangements have been made wherein, in such cases, management information can include thumbnail images of the content files. This is an attempt to use the index display effectively by storing the thumbnail images in the management information side.

Using such dedicated management information can realize a management arrangement not available with general-purpose file systems, such as managing content files in folders sorted by predetermined criteria, such as in order of date-and-time of creation. An example of related background art is Japanese Unexamined Patent Application Publication No. 2004-227630.

SUMMARY OF THE INVENTION

Now, there are moving/still image recording/playback devices such as digital video cameras which are configured so as to be capable of being connected to external information processing devices (e.g., personal computers or the like) with an IEEE (the Institute of Electrical and Electronic Engineers) 1394 cable or USB (Universal Serial Bus) cable, such that contents such as moving images and still images recorded in the recording medium are uploaded to the information processing device side, allowing the contents to be backed up to a recording medium at the information processing device side.

However, with a back-up technique therein which simply overwrites the contents recorded in the recording medium of the recording/playback device side onto the recording medium of the information processing device side, all contents which are recorded in the recording medium of the recording/playback device side need to be copied, requiring a longer time for backing up.

Also, if we say that there is a back-up content group for a certain point-in-time at the information processing device side, and we want to perform restoration processing at the recording/playback device side such that the content storage state at that point-in-time is restored on the recording medium thereof, simply overwriting the contents recorded backed up at the information processing device side onto the recording medium of the recording/playback device side, all contents saved at the information processing device side need to be copied, requiring a longer time for copying.

Particularly, if we assume that moving image data will be recorded as the contents with a video camera, copying will take far longer time as compared with the case of recording other data such as still images or the like as the contents, making the above issue pronouncedly problematic.

An information processing system, a recording method thereof, and a program for causing a computer to execute the method, according to an embodiment of the present invention, includes: an imaging device including a first recording medium for recording a content file which is image data which has been imaged, and a management information storage unit for storing management information for managing the content file recorded in the first recording medium; an information processing device including a second recording medium for recording a predetermined content file; and a control unit for effecting control so as to detect, in a state in which the imaging device and the information processing device are capable of data communication, difference information relating to the storage state of the content file recorded in the first recording medium, based on the results of comparing present management information which is management information stored in the management information storage unit, with past management information which is management information which has been recorded before the present management information and which is management information of the point-in-time at which the content file recorded in the first recording medium was saved to the second recording medium, and record, in the second recording medium, the content file recorded in the first recording medium, based on the detected difference information. This yields an advantage in that the content file recorded in the first recording medium is recorded in the second recording medium, based on the difference information detected based on the result of comparing the present management information and the past management information.

An imaging device, a recording method thereof, and a program for causing a computer to execute the method, according to an embodiment of the present invention, includes: a first recording medium for recording a content file which is image data which has been imaged; a management information storage unit for storing first management information for managing the content file recorded in the first recording medium; and a communication unit for performing data communication with an information processing device including a second recording medium for recording a predetermined content file; wherein, in a state of being capable of data communication with the information processing device by the communication unit, the imaging device is controlled so as to detect difference information relating to the storage state of the content file recorded in the first recording medium, based on the results of comparing present first management information which is first management information stored in the management information storage unit, with past first management information which is first management information which has been recorded before the present first management information and which is first management information of the point-in-time at which the content file recorded in the first recording medium was saved to the second recording medium, and record, in the second recording medium, the content file recorded in the first recording medium, based on the detected difference information. This yields an advantage in that the content file recorded in the first recording medium is recorded in the second recording medium, based on the difference information detected based on the result of comparing the present first management information and the past first management information.

The first management information may be management information managed by a file identifier for uniquely identifying each of the content files recorded in the first recording medium; with the imaging device being controlled so as to detect, as the difference information, content files added to the first recording medium and content files deleted from the first recording medium during at least a period from a point-in-time at which the past first management information was obtained to a point in time at which the present first management information was obtained, based on the results of comparing the file identifier entered in the present first management information with the file identifier entered in the past first management information, record, in the second recording medium, content files added to the first recording medium, and delete, from the second recording medium, content files corresponding to content files deleted from the first recording medium. This yields an advantage in that, with regard to content files added to the first recording medium and content files deleted from the first recording medium, from a point-in-time at which the past first management information was obtained to a point in time at which the present first management information was obtained, detected based on the results of comparing the file identifier entered in the present first management information with the file identifier entered in the past first management information, the added content files are recorded to the second recording medium, and the content files corresponding to the deleted content files are deleted from the second recording medium, thereby synchronizing the content file storage states for the first recording medium and the second recording medium.

The first management information may be management information managed by the file identifier for uniquely identifying each of the content files recorded in the first recording medium; with, in the event that a predetermined instruction is performed, the imaging device being controlled so as to detect, as the difference information, content files added to the first recording medium and content files deleted from the first recording medium during at least a period from a point-in-time at which the past first management information was obtained to a point in time at which the present first management information was obtained, based on the results of comparing the file identifier entered in the present first management information with the file identifier entered in the past first management information, delete, from the first recording medium, content files added to the first recording medium, and record, in the first recording medium, content files recorded in the second recording medium corresponding to content files deleted from the first recording medium. This yields an advantage in that, with regard to content files added to the first recording medium and content files deleted from the first recording medium, from a point-in-time at which the past first management information was obtained to a point in time at which the present first management information was obtained, detected based on the results of comparing the file identifier entered in the present first management information with the file identifier entered in the past first management information, the added content files are deleted from the first recording medium, and the content files recorded in the second recording medium corresponding to the deleted content files are recorded to the first recording medium, thereby restoring a past content file storage state at the past first recording medium.

The first management information may be management information managed by a file identifier for uniquely identifying each of the content files recorded in the first recording medium; with wherein the imaging device being controlled so as to detect, as the difference information, content files added to the first recording medium during at least a period from a point-in-time at which the past first management information was obtained to a point in time at which the present first management information was obtained, based on the results of comparing the file identifier entered in the present first management information with the file identifier entered in the past first management information, and record, in the second recording medium, content files added to the first recording medium. This yields an advantage in that, with regard to content files added to the first recording medium from a point-in-time at which the past first management information was obtained to a point in time at which the present first management information was obtained, detected based on the results of comparing the file identifier entered in the present first management information with the file identifier entered in the past first management information, the added content files are recorded to the second recording medium, thereby saving all content files which have been the object of saving in the past, in the second recording medium.

The information processing device may further include a second management information storage unit for storing second management information which manages each content file recorded in the second recording medium as a synchronizing content file recorded synchronously with the first recording medium or as an all-content saving content file not recorded synchronously with the first recording medium, with the first management information being management information managed by a file identifier for uniquely identifying each of the content files recorded in the first recording medium; and the imaging device being controlled so as to detect, as the difference information, content files added to the first recording medium and content files deleted from the first recording medium during at least a period from a point-in-time at which the past first management information was obtained to a point in time at which the present first management information was obtained, based on the results of comparing the file identifier entered in the present first management information with the file identifier entered in the past first management information, record, in the second recording medium, content files added to the first recording medium, update the second management information such that the content files are managed as the synchronizing content files, and update the second management information such that the content files, recorded in the second recording medium corresponding to content files deleted from the first recording medium, are managed as the all-content saving files. This yields an advantage in that, with regard to content files added to the first recording medium and content files deleted from the first recording medium, from a point-in-time at which the past first management information was obtained to a point in time at which the present first management information was obtained, detected based on the results of comparing the file identifier entered in the present first management information with the file identifier entered in the past first management information, the added content files are recorded to the second recording medium and these content files are managed as synchronizing content files, and the content files recorded in the second recording medium corresponding to the deleted content files are managed as save-all-contents content files.

The imaging device may further include a recording point-in-time recording unit; with the first management information being management information managed by a file identifier for uniquely identifying each of the content files recorded in the first recording medium; and the imaging device being controlled so as to detect, as the difference information, content files added to the first recording medium and content files deleted from the first recording medium during at least a period from a point-in-time at which the past first management information was obtained to a point in time at which the present first management information was obtained, based on the results of comparing the file identifier entered in the present first management information with the file identifier entered in the past first management information, record, in the second recording medium, content files added to the first recording medium, and record, in the recording point-in-time recording unit, the present first management information, correlated with the recording point in time; wherein, in the event that a predetermined instruction is performed for selecting the recording point-in-time, the imaging device is controlled so as to detect, as the difference information, content files added to the first recording medium and content files deleted from the first recording medium during at least a period from the selected point-in-time to a point in time at which the present first management information was obtained, based on the results of comparing the file identifier entered in the present first management information with the file identifier entered in the past first management information recorded in the recording point-in-time recording unit correlated with the selected recording point-in-time, delete, from the first recording medium, content files added to the first recording medium, and record, in the first recording medium, content files recorded in the second recording medium corresponding to content files deleted from the first recording medium. This yields an advantage in that, with regard to content files added to the first recording medium and content files deleted from the first recording medium, from a point-in-time at which the past first management information was obtained to a point in time at which the present first management information was obtained, detected based on the results of comparing the file identifier entered in the present first management information with the file identifier entered in the past first management information, the added content files are recorded in the second recording medium and also the present first management information is recorded correlated to the recording point-of-time, and further, in the event that a predetermined instruction is performed for selecting the recording point-in-time, with regard to content files added to the first recording medium and content files deleted from the first recording medium from the selected point-in-time to a point in time at which the present first management information was obtained, detected based on the results of comparing the file identifier entered in the present first management information with the file identifier entered in the past first management information recorded in the recording point-in-time recording unit correlated with the selected recording point-in-time, the added content files are deleted from the first recording medium, and the content files recorded in the second recording medium corresponding to the deleted content files are recorded in the first recording medium, thereby restoring the past content file storage state at the first recording medium at the selected recording point-in-time.

The first management information may include a file identifier for uniquely identifying each of the content files recorded in the first recording medium, and also file-related information relating to these content files; with the imaging device being controlled so as to detect difference information relating to the storage state of the content files recorded in the first recording medium during at least a period from a point-in-time at which the past first management information was obtained to a point in time at which the present first management information was obtained, based on the results of comparing the file identifier and the file-related information entered in the present first management information with the file identifier and the file-related information entered in the past first management information. This yields an advantage in that difference information relating to the storage state of the content files recorded in the first recording medium from a point-in-time at which the past first management information was obtained to a point in time at which the present first management information was obtained can be detected, based on the results of comparing the file identifier and the file-related information entered in the present first management information with the file identifier and the file-related information entered in the past first management information.

An imaging device, a recording method thereof, and a program for causing a computer to execute the method, according to an embodiment of the present invention includes: a first recording medium for recording content files which are image data which has been imaged; a management information storage unit for storing recording order information which is management information for managing the content files recorded in the first recording medium, and which indicates the order in which the content files have been recorded in the first recording medium; and a communication unit for performing data communication with an information processing device including a second recording medium for recording predetermined content files, and a recording order information storage unit for storing the recording order information stored in the management information storage unit; wherein the imaging device is controlled so as to store, in the recording order information storage unit, last-recorded-order information, which is the last recording order information in recording order of the recording order information stored in the management information storage unit at the point-in-time of saving, in the event that the content files recorded in the first recording medium is saved in the second recording medium; detect, in a state in which data communication with the information processing device is enabled by the communication unit, difference information relating to the storage state of the content files recorded in the first recording medium, based on the results of comparing last-recorded-order information stored in the recording order information storage unit, with recording order information recorded in the management information storage unit, and record, in the second recording medium, the content files recorded in the first recording medium, based on the detected difference information. This yields an advantage in that in the event that the content files recorded in the first recording medium are saved in the second recording medium, last-recorded-order information at the point-in-time of saving is stored, and the content files recorded in the first recording medium based on the difference information relating to the storage state of the content files recorded in the first recording medium, detected based on the results of comparing the last-recorded-order information with recording order information, are saved in the second recording medium, thereby saving all content files which have been the object of saving in the past, in the second recording medium.

The imaging device may be controlled so as to detect, in a state in which the imaging device and the information processing device are capable of data communication by the communication unit, recording order information which is of a later recording order than the recording order of the last-recorded-order information, by comparing last-recorded-order information stored in the recording order information storage unit, with recording order information recorded in the management information storage unit, and record, in the second recording medium, the content files corresponding to the detected recording order information. This yields an advantage in that recording order information which is of a later recording order than the recording order of the last-recorded-order information is detected by comparing the last-recorded-order information with the recording order information, and the content files corresponding to the detected recording order information are recorded in the second recording medium.

An imaging device, a recording method thereof, and a program for causing a computer to execute the method, according to an embodiment of the present invention includes: a first recording medium for recording content files which are image data which has been imaged; a management information storage unit for storing recording section information which is management information for managing the content files recorded in the first recording medium, and which is information correlating the order and the date-and-time and recording time of recording the content files in the first recording medium; and a communication unit for performing data communication with an information processing device including a second recording medium for recording predetermined content files, and recording section information storage unit for storing the recording section information stored in the management information storage unit; wherein the imaging device is controlled so as to store, in the recording section information storage unit, last-recorded-section information, which is the last recording section information in order of the recording section information stored in the management information storage unit at the point-in-time of saving, in the second recording medium, the content files recorded in the first recording medium; detect, in a state in which data communication with the information processing device is enabled by the communication unit, difference information relating to the storage state of the content files recorded in the first recording medium, based on the results of comparing last-recorded-section information stored in the recording section information storage unit, with recording section information recorded in the management information storage unit, and record, in the second recording medium, the content files recorded in the first recording medium, based on the detected difference information. This yields an advantage in that last-recorded-section information at the point-in-time of saving the content files recorded in the first recording medium in the second recording medium is stored, and the content files recorded in the first recording medium are recorded in the second recording medium, based on the detected difference information relating to the storage state of the content files recorded in the first recording medium, based on the results of comparing the last-recorded-section information with recording section information, thereby saving all content files which have been the object of saving in the past, in the second recording medium.

The imaging device may be controlled so as to detect, in a state in which the imaging device and the information processing device are capable of data communication by the communication unit, recording section information which is of a later recording order than the order of the last-recorded-section information, by comparing last-recorded-section information stored in the recording order information storage unit, with recording section information recorded in the management information storage unit, and record, in the second recording medium, the content files corresponding to the detected recording section information. This yields an advantage in that the recording section information which is of a later recording order than the order of the last-recorded-section information is detected by comparing the last-recorded-section information with the recording section information, and the content files corresponding to the recording section information is recorded in the second recording medium.

An imaging device, a recording method thereof, and a program for causing a computer to execute the method, according to an embodiment of the present invention includes: a first recording medium for recording a content file which is image data which has been imaged; a management information storage unit for storing first management information for managing the content file recorded in the first recording medium; a communication unit for performing data communication with an information processing device including a second recording medium for recording a predetermined content file; and a control unit for performing control for saving, in the second recording medium, the content file recorded in the first recording medium; the control unit effecting control so as to, in a state of being capable of data communication with the information processing device by the communication unit, detect difference information relating to the storage state of the content file recorded in the first recording medium, based on the results of comparing present first management information which is first management information stored in the management information storage unit, with past first management information which is first management information which has been recorded before the present first management information and which is first management information of the point-in-time at which the content file recorded in the first recording medium was saved to the second recording medium, and record, in the second recording medium, the content file recorded in the first recording medium, based on the detected difference information. This yields an advantage in that content files recorded in the first recording medium are recorded in the second recording medium, based on the difference information detected based on the results of comparing the present first management information with the past first management information.

An information processing device, a recording method thereof, and a program for causing a computer to execute the method, according to an embodiment of the present invention includes: a communication unit for performing data communication with an imaging device including a first recording medium for recording a content file which is image data which has been imaged, and a management information storage unit for storing first management information for managing the content file recorded in the first recording medium; and a second recording medium for recording a predetermined content file; wherein the information processing device is controlled so as to obtain, in a state in which data communication is enabled with the imaging device, the first management information from the imaging device, by the communication unit, detect difference information relating to the storage state of the content file recorded in the first recording medium, based on the results of comparing present first management information which is the obtained first management information, with past first management information which is first management information which has been obtained before the present first management information and which is first management information of the point-in-time at which the content file recorded in the first recording medium was saved to the second recording medium, and record, in the second recording medium, the content file recorded in the first recording medium, based on the detected difference information. This yields an advantage in that the content files recorded in the first recording medium are recorded in the second recording medium, based on the difference information detected based on the results of comparing the present first management information with the past first management information.

An information processing device, a recording method thereof, and a program for causing a computer to execute the method, according to an embodiment of the present invention includes: a communication unit for performing data communication with an imaging device including a first recording medium for recording a content file which is image data which has been imaged, and a management information storage unit for storing first management information for managing the content file recorded in the first recording medium; a second recording medium for recording a predetermined content file; and a control unit for performing control for saving, in the second recording medium, the content file recorded in the first recording medium; wherein the control unit effects control so as to obtain, in a state in which data communication is enabled with the imaging device, the first management information from the imaging device, by the communication unit, detect difference information relating to the storage state of the content file recorded in the first recording medium, based on the results of comparing present first management information which is the obtained first management information, with past first management information which is first management information which has been obtained before the present first management information and which is first management information of the point-in-time at which the content file recorded in the first recording medium was saved to the second recording medium, and record, in the second recording medium, the content file recorded in the first recording medium, based on the detected difference information. This yields an advantage in that the content files recorded in the first recording medium are recorded in the second recording medium, based on the difference information detected based on the results of comparing present first management information with past first management information.

According to the above-described arrangements, difference information regarding the present/past content storage states can be detected from the results of comparing present/past first management information, and transfer and recording control can be performed for content files to be added to the second recording medium from the first recording medium, based on this difference information.

Thus, in the event that a content file has been newly added to the first recording medium at the imaging device side, just the content file of the added portion detected as difference information can be transferred and recorded to the second recording medium, thereby speeding up the back-up process as compared to overwrite copying of all content files recorded in the first recording medium onto the second recording medium, for example.

Also, difference information is detected comparing management information one with another, so time required for detecting the difference information can be reduced, thereby speeding up the back-up process in this way as well.

BRIEF DESCRIPTION OF THE DRAWINGS

FIG. 32 is a schematic drawing illustrating the relation between index files and content files stored in an HDD 14;

FIG. 33 is a schematic drawing illustrating the relation between index files and content files stored in the HDD 14;

FIG. 35 is a drawing schematically illustrating updating of entry data at the time of division processing;

DESCRIPTION OF THE PREFERRED EMBODIMENTS

Now, the present invention will be described by way of preferred embodiments. Description will proceed in the order laid forth below.

1. First Embodiment
1-1. Overview of Back-up System
1-2. Configuration of Recording/Playback Device
1-3. Configuration of Information Processing Device
1-4. File Managing Mode with Recording Playback Device
1-5. Back-up Processing as First Embodiment
1-6. Processing Operation
2. Second Embodiment
2-1. Back-up Processing as Second Embodiment
2-2. Processing Operation
3. Third Embodiment
3-1. Back-up Processing as Third Embodiment
3-2. Processing Operation
4. Fourth Embodiment
4-1. Back-up Processing as Fourth Embodiment
4-2. Processing Operation
5. Fifth Embodiment
5-1. Back-up Processing as Fifth Embodiment
5-2. Processing Operation
6. Sixth Embodiment
6-1. Back-up Processing as Sixth Embodiment
6-2. Processing Operation
7. Seventh Embodiment
7-1. Back-up Processing as Seventh Embodiment
7-2. Processing Operation
8. Modifications

First Embodiment 1-1. Overview of Back-up System

Figure 1:
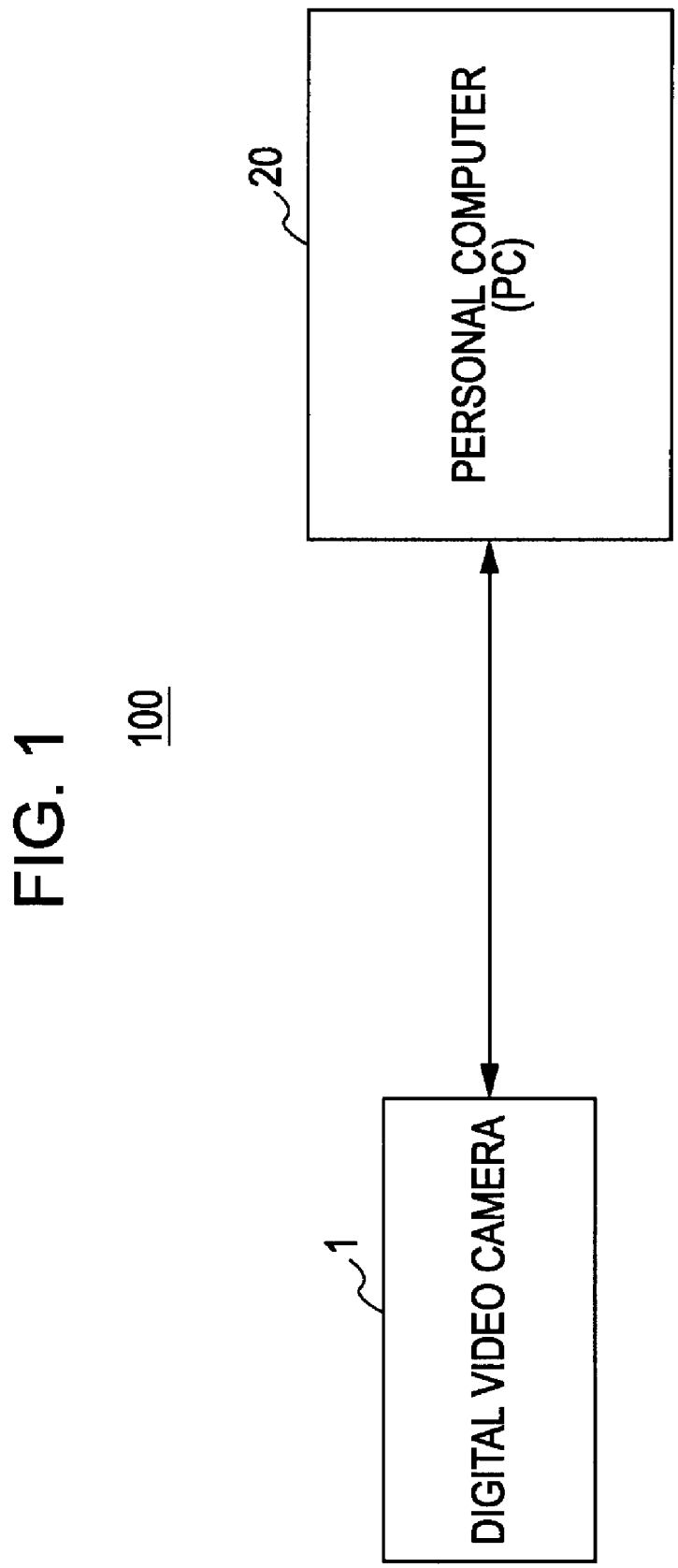
FIG. 1 is a drawing for describing the overview of a back-up system including an information processing device and a recording/playback device, according to an embodiment of the present invention.

FIG. 1 is a drawing to describe an overview of a back-up system 100 as an embodiment of the present invention.

First, the back-up system 100 of the present embodiment is configured to include a digital video camera 1 and personal computer (may be simply called PC) 20, as shown in the drawing. The digital video camera 1 is a recording/playback device serving as an embodiment of the present invention, and the personal computer 20 is an information processing device serving as an embodiment of the present invention.

In this case, the digital video camera 1 is configured such that at least imaging of moving images and recording of the imaged moving images on a necessary recording medium can be performed. In this case, the digital video camera 1 has a HDD (Hard Disk Drive) 14 built in, and imaged moving image data is recorded as to the HDD 14.

The digital video camera 1 of the present example is configured so as to be connected to the personal computer 20 side with a USB (Universal Serial Bus) cable or the like, thereby enabling data communication with the personal computer 20 side.

The personal computer 20 has a dedicated application program installed therein which corresponds to the digital video camera 1, and back-up processing of a content file to be described later or decoding processing and so forth can be realized with this application program. For example, the personal computer 20 has a relatively large capacity HDD 30 of approximately several hundred GB (gigabytes), for example, and the HDD 30 is the back-up destination of the content file recorded on the digital video camera 1 side.

1-2. Configuration of Recording/Playback Device

Figure 2:
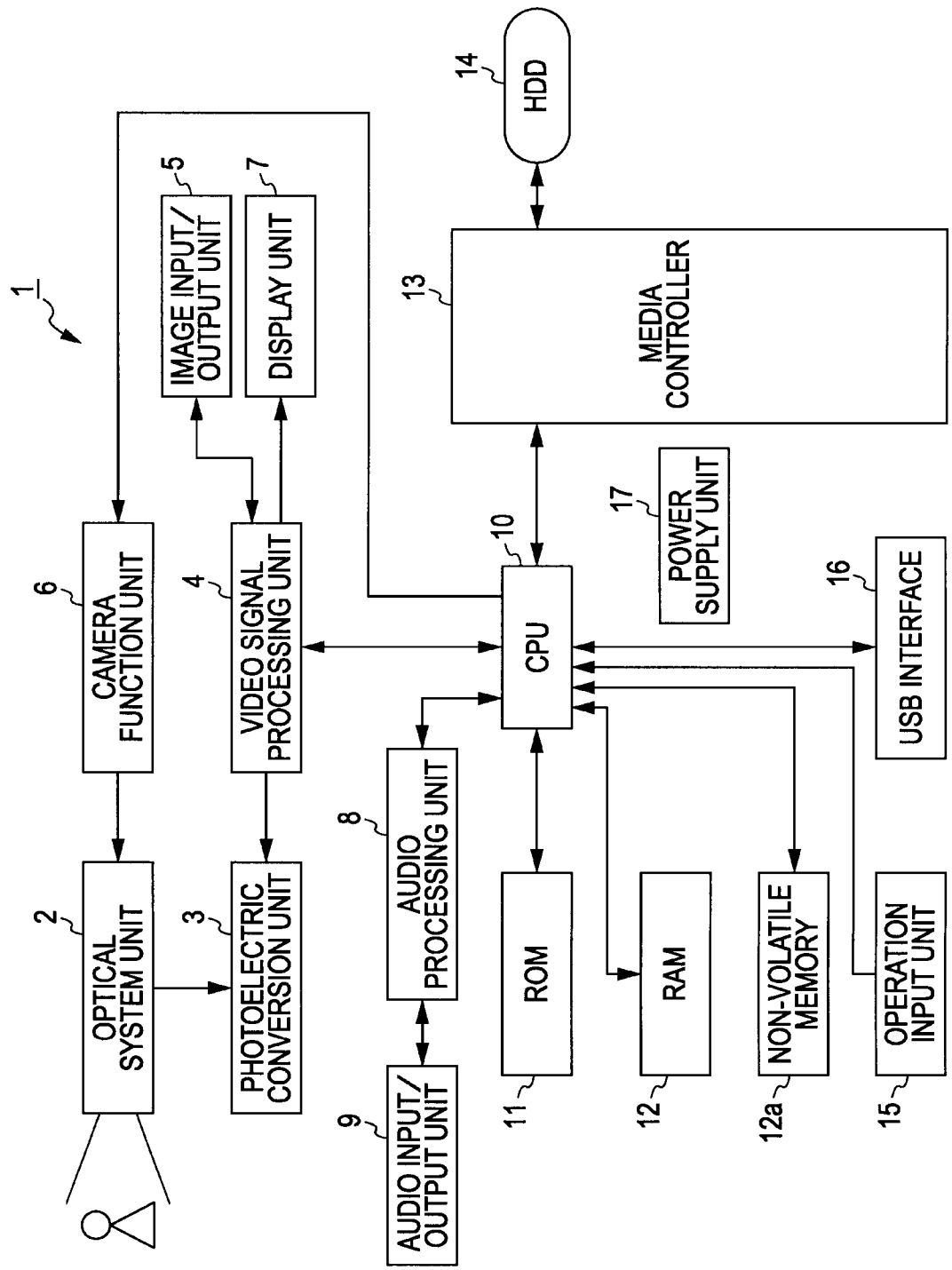
FIG. 2 is a block drawing illustrating the configuration of a recording/playback device according to an embodiment of the present invention.

FIG. 2 shows the internal configuration of the digital video camera 1 shown in FIG. 1. In FIG. 2, first an optical system unit 2 is made up of an imaging lens, aperture and so forth, and forms an image with a photoelectric converting unit 3 with the incident light as imaging light. Also the optical system unit 2 may be arranged to include a focus adjusting mechanism to adjust the focus or an aperture changeable mechanism which can change the aperture according to the aperture value. Driving such a mechanism unit is performed with a driving signal output from a camera function unit 6. The camera function unit 6 is arranged to output a necessary driving signal according to control by a CPU (Central Processing Unit) 10 so that the appropriate focus state or aperture state can be obtained.

Also, in the case of providing an optical zoom function, for example, a zoom mechanism to move the zoom lens is provided in the optical system unit 2, while also providing a driving unit to drive the zoom mechanism according to control of the CPU 10, as with the description above. Further, an arrangement may be made to provide a strobe, to provide a strobe light emitting mechanism in the camera function unit 6.

The photoelectric converting unit 3 is configured to have a CCD (Charge Coupled Device) which is a photoelectric converting element for example, and subject the image capturing light, which is incident from the optical system unit 2 to form an image at a light-receiving face, to photoelectric conversion, thereby generating an imaging signal to output to a video signal processing unit 4. At the time of imaging, for example, instructions for shutter speed which is determined according to an exposure-setting result is notified from the CPU 10 to the video signal processing unit 4. With the video signal processing unit 4, a scanning timing signal corresponding to the notified shutter speed is output to the photoelectric converting unit 3. The photoelectric converting unit 3 is arranged to perform scanning according to the scanning timing signal, and executes photoelectric converting processing to output an image signal.

The video signal processing unit 4 performs waveform shaping by subjecting an analog video signal (imaged image signal) input from the photoelectric converting unit 3 to gain adjusting, sample hold processing, and so forth, for example, following which the video signal processing unit 4 performs A/D converting, thereby converting to a video signal serving as digital data. Subsequently, video signal processing for the purpose of performing display on a display unit 7, such as generating processing of display luminance data, for example, is executed on the digital vide signals obtained by the conversion processing. Along with this, the video signal processing unit 4 is arranged such that signal processing for so-called onscreen display can be executed so that character images can be displayed so as to overlap with the imaged images, in accordance with the control of the CPU 10. The actual display device to be employed as the display unit 7 is not particularly limited, but currently, liquid crystal display panels are widely used.

Also, the video signal processing unit 4 is arranged such that compression encoding processing is performed as to a digital video signal obtained by converting the analog video signal input from the photoelectric converting unit 3, whereby compressed video data can be generated.

Also, the digital video camera 1 according to the present embodiment also has a digital still camera function. That is to say, an imaged image signal can generate a still image data file with a predetermined format of a photograph, such imaging processing also being performed by the video signal processing unit 4.

Also, the video signal processing unit 4 is arranged to convert an image (picture) signal input from the photoelectric converting unit 3 or an AV data file (AV file) read out from an HDD 14 to be described later to an analog video signal or digital video signal with a predetermined method, which can be output to an external device or the like via an image input/output unit 5.

The image input/output unit 5 is arranged such that a video signal with a predetermined method is input externally, whereby the input video signal is displayed on the display unit 7 following processing at the video signal processing unit 4. Also, the video signal processing unit 4 can also convert the video signal input by the image input/output unit 5 into recording data, as with the analog video signal input from the photoelectric converting unit 3, and can transfer this to a media controller 13.

The image input/output unit 5 correspondingly provides a picture (image) signal output terminal/picture signal input terminal according to a predetermined method, for example.

Also, with the digital video camera 1 according to the present embodiment, input/output of an audio signal can also be performed by providing an audio processing unit 8 and audio input/output unit 9.

First, regarding audio input, a microphone or the like is provided as the audio input/output unit 9, whereby external audio is collected and converted to an audio signal to input audio. The audio signal thus input is then output to the audio processing unit 8. The audio processing unit 8 performs audio signal processing such as converting the audio to compressed audio data encoded with an audio compression encoding method corresponding to compression encoding of an imaged image.

The CPU 10 may be arranged to execute control processing for forming an AV file with a predetermined format with the compressed video data for the imaged image obtained from the video signal processing unit 4 and the compression audio data for the collected audio obtained from the audio processing unit 8. This AV file is arranged such that the audio playback time axis wherein the compressed audio data is played back and output is synchronized as to the moving image wherein the compressed video data is played back and output. Note that the configuration to actually create the AV file may be a software configuration which is digital signal processing obtained by the CPU 10 executing a program, or alternatively may be a configuration wherein hardware to create the AV file is provided and the CPU 10 controls the operation of the hardware.

The data serving as the AV file as described above is transferred to the media controller 13 by control of the CPU 10, for example. Also, the CPU 10 can also transfer a still image data file in a predetermined format as a photograph image generated by the video signal processing unit 4 to the media controller 13 as recorded data.

The audio input/output unit 9 may be configured so as to have an audio signal input terminal or the like and input an audio signal from an external device or the like. The audio processing unit 8 converts the audio signal input from the above-mentioned audio signal input terminal to a digital audio data file of a predetermined format. The CPU 10 can also transfer the data of such a digital audio data file to the media controller 13 as recording data.

The media controller 13 is configured such that control processing relating to data processing as to the HDD 14 can be executed by coordination with the CPU 10. The data processing as to the HDD 14 mentioned here refers to some sort of processing relating to data to be stored in media, such as formatting processing of media (i.e. hard disk in this case), reading/writing processing of information for files as to the media storage region and file management (file management information).

The media controller 13 responds to the recording data transferred thereto, as described above, by further transferring the recording data as to the HDD 14. At the HDD 14 to which the data is transferred, the data is written and stored as to a storage region according to instructions from the media controller 13 side. Thus the data stored in the HDD 14 is stored and managed as a file. Note that the file management mode stored in the HDD 14 will be described later.

Also, for example, as playback of the file stored in the HDD 14, if an AV file is played back, the CPU 10 and media controller 13 accesses the specified AV file and reads this. The AV file thus read is separated into compressed video data and compressed audio data by processing of the CPU 10 for example, the compressed video data is transferred to the video signal processing unit 4 and the compressed audio signal is transferred to the audio signal processing unit 8.

The video signal processing unit 4 and audio processing unit 8 in this case each execute necessary playback signal processing including demodulation processing for the compressed video data and compressed audio data, respectively, which is transferred as described above. Thus, the image from the compressed video data played back is displayed on the display unit 7, and synchronized to the playback time of the image, the audio signal obtained by playing back the compressed audio data is output as audio from a speaker serving as an audio input/output unit 9 which is assumed to exist, or output from a headphone terminal.

Also, the audio data file played back from the HDD 14, for example, is subjected to audio signal processing by the audio processing unit 8, following which may be output as an audio signal and audio data with a predetermined format externally, via the audio input/output unit 9. In this case, the audio input/output unit 9 has an audio output terminal corresponding to the predetermined audio signal and audio data format output from the audio processing unit 8.

The CPU 10 executes various types of control processing of the digital video camera 1 by executing a program. A ROM 11 has stored therein various types of programs which the CPU 10 executes, as well as various types for setting information employed for the CPU 10 to execute processing. A RAM 12 is employed as a work region when the CPU 10 executes processing in accordance with the programs, and has held therein data such as various types of computing processing results.

Also, nonvolatile memory 12a is made up of a memory device with a feature wherein storage content is not lost even if the power supply stops, such as flash memory for example, and executes data reading/writing according to control by the CPU 10. The data (information) to be stored in the nonvolatile memory 12a is generally setting information wherein changes to appropriate content is made, but is not limited to this in particular, and can be any memory wherein various types of necessary information is stored according to the status of an actual digital video camera 1.

The operating input unit 15 provides the user with various types of operators at one place, which are provided to the digital video camera 1. For example, an operator with the operation input unit 15 may include a shutter button to operated at time of photographing a photograph, an operator for instructing the recording/stopping of moving images at time of moving image photographing, an operator for selecting the mode of photographing, an operator for performing parameter up/down, and so forth.

A USB interface 16 is made up of an external device with a communication method in accordance with USB data bus standards, and in particular in the case of the present example is configured with hardware and software for performing data communication with a personal computer 20, under control of the CPU 10.

Note that the data communication method between the digital video camera 1 and personal computer 20 is not limited to that which is in accordance with USB standards, and further, is not particularly limited to cables or wireless. For example, with a cabled system, examples of data bus standards may be a network such as Ethernet (registered trademark) or IEEE (the Institute of Electrical and Electronic Engineers) 1394. Also, with a wireless system, examples may be intra-device close range wireless communication such as Bluetooth (registered trademark) or wireless LAN (Local Area Network) standards such as IEEE 802.11a/b/g.

A power source unit 17 supplies an operation power source as to various types of hardware devices with the digital video camera 1, and is configured to have a power source circuit which operates by receiving power supply from a battery or power adaptor, for example.

Note that hereafter for simplification of description, the AV file (including an audio data file) and still image data file generated with the digital video camera 1 will be collectively called "content file Fct".

1-3. Configuration of Information Processing Device

Figure 3:
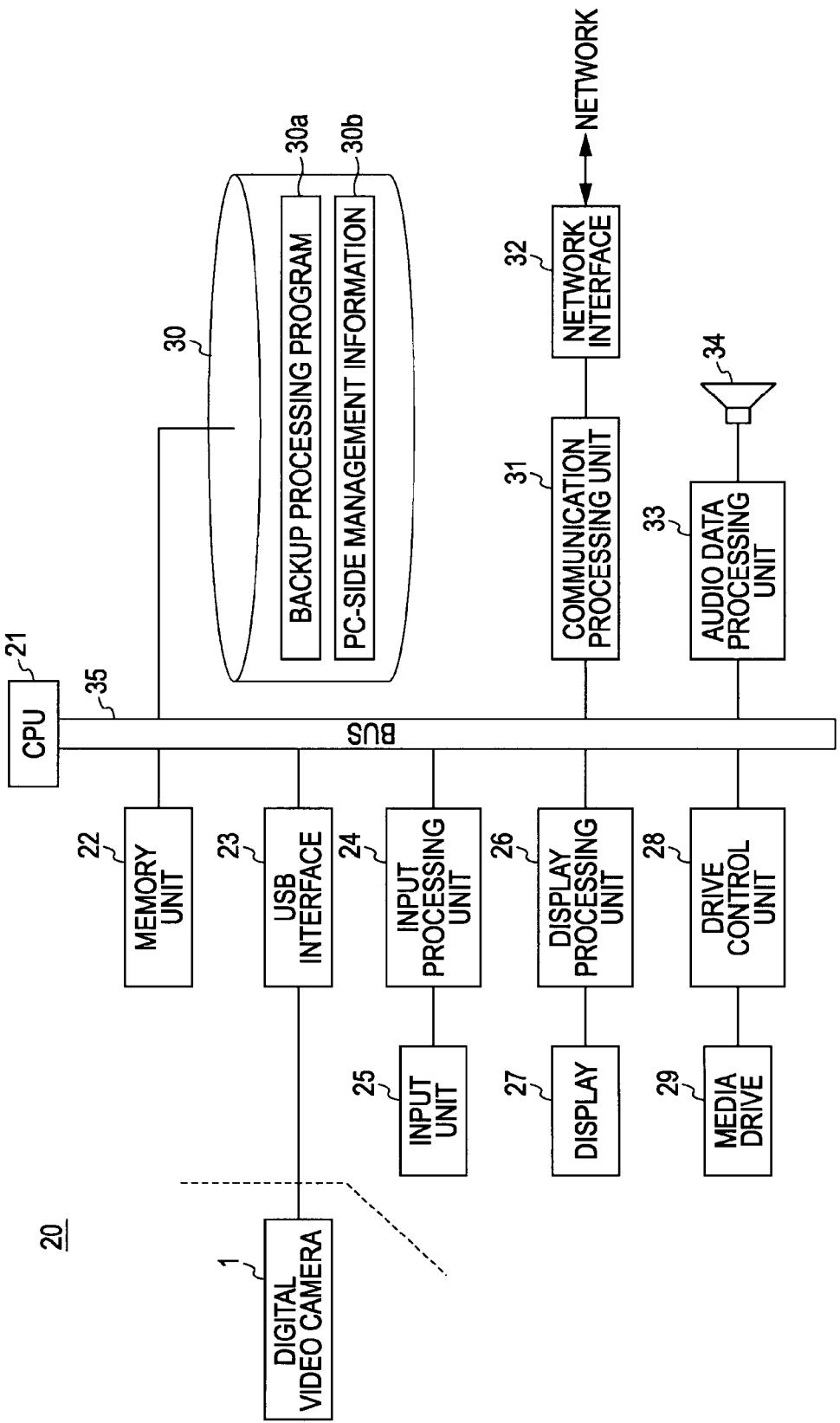
FIG. 3 is a block drawing illustrating the configuration of an information processing device according to an embodiment of the present invention.

FIG. 3 shows the internal configuration of the personal computer 20 shown in FIG. 1. In FIG. 3, first a CPU 21 performs control of the entire personal computer 20 based on an activated program, and computing processing thereof. For example, the CPU 21 performs input/output operations as to a user, and storage of a data file or creating/updating of managing information to an HDD 30.

In this case, the managing of the various types of data files in the HDD 30 is performed by a FAT (File Allocation Table) file system. Note that the CPU 21 is arranged to perform control signal and data exchange between various parts via the bus 35 shown in the drawing.

The memory unit 22 is shown comprehensively as RAM, ROM, flash memory and the like which the CPU 21 employs for processing.

The ROM in the memory unit 22 stores an operating program, program loader, and so forth for the CPU 21. Also, the flash memory in the memory unit 22 stores various types of computing coefficients, parameters employed for the program, and so forth.

Further, the RAM in the memory unit 22 temporarily captures a data region and task region for the program to be executed.

A USB interface 23 is provided to perform data communication between external devices connected via a USB cable. As described above, various types of data such as the content file Fct is transmitted between the digital video camera 1 shown in FIG. 2, via the USB interface 23 in this case in particular.

With the HDD 30, data file storage and creating/updating of managing information is performed based on control by the CPU 21, as described above. For example, the content file Fct uploaded from the digital video camera 1 shown in FIG. 2 is stored in the HDD 30.

Also, a program for realizing various types of operations is also stored as to the HDD 30.

Particularly, in the case of the present embodiment, a back-up processing program 30a necessary for the CPU 21 to perform various types of back-up processing, to be described later, is stored in the HDD 30.

This back-up processing program 30a is a portion of the application program for performing management of the digital video camera 1 which is connected via the USB interface 23. That is to say, the various types of back-up processing described with the present embodiment each have one function assigned of the functions which the application has for managing the digital video camera 1.

Also, a PC-side managing information 30b for managing the backed-up content file Fct is stored in the HDD 30. Note that in the case of the present embodiment, the PC-side managing information 30b is equivalent to the "second managing information".

An input unit 25 is a keyboard, mouse, remote commander, or other input device not shown which is provided to the personal computer 20, whereby the user performs various types of operation input or data input. The information input with the input unit 25 is subjected to predetermined processing at the input processing unit 24, and is transmitted as an operation or data input as to the CPU 21. The CPU 21 performs necessary computations and controls corresponding to the input information.

A media drive 29 is a driving mechanism unit corresponding to necessary recording media, such as a CD (Compact Disc), MD (Mini Disc: magneto-optical disc), CD-R (Recordable), CD-RW (ReWritable), DVD (Digital Versatile Disc), DVD-R, DVD-RW, memory card (semiconductor memory device), and so forth, and is configured such that recording/playback operations as to these media can be performed. For example, in the case of corresponding to media which is disk media such as a CD system or DVD system, the media drive 29 is arranged to be provided with, for example, an optical head, spindle motor, playback signal processing unit, servo circuit, and so forth.

The drive control unit 28 controls recording playback operations, access operations, and so forth as to the media mounted to the media drive 29. For example, in the case that a user performs playback operation as to the mounted media via the input unit 25, the CPU 21 instructs the drive control unit 28 to play back the media. The drive control unit 28 then performs control for executing access operations or playback operations as to the media drive 29. With the media drive 29, the read out playback data is transmitted to the bus 35 via the drive control unit 28.

An audio data processing unit 33 performs sound field processing of the input audio data such as equalizing or processing such as volume adjusting, D/A converting, amplifying, and so forth, and outputs this via the speaker unit 34.

For example, in the event that audio data is played back with the media drive 29, or in the event that audio data is played back regarding the content file Fct stored in the HDD 30, upon the audio data being processed in the audio data processing unit 33, the audio data is output via the speaker unit 34.

A display 27 is a display device such as an LCD (Liquid Crystal Display) or the like, and performs various types of information display as to the user.

For example, upon the CPU 21 supplying displaying information to the display processing unit 26 according to various types of operation status, input status, or communication status, the display processing unit 26 drives the display 27 based on display data and executes the display operation.

Also, in the case that moving image data from the media mounted to the media drive 29 as described above or from the content file Fct stored in the HDD 30 is played back, the display processing unit 26 performs signal processing of the playback data, and performs image (picture) display by driving the display 27 based on the signals thus obtained.

The communication processing unit 31 performs encoding processing of the transmission data and decoding processing of the receiving data, based on the control by the CPU 21.

A network interface 32 transmits the transmission data encoded with the above-mentioned communication processing unit 31 to a predetermined device via a necessary network such as the Internet. Also, the network interface 32 receives the data transmitted from external devices via the above-mentioned network to the communication processing unit 31. The communication processing unit 31 transfers the received data to the CPU 21.

1-4. File Managing Mode with Recording Playback Device

The digital video camera 1 serving as the present embodiment shown in FIG. 2 is arranged to be able to store the content file Fct, serving as the AV file obtained primarily by imaging/sound-collecting, to the HDD 14.

The file to be stored in the HDD 14 is normally to be managed by a file system with a predetermined format, but with the present embodiment, the file is managed by a FAT file system, as with the PC 20 side. The FAT file system manages a file with a widely-known tree-type directory arrangement, and the reading/writing of data is performed by a logically minimum data management increments of clusters. One unit of a cluster is made up of a predetermined number of sectors which is the minimum physical unit within media for reading/writing data.

Figure 4:
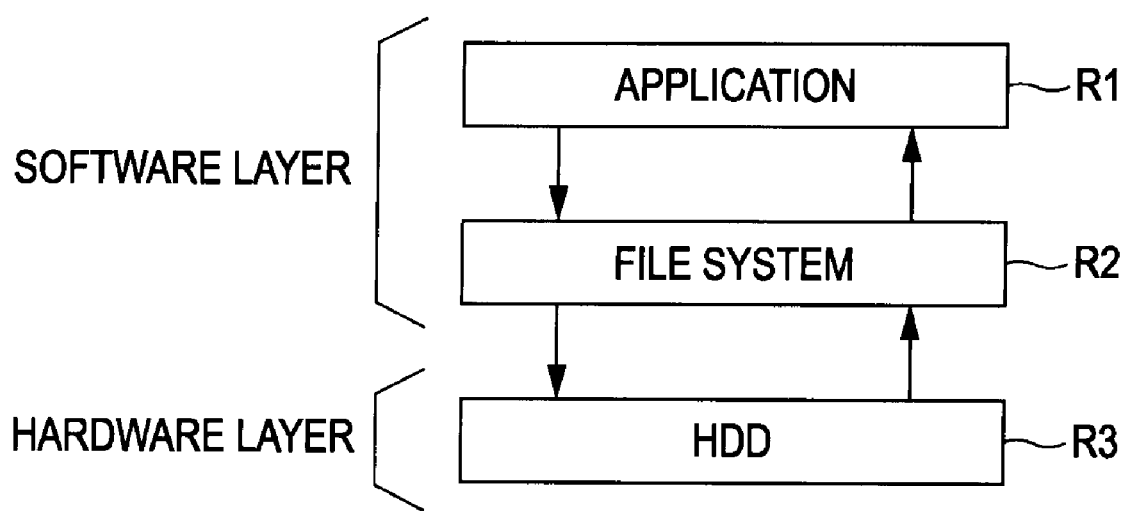
FIG. 4 is a drawing illustrating a common system configuration of a FAT file system, by way of a hierarchical model.

FIG. 4 shows the system configuration of a general FAT file system with a hierarchy model.

First, this hierarchy model is largely divided into a software layer and a hardware layer thereunder. The software layer is arranged to correspond to the software processing which is realized by a program executed by the CPU (CPU 10) serving as a host side as to the media, and various types of firmware, middleware, and so forth. With the software layer in this case, layers of an application R1 and file system R2 are positioned from the upper layer towards the lower layer, as shown in the drawing. With the hardware layer, a physical storage region for the media itself may be positioned therein.

The application R1 has a file recording/playback function, for example, and corresponds to application software employing a media R3, and performs an access request at the file level as to the file system R2.

The file system R2 corresponds to the software which realizes a function serving as a file system. With the present embodiment, the FAT file system is employed, so the software providing the function for the file system R2 is configured corresponding to the FAT file system.

The file system R2 performs access request to the media R3 in accordance with the access request from the application R1.

The media R3 is logically formatted (initialized) in accordance with the FAT file system. In FIG. 2 the HDD 14 is equivalent to the media R3. The media R3 then responds to the access request from the file system R2, reads data from the specified address, and returns this to the file system R2. That is to say, the media R3 executes access response.

The file system R2 performs receiving of the data serving as an access response from the media R3, and transmits this received data to the application R1. The application R1 executes required processing at the application level according to operation input and the like by a user, for example.

Also, the FAT file system manages the stored file with a tree-type directory configuration, and also manages the files as a collection with a unit of clusters. Such file management and data management is executed by providing directory entries and table information serving as FAT (managing information), as is widely known. The directory entry is information showing the location of the files and directories (sub-directories) in the media R3 with cluster levels, wherein the FAT is information showing a chain (link, coupling) at the cluster level forming directories and files.

Figure 5:
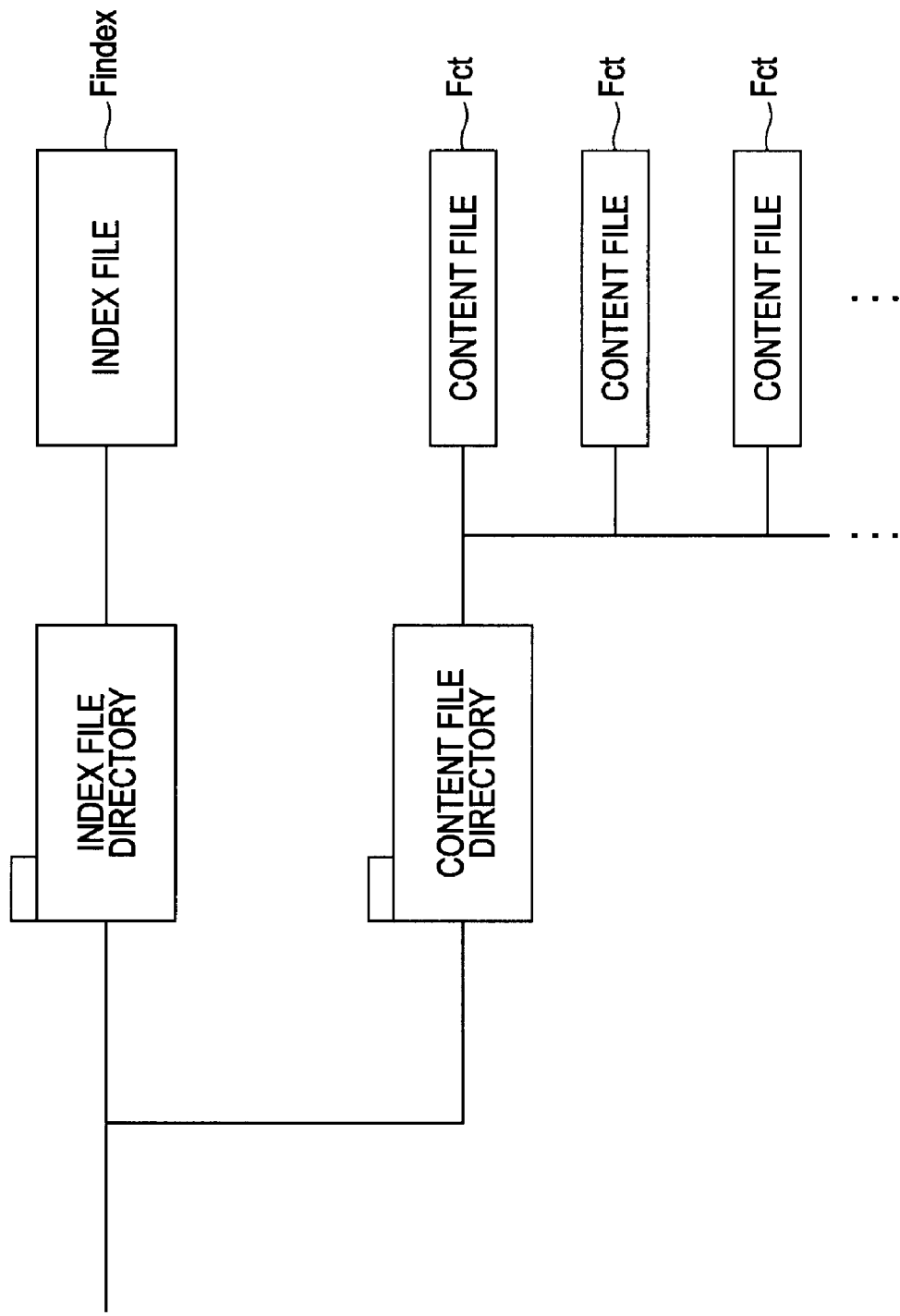
FIG. 5 is a drawing illustrating a management form for files in a recording medium managed by a FAT file system, illustrated by way of directory structure.

FIG. 5 shows the management mode of the data file stored in the HDD 14 serving as the media R3, which is managed with the FAT, with a directory configuration.

First, as for a directory, at least two directories of an index file directory and content file directory as shown in the drawing exist. The content file Fct is stored under the content file directory. An index file Findex for managing the content file is stored under the index file directory, separate from the FAT. The index file Findex thus stored under the index file directory is managing information for specializing in and effectively managing the content serving as still images or moving images in this case.

Performing management employing dedicated management information which is specialized for the content file Fct, separate from the FAT file system, is necessitated due to the number of recordable content having increased in accordance with increased storage capacity of storage media in recent years, and much more related information than the content related information, such as file name, date-and-time of updating, and so forth, held by the file system, being efficiently managed, as mentioned earlier.

For example, there is a situation wherein a thumbnail image of each AV file is subjected to index display at the time of moving image playback, but if this is dedicated management information, an arrangement may be made for management information wherein a thumbnail of each AV file can be nested to correspond thereto beforehand. That is to say, by storing the thumbnail image thus in the management information side, the above index display can be effectively performed.

Alternatively, by separately employing the management information specialized for the content file management, the various content files can be divided in a predetermined manner such as the sequence of create date-and-time, sorted into folders, and thus managed.

By separately performing management employing dedicated management information, a management mode can be realized which has not existed in a general-use file system.

A file management mode with the digital video camera 1 of the present example employing the index file Findex serving as such dedicated management information will be described with reference to the next FIG. 6.

Figure 6:
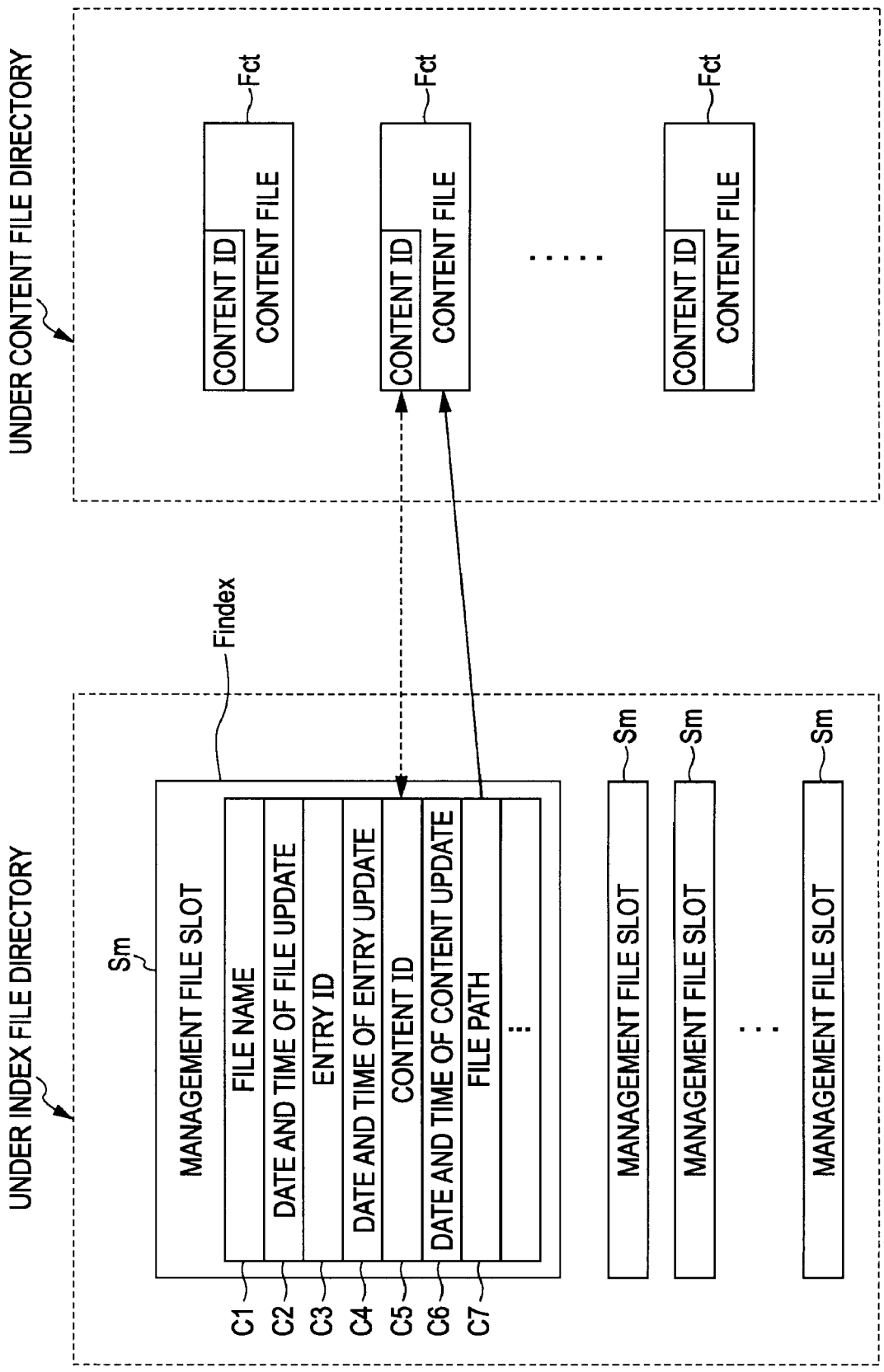
FIG. 6 is a drawing for describing a file management form according to management information (first management information) of an embodiment.

In FIG. 6, the index file Findex is stored under the index file directory, as shown earlier in FIG. 5. The index file Findex is formed so as to store multiple management file slots Sm shown in the drawing.

The internal configuration of each management file slot Sm is made up of a file name C1, file update date-and-time C2, entry ID C3, entry update date-and-time C4, content ID C5, content update date-and-time C6, file path C7, and so forth. Note that the data to be entered in each management file slot Sm will hereafter be called "entry data".

The above-mentioned file name C1 stores the file name information of the content file Fct associated to the management file slot Sm.

Also, the file update date-and-time C2 shows the date-and-time that the content file Fct itself associated to the management file slot Sm has been created/updated.

Also, the entry ID C3 is identification information for uniquely identifying entry data to the management file slot Sm, whereby new entry data is entered in the management file slot Sm in accordance with a new content file Fct being generated.

The entry update date-and-time C4 shows the date-and-time that the entry data has been entered, or the date-and-time that an update has been made, into the management file slot Sm. If the entry data is not updated, the entry update date-and-time C4 is information which is not changed even if the content of the content file Fct is updated. An example of the entry update date-and-time being updated includes a case wherein, for example, metadata (unshown) to be corresponded to the content file Fct is updated.

The content ID C5 stores a content ID of the content file Fct associated to the management file slot Sm (i.e. associated to the entry ID C3). The content ID of each content file Fct is assigned so as to enable uniquely identifying each content file Fct. The content ID can be generated with a combination of the file path information showing the location of the content file and the file generating date-and-time. This content ID is equivalent to a so-called file identifier with the present invention.

Also, the content update date-and-time C6 shows the date-and-time of the content file Fct being created/updated. The difference between the content update date-and-time C6 and the file update date-and-time C2 mentioned above is that when the content file Fct is reproduced or moved the file update date-and-time C2 is updated, but the information content of the content update date-and-time C4 does not change.

Also, the file path C7 has path information stored for the content file Fct associated to the management file slot Sm. That is to say, in this case, the information showing the location of the content file Fct under the FAT file system is stored.

New entry data is added to the management file slot Sm with the index file Findex in response to a content file Fct being generated on the HDD 14 by the file system R2. With the added entry data, information is stored showing the location of the generated content file Fct under the FAT file system management as the file path C7. Thus, correlation of the management file slot Sm and the content file Fct generated under the content file directory is performed.

Also, as shown with the broken-line arrow in the drawing, the content ID C5 can also specify the content file Fct generated under the content file directory.

1-5. Back-up Processing as First Embodiment

With the present embodiment, an arrangement is made to back up the content file Fct such as the moving images or still images recorded on the HDD 14 of the digital video camera 1 side onto the HDD 30 on the PC 20 side, with the configuration of the digital video camera 1 and personal computer 20 (PC 20) described up to now.

However, for such a back-up, if the content file Fct recorded in the HDD 14 on the digital video camera 1 side is simply copied over without change to the HDD 30 on the PC 20 side, all of the content file Fct recorded in the HDD 14 on the digital video camera 1 side must be subjected to copy processing, whereby the time required for such amount of back-up becomes longer.

In particular, in the case of the digital video camera 1 of the present example, the content file Fct is primarily moving image data (AV data), so in that case, compared to a case wherein the other data such as still image data or the like is recorded as content file Fct, a longer time is required for copy processing.

With the present embodiment, the management information showing the file management state on the HDD 14 held by the digital video camera 1 (index file Findex: first management information) and the management information subjected to back-up in the past on the PC 20 side (index file Findex) are compared, the difference information between the present and past file storage states are detected, and a back-up is performed for the content file Fct based on this difference information.

First, with the first embodiment, synchronized processing is performed for such back-up processing, which synchronizes the file storage state in the HDD 14 and the file storage state in the HDD 30.

Figure 7:
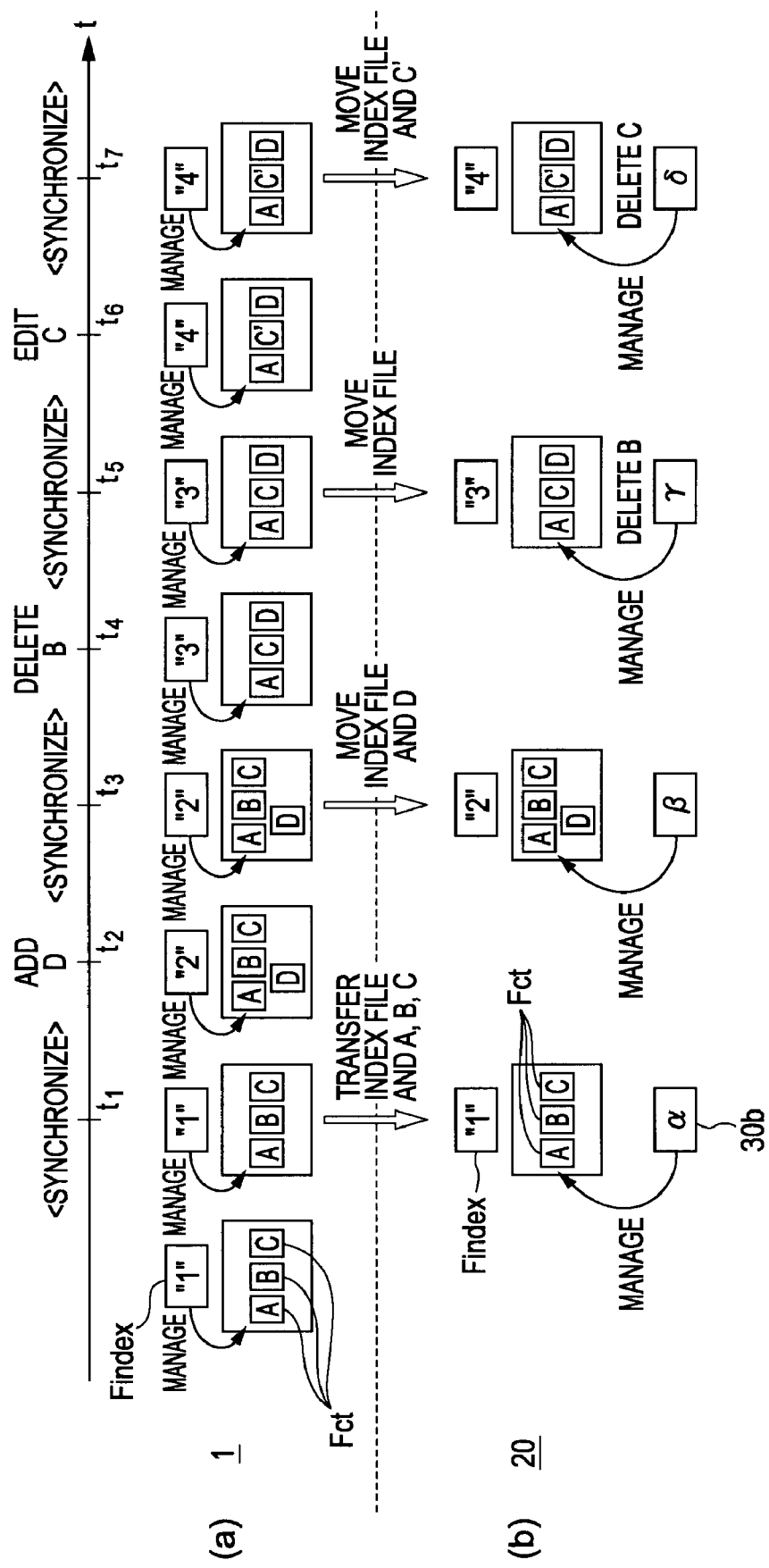
FIG. 7 is a drawing schematically illustrating back-up processing (synchronizing) according to a first embodiment.

FIG. 7 is a schematic drawing showing the synchronizing processing serving as the back-up processing for the first embodiment, wherein (a) in FIG. 7 illustrates the status transition along the time axis t of the index file Findex and content file Fct recorded in the HDD 14 of the digital video camera 1, and (b) in FIG. 7 similarly illustrates the status transition along the time axis t of the index file Findex, the content file Fct, and the PC-side management information 30b recorded in the HDD 30 of the personal computer 20.

In FIG. 7, let us say that first on the digital video camera 1 side shown in (a) in FIG. 7, "A", "B", and "C" are recorded as content files Fct as shown, serving as an initialized state, and the index file Findex having the content of "1" according to the storage state is recorded.

At the point-in-time t1, the digital video camera 1 and personal computer 20 are connected via a USB cable so as to be capable of data communication, and the first synchronizing processing is performed.

An application is automatically started on the PC 20 side in accordance with the connection made so as to be capable of data communication. For example, a user operates a mouse of the input unit 25 to click a predetermined icon on the screen and so forth, whereby synchronization instructions are given to the PC 20, and synchronizing processing is started according to the synchronization instructions.

Alternatively, in the case of performing synchronizing processing as with the first embodiment, an arrangement may be made wherein the application is automatically started in accordance with a connection made with the digital video camera 1 side so as to be capable of data communication, following which synchronizing processing is automatically performed.

Description will be continued below with the synchronizing processing performed to as to the former, i.e. according to the synchronization instructions.

At the first synchronizing point-in-time of the point-in-time t1, the HDD 30 on the PC 20 side is in a state wherein the content file Fct on the digital video camera 1 side is not backed up. With the PC 20, the fact that a backed-up content file Fct does not exist in the HDD 30 can be detected by whether or not there is a back-up of the index file Findex. That is to say, if synchronizing processing is performed, as will be described again later, the HDD 30 is in a state with the index file Findex having been saved therein.

On the PC 20 side, in accordance with the content file Fct not existing on the HDD 30, a transfer request is performed to the digital video camera 1 side so as to transfer all of the content files Fct ("A", "B", and "C") on the HDD 14 of the digital video camera 1 side and the index file Findex ("1") to manage the content files Fct on the HDD 14. The transferred files are then saved in the HDD 30.

Thus the file storage state on the HDD 14 and the file storage state on the HDD 30 are synchronized.

Following this, the content of the PC-side management information 30b is updated in order to manage the content file Fct on the HDD 30 at the PC 20 side. That is to say, the content is updated to content for managing wherein the content files "A", "B", and "C" are stored in the HDD 30 ("α" in the drawing). The file management by the PC-side management information 30b can be performed with the content ID attached to the content file Fct.

Next, let us say that, at a point-in-time t2 which is after the first synchronizing processing at the point-in-time t1, new moving images are photographed/recorded at the digital video camera 1 side, for example, whereby "D" is generated as a new content file Fct on the HDD 14, as shown in (a) in FIG. 7. Let us also say that in accordance therewith, the index file Findex is also updated from the previous content of "1" to that which has the content "2" according to "D" being added thereto.

By adding the content file Fct ("D") at the point-in-time t2, the file storage state in the HDD 14 and the file storage state in the HDD 30 are different, as can be seen by comparing (a) in FIG. 7 and (b) in FIG. 7.

At the following point-in-time t3, let us say that the digital video camera 1 and PC 20 are connected again, whereby synchronization instructions are performed.

In the case that there is a backed-up content file Fct in the HDD 30 of the PC 20 side already as with the point-in-time t3, in accordance with the above-mentioned synchronization instructions, the content of the index file Findex ("1") held by the PC 20 side itself and the index file Findex ("2") held by the digital video camera 1 side are compared, whereby the difference in storage states of the content files Fct on the PC 20 side and the digital video camera 1 side is detected. That is to say, in this case detection can be made that the content file "D" which does on exist in the PC 20 side is stored in the digital video camera 1 side, and the existence of the content file "D" at the digital video camera 1 side is detected as difference information.

Subsequently, back-up processing is performed, based on the difference information herein. That is to say, this case is for synchronizing processing, so the PC 20 performs a transfer request for only the content file "D" indicated by the difference information, and saves the transferred content file "D' to the HDD 30. Additionally, the PC 20 performs a transfer request for the index file Findex ("2") held by the digital video camera 1 for the purpose of the next synchronizing processing, and saves this in the HDD 30.

Further, the information content of the PC-side management information 30b is updated so as to manage that wherein the content file "D" has been added (update from "α" to "β").

Following synchronizing processing a the point-in-time t3, at the next point-in-time t4, let us say that the content file "B" is deleted at the digital video camera 1 side shown in (a) in FIG. 7, and the index file Findex is updated to the information content "3" in accordance with deleting the "B". That is to say, instead of the storage state of the content file Fct on the digital video camera 1 side being "A", "C", "D" and the information content of the index file Findex being "3", the storage state on the PC 20 side is at "A", "B", "C", "D" while the information content index file Findex remains at "2".

At the next point-in-time t5, let us say that the digital video camera 1 and PC 20 are connected again to give synchronization instructions.

In accordance with the synchronization instructions at the point-in-time t5 also, as with the synchronization processing at the previous point-in-time t3, the content of the index file Findex ("2") held by the PC 20 side itself and the index file Findex ("3") held by the digital video camera 1 side are compared, whereby difference information is detected regarding storage states of the content files Fct on the PC 20 side and the digital video camera 1 side. That is to say, in this case detection can be made that the content file "B" which does not exist in the digital video camera 1 side is stored in the PC 20 side, and the existence of the content file "B" at the PC 20 side is detected as difference information.

As to the difference information wherein the file which is not in the digital video camera 1 side exists in the PC 20 side, the PC 20 is arranged to delete the content file indicated by the difference information from the HDD 30. That is to say, in this case, the content file "B" shown by the above-mentioned difference information is deleted.

Additionally, in this case also, a transfer request is performed for the index file Findex ("3") held by the digital video camera 1 for the next synchronizing processing, and this is saved in the HDD 30.

Further, the PC-side management information 30b is also updated to becomes information content in accordance with the deleting of the content file "B" (update from "β" to "γ").

Also, at the next point-in-time t6, let us say that correction of the content file "C" is performed on the digital video camera 1 side shown in (a) in FIG. 7, whereby the content file "C" is updated to content file "C'", and the index file Findex is updated to information content "4" in accordance with the update to the "C'".

Then let us say that the from the state at the point-in-time t6 to the next point-in-time t7, the digital video camera 1 and PC 20 are connected and synchronization instructions are given.

In accordance with the synchronization instructions at the point-in-time t7 also, as with the synchronization processing at the previous points-in-time t3 and t5, the content of the index file Findex ("3") held by the PC 20 side itself and the index file Findex ("4") held by the digital video camera 1 side are compared, whereby difference information is detected regarding storage states of the content files Fct on the PC 20 side and the digital video camera 1 side. That is to say, in this case detection can be made that the content file "C" on the digital video camera 1 side is updated to content file "C'". Note that whether or not the content file is updated can be determined by comparing the content update date-and-time C6 within the index file Findex. Also to be noted is that, even if the content file is updated in this case, the content ID itself does not change (see the description of the previous FIG. 6).

Thus, the content file "C" in the digital video camera 1 side having been updated indicates that, from the perspective of the PC 20 side, the content file (C') which does not exist on the PC 20 side is on the digital video camera 1 side, and also, the digital video camera 1 side does not have the content file ("C") which exists on the PC 20 side. Therefore the PC 20 is arranged to delete the content files having a content ID indicated by the difference information from the HDD 30. That is to say, in this case the content file "IC" is deleted.

Further in this case, the PC 20 is arranged to perform a transfer request for the content file ("C'") having a content ID indicated by the above difference information, and saves the transferred content file ("C'") in the HDD 30.

Additionally, in this case also, a transfer request is performed for the index file Findex ("4") held by the digital video camera 1 for the next synchronizing processing, and this is saved in the HDD 30.

Further, the PC-side management information 30b is also updated to become information content in accordance with the deleting of the content file "C", as well as adding the content file "C'". That is to say, the update is made so as to be information content to manage that which has stored the content files "A", "C'", and "D" (update from "γ" to "δ").

Thus, by having an arrangement to perform back-up processing based on the difference information, the portion to be actually transferred is only the file difference, which can increase the speed of back-up processing compared to the case of copying the entire content. Also, the content file to be transferred is reduced, whereby processing load is also reduced.

Also, at this time, the difference information is detected by comparing the content of the index file Findex saved at the previous synchronizing processing and the index file Findex, but by obtaining difference information by content comparison of the index files Findex (management information), difference information can be obtained faster than the case wherein a technique is employed such that the header information (content ID or content update date-and-time) of all of the content files Findex actually stored is detected and difference information is obtained by the comparison thereof, and in this point as well, speed of the back-up processing can be obtained.

The index file Findex to manage each content file Fct with the present embodiment has file-relating information other than a content ID (file identifier) such as content update date-and-time or entry update date-and-time corresponded thereto, but in a case wherein only the file identifier of each content file is corresponded to the management information, only file adding/deleting can be determined with the comparison between the management information. That is to say, in the case of performing back-up processing based on determining a difference other than file adding/deleting, for example, processing for separately obtaining the necessary relating information associated to a file, the time required to obtained such difference information as well as the time required to complete the back-up processing based on such difference information is lengthened.

As described above, the index file Findex of the present example is arranged such that file-relating information other than a file identifier, such as content update date-and-time, is entered as entry data, whereby other difference types such as "content update" and "entry update" or the like can be obtained just by comparing the management information. Thus, even in the event of determining difference types other than content adding/deleting, the difference types thereof can be determined by comparing the management information, and accordingly speed can be increased for back-up processing according to such difference types other than content adding/deleting.

With the present embodiment, detecting the difference information by comparing the index files Findex is specifically performed as shown in the following FIGS. 8 through 10.

Figure 8:
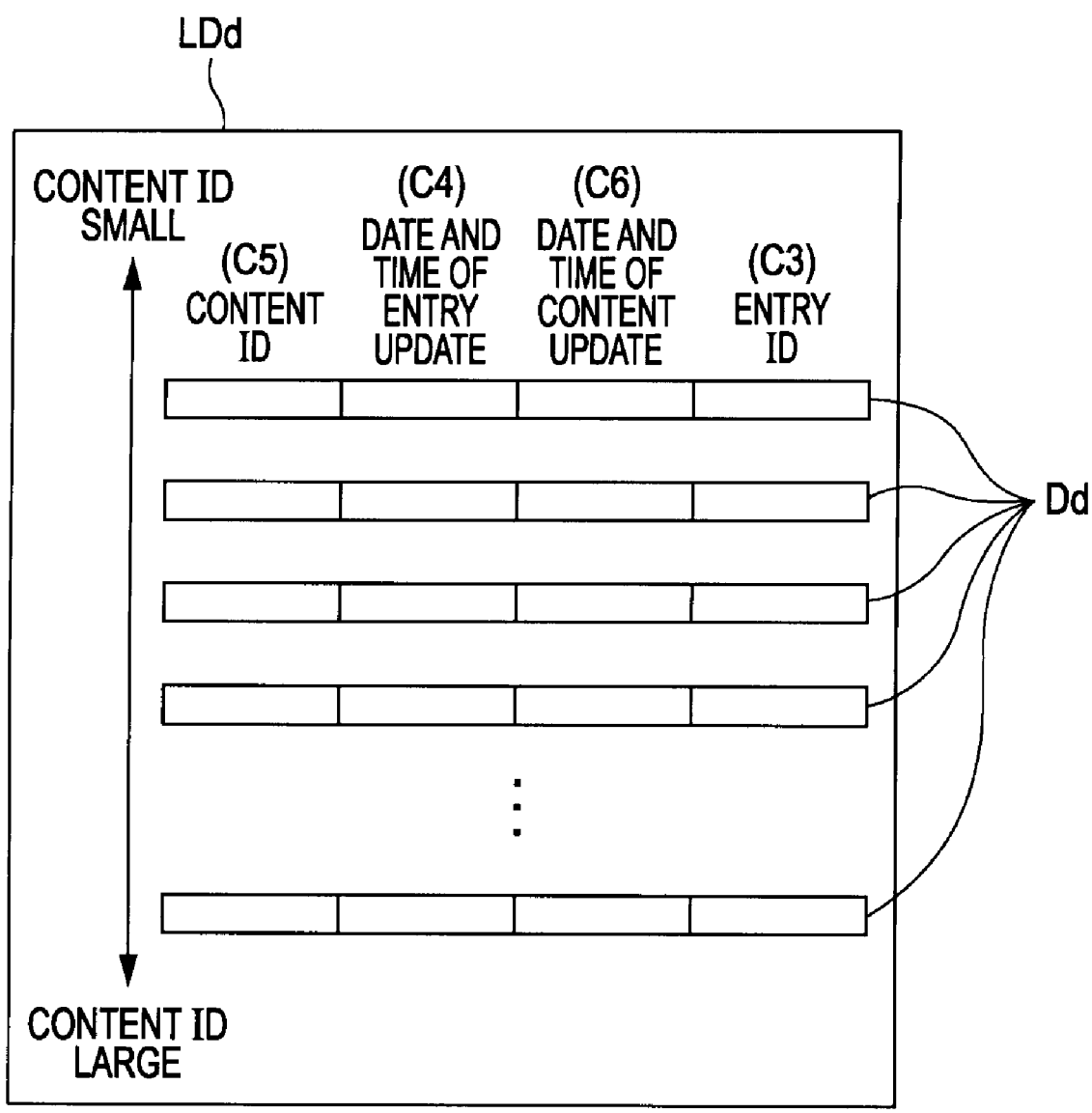
FIG. 8 is a drawing for describing the structure of a discrepancy detection information list.

First, FIG. 8 shows a configuration of a discrepancy detection information list LDd. The discrepancy detection information list LDd is information wherein discrepancy detection information Dd is listed.

In this case, one piece of discrepancy detection information Dd corresponds to one piece of entry data (one content file Fct) entered in the index file Findex. That is to say, one piece of discrepancy detection information Dd is information wherein a content ID C5, entry update date-and-time C4, content update date-and-time C6, and entry ID C3, is extracted for each entry data entered in the index file Findex.

The discrepancy detection information list LDd is a list of discrepancy detection information Dd generated for all of the entry data (content file Fct) entered in the index file Findex.

Note that the discrepancy detection information list LDd in this case shows a list of discrepancy detection information Dd which has been sorted in an ascending order of content IDs.

When new back-up processing (synchronizing processing in this case) is performed, the PC 20 generates the discrepancy detection information list LDd shown in FIG. 8 for both of the index file Findex from the previous back-up processing (synchronizing processing time) saved in the HDD 30 and the index file Findex held on the digital video camera 1 side.

Figure 9:
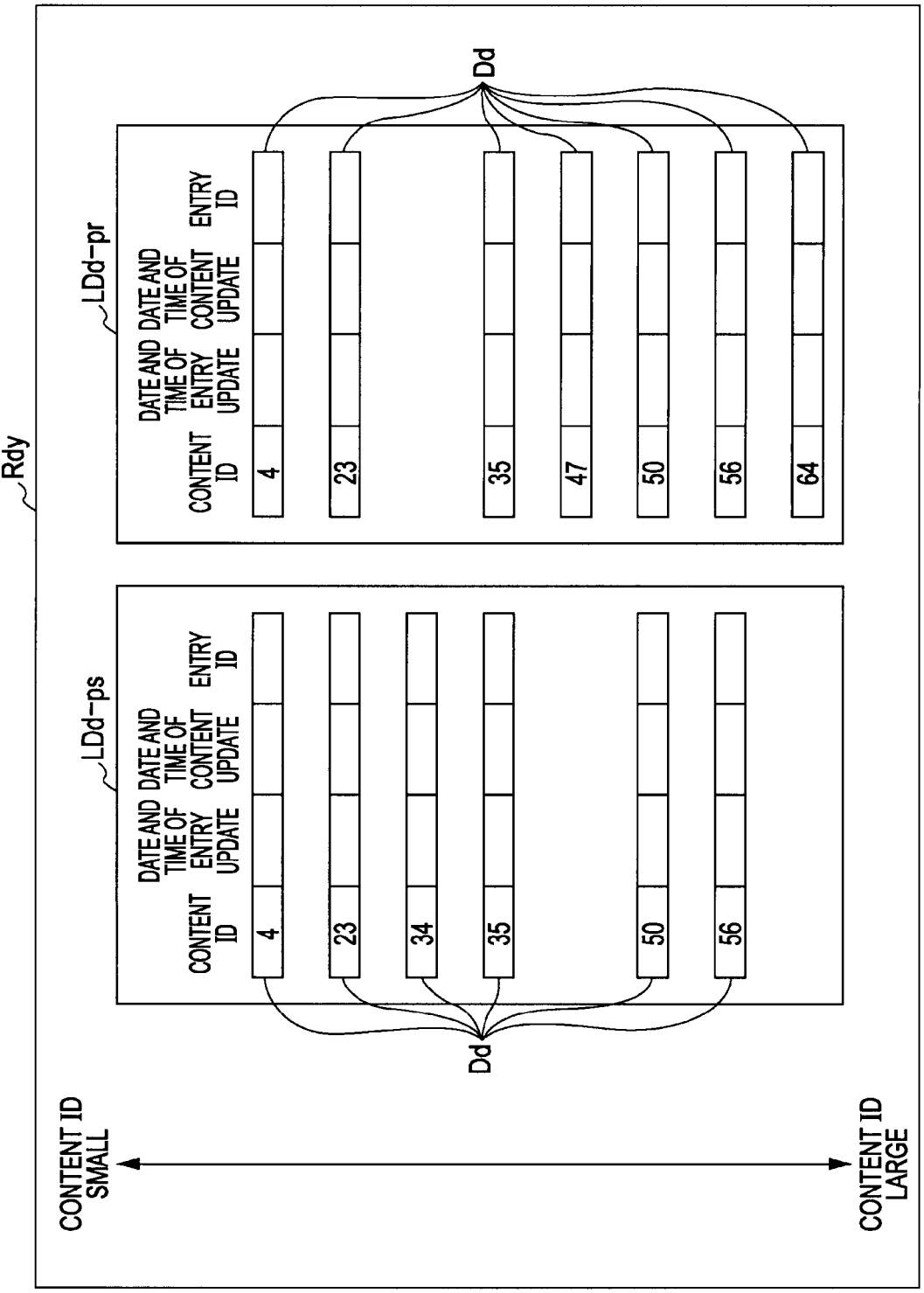
FIG. 9 is a drawing illustrating a comparison of a discrepancy detection information list at the time of a previous back-up and a discrepancy detection information list at the time of the present back-up.

FIG. 9 illustrates two discrepancy detection information lists LDd generated by the PC 20 from back-up processing. In this drawing, a discrepancy detection information list LDd-ps from the previous back-up is the discrepancy detection information list LDd generated based on the index file Findex from the previous back-up already saved in the HDD 30, from new back-up processing. Also, a present discrepancy detection information list LDd-pr from the present back-up is the discrepancy detection information list LDd generated for the index file Findex held on the digital video camera 1 side from new back-up processing.

In FIG. 9, an example is shown wherein the discrepancy detection information Dd wherein the content IDs are "4", "23", "34", "35", "50", "56" are listed serving as the discrepancy detection information list LDd-ps from the previous back-up. This indicates that the content files Fct wherein the content IDs are "4", "23", "34", "35", "50", "56" are stored in the HDD 14 on the digital video camera 1 side.

On the other hand, an example is shown wherein the discrepancy detection information Dd wherein the content IDs are "4", "23", "35", "47", "50", "56", "64" are listed serving as the discrepancy detection information list LDd-pr from the present back-up. This indicates that the content files Fct wherein the content IDs are "4", "23", "35", "47", "50", "56", "64" are stored in the HDD 14 on the digital video camera 1 side.

The PC 20 is arranged to hold the discrepancy detection information list LDd-ps from the previous back-up and the discrepancy detection information list LDd-pr from the present back-up as difference information generating information Rdy.

Actual difference information can be detected by employing such difference information generating information Rdy.

Figure 10:
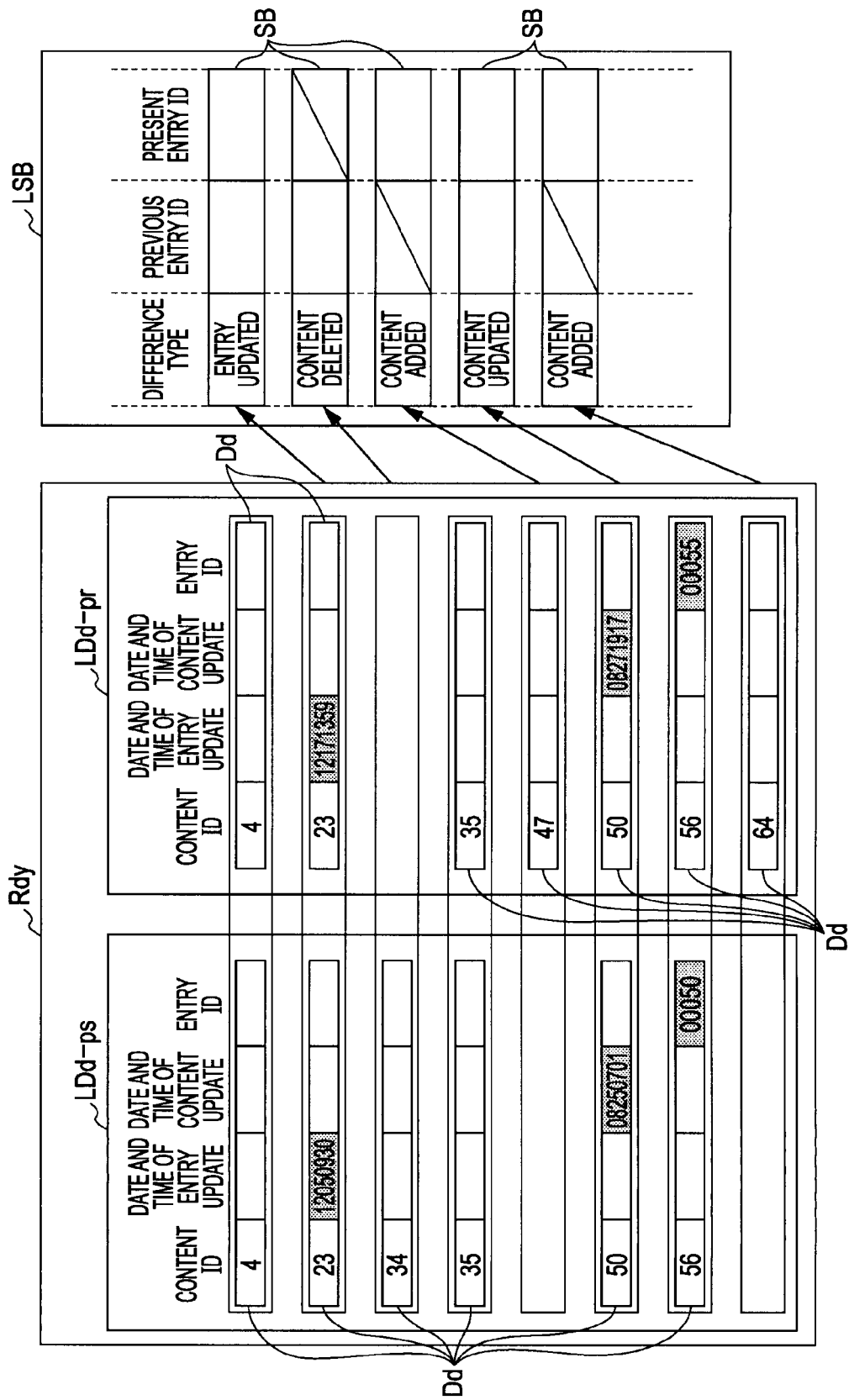
FIG. 10 is a drawing schematically illustrating detection operations of difference information, using difference information from difference information generating information.

FIG. 10 illustrates the detecting operation of the difference operation employing the above difference information generating information Rdy. Note that in this drawing, the difference information generating information Rdy from the discrepancy detection information list LDd-ps from the previous back-up and the discrepancy detection information list LDd-pr from the present back-up is shown. Also, FIG. 10 shows the items within the discrepancy detection information Dd wherein the content in the discrepancy detection information list LDd-ps from the previous back-up and the discrepancy detection information list LDd-pr from the present back-up indicates discrepancy with a colored portion.

First, in this case, with the content ID included as an item of the discrepancy detection information Dd, by comparing the content IDs for the respective discrepancy detection information list LDd-ps from the previous back-up and discrepancy detection information list LDd-pr from the present back-up, adding content and deleting content on the digital video camera 1 side can be detected.

That is to say, the discrepancy detection information Dd with the content ID="34" exists in the discrepancy detection information list LDd-ps from the previous back-up but does not exist in the discrepancy detection information list LDd-pr from the present back-up, for example, whereby detection can be made that the content file Fct having such content ID has been deleted with the digital video camera 1. Also, for example, the discrepancy detection information Dd with the content ID="64" exists in the discrepancy detection information list LDd-pr from the present back-up but does not exist in the discrepancy detection information list LDd-ps from the previous back-up, for example, whereby detection can be made that the content file Fct having such content ID has been added with the digital video camera 1.

Also, entry update date-and-time is included as an item of the discrepancy detection information Dd in this case. Thus, the content file Fct wherein an entry has been updated on the digital video camera 1 side can be detected. For example, with this drawing, discrepancy detection information Dd with the content ID="23" within the discrepancy detection information list LDd-ps from the previous back-up and discrepancy detection information list LDd-pr from the present back-up is shown with differing information content for entry update date-and-time respectively, whereby the content file Fct with the content ID="23" can be detected as having an entry updated on the digital video camera 1 side.

Further, content update date-and-time information is also included as an item of the discrepancy detection information Dd in this case, whereby the content file Fct can be detected as having an entry updated on the digital video camera 1 side.

In other words, in FIG. 10, discrepancy detection information Dd with the content ID="50" within the discrepancy detection information list LDd-ps from the previous back-up and discrepancy detection information list LDd-pr from the present back-up is shown with differing information content for entry update date-and-time respectively, whereby the content file Fct with the content ID="50" can be detected as having an entry updated on the digital video camera 1 side.

Also, the discrepancy detection information Dd has an item provided for an entry ID. The entry ID item provided is to specify which content file Fct is the content file Fct subjected to difference detecting. From this perspective, the entry ID information in the discrepancy detection information Dd fulfils the same purpose as the content ID item similarly provided in the discrepancy detection information Dd.

Note that according to this, entry ID item is unnecessary in the discrepancy detection information Dd. The entry ID item is provided herein is for situations such that the applications on the digital video camera 1 side and PC 20 side employ this entry ID information in the event of accessing entry data.

Also, as can be understood from the description, the entry ID in the discrepancy detection information Dd is not an item provided to detect such discrepancy. Therefore, even in the case of discrepancy of an entry ID, such as the content ID="56" as in the drawing, these discrepancies are arranged so as to not be detected.

In FIG. 10, a difference information list LSB shown in the drawing is generated from the comparison results of the information content of each discrepancy detection information Dd employing such difference information generating information Rdy.

The difference information list LSB is information wherein difference information SB is listed, as shown in the drawing. Each difference information SB has the three items provided as shown, which are "difference type", "previous entry ID", and "present entry ID".

The items for "previous entry ID" and "present entry ID" have stored therein an entry ID for the discrepancy detection information Dd with the discrepancy detection information list LDd-ps from the previous back-up and an entry ID for the discrepancy detection information Dd with the discrepancy detection information list LDd-pr, from the comparison results of the information content of the previous/present discrepancy detection information Dd, respectively, in the difference information generating information Rdy.

Also, information indicating types of differences is stored in the "difference type" item. The difference types in this case are the four types of content adding, content deleting, content updating, and entry updating. A specific generating technique for the difference information SB is performed as described below.

First, the discrepancy detection information Dd within the discrepancy detection information list LDd-ps from the previous back-up and the discrepancy detection information Dd with the discrepancy detection information list LDd-pr from the present back-up are subjected to comparison of the information content thereof in sequence from each leading discrepancy detection information Dd.

At this time, if the content ID at each of the discrepancy detection information Dd is the same, it is clear that content adding and content deleting has not been performed. Accordingly, in this case, comparison of entry update date-and-time and content update date-and-time is performed. If the entry update date-and-time are different, the difference type becomes "entry update". Accordingly, information indicating the difference type "entry update" is stored in the difference information list LSB, and further, the difference information SB wherein the entry IDs of the discrepancy detection information Dd subjected to comparison is stored are listed as previous entry ID and present entry ID.

Also, if the content update date-and-time are different, the difference type is "content update", and accordingly, the difference type in the difference information list LSB is "content update". In this case also, the difference information SB wherein the entry IDs of each discrepancy detection information Dd having been subjected to comparison are stored is listed in the previous entry ID and present entry ID.

On the other hand, in the event that the content IDs are different, determination is performed as to whether content adding or content deleting has been performed. Specifically, if the value of the content ID of the discrepancy detection information Dd within the discrepancy detection information list LDd-ps from the previous back-up is the smaller (i.e. in this case if the recording sequence is first), it is clear that the content file Fct having the content ID of the discrepancy detection information Dd from the previous back-up has been deleted. Accordingly, in this case, "content deleted" is stored as the difference type, and the difference information SB wherein the entry ID of the discrepancy detection information Dd on the previous discrepancy detection information list LDd-ps side is listed as a previous entry ID.

In the case of content deleted, the present entry ID does not exist, so information is not stored in the present entry ID item.

For comparison processing after the "content deleted" has been detected, the discrepancy detection information Dd in the discrepancy detection information list LDd-pr from the present back-up is subject to comparison again and is compared to the discrepancy detection information Dd having the next content ID in the previous discrepancy detection information list LDd-ps. That is to say, for example with the example in FIG. 10, the discrepancy detection information Dd where content ID=34 on the previous back-up side and the discrepancy detection information Dd where content ID=35 on the present back-up side are compared and "content deleted" is detected, following which the discrepancy detection information Dd where content ID=35 of the above present back-up is subject to comparison again and is compared to the discrepancy detection information Dd where content ID=35 of the previous back-up. Thus, even after the "content deleted" has been detected, the difference type can be accurately detected.

Also, conversely to the above description, if the value of the content ID of the discrepancy detection information Dd within the discrepancy detection information list LDd-ps from the previous back-up is the smaller, it is clear that the content file Fct having the content ID of the discrepancy detection information Dd from the present back-up has been added. Accordingly, in this case, "content added" is stored as the difference type, and the difference information SB wherein the entry ID of the discrepancy detection information Dd on the present discrepancy detection information list LDd-pr side is listed as a present entry ID.

In the case of content added, the previous entry ID does not exist, so information is not stored in the previous entry ID item.

For comparison processing after the "content added" has been detected, the discrepancy detection information Dd in the discrepancy detection information list LDd-ps from the previous back-up is subject to comparison again and is compared to the discrepancy detection information Dd having the next content ID in the present discrepancy detection information list LDd-pr. That is to say, for example with the example in FIG. 10, the discrepancy detection information Dd where content ID=50 on the previous back-up side and the discrepancy detection information Dd where content ID=47 on the present back-up side are compared and "content added" is detected, following which the discrepancy detection information Dd where content ID=50 of the above previous back-up is subject to comparison again and is compared to the discrepancy detection information Dd where content ID=50 of the present back-up. Thus, even after the "content added" has been detected, the difference type can be accurately detected.

Also, with a discrepancy detection information list LDd in the case that content adding or deleting is performed, a discrepancy detection information Dd without comparison object may exist, as with the discrepancy detection information Dd where content ID=64 on the present back-up side shown in FIG. 10, for example. That is to say, in the case of the number of list items of the discrepancy detection information Dd differing between the discrepancy detection information list LDd-ps from the previous back-up side and the discrepancy detection information list LDd-ps from the present back-up side, such a discrepancy detection information Dd without comparison object can exist.

In this case, by determining in which of the previous back-up side and present back-up side the discrepancy detection information Dd without comparison object exists, specification can be made as to whether this is content adding or content deleting.

That is to say, if the comparison object for discrepancy detection information Dd is missing beforehand on the previous back-up side, the discrepancy detection information Dd remaining thereafter on the present back-up side will be expressing all of the added content files Fct. Accordingly, in this case, each of the remaining discrepancy detecting information Dd remaining in the present back-up side become "content added", and the information wherein the content ID thereof is stored in the present entry ID is listed in the difference information list LSB.

Conversely, if the comparison object for discrepancy detection information Dd is missing beforehand on the present back-up side, the discrepancy detection information Dd remaining thereafter on the previous back-up side will be expressing all of the deleted content files Fct. Accordingly, in this case, each of the remaining discrepancy detecting information Dd remaining in the previous back-up side become "content deleted", and the information wherein the content ID thereof is stored in the previous entry ID is listed in the difference information list LSB.

With operations as described above, difference information can be detected by comparing the index files Findex.

If difference information SB as that described above can be obtained, by performing processing hereafter such as adding/deleting the content file Fct as to the HDD 30 according to the content of the difference information SB, synchronized processing can be realized.

That is to say, the difference information SB wherein the difference type is "content adding" copies the content file Fct specified by an entry ID stored in the present entry ID to the PC 20 side from the digital video camera 1.

Also, the difference information SB wherein the difference type is "content deleting" deletes the content file Fct specified from the entry ID stored in the previous entry ID from the PC 20 side.

Also, with the difference information SB wherein the difference type is "content updated", the content file Fct specified by the value stored in the previous entry ID is corrected at the digital video camera 1 side and so forth, so at the present back-up the content has become the updated content file Fct, whereby the content file Fct specified by the value of the previous entry ID is deleted from the PC 20 side, and conversely, the content file Fct specified by the value of the present entry ID is copied to the PC 20 side from the digital video camera 1 side.

Thus, the storage states of the content files Fct at the digital video camera 1 side and personal computer 20 side can be synchronized.

Note that in the case of the difference information SB obtained wherein the difference type is "entry updated", there is no particular response operation with the first embodiment. However, "entry updated" indicates that an update of entry data has been performed, and specifically, indicates that metadata attached to the content file Fct, for example, has been updated. Accordingly, an arrangement may be made wherein in the case of managing the metadata on the PC 20 side for example, as with each content file Fct on the digital video camera 1 side by the PC side managing information 30b, in accordance with the "entry updated", the metadata which is managed in correlation to the content files Fct by the PC side management information 30b is subjected to updating processing based on the metadata within the index file Findex on the digital video camera 1 side.

1-6. Processing Operation

Next, the processing operations to be performed in order to realize back-up processing (synchronizing processing) for the first embodiment described up to now will be described with reference to FIGS. 11 through 13.

Figure 11:
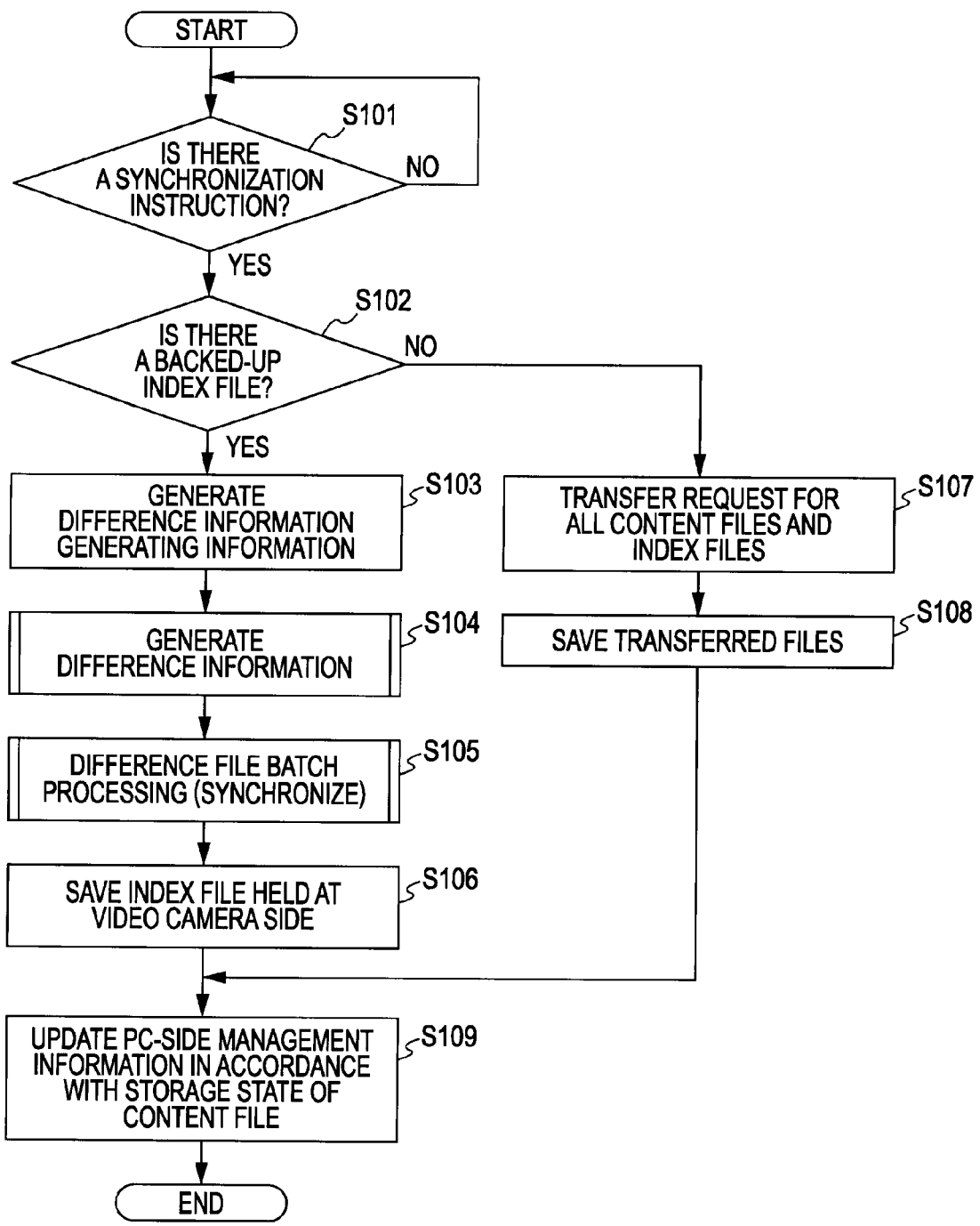
FIG. 11 is a flowchart illustrating the overall flow of processing operations to be performed to realize the synchronizing processing according to the first embodiment.

FIG. 11 shows the overall processing operation flow to be performed for realizing the synchronizing processing for the first embodiment. Also, FIG. 12 shows the processing operations to be performed corresponding to the generating of difference information such as that described previously with FIG. 10, and FIG. 13 shows the difference file group processing (synchronizing) for the first embodiment to be performed based on the generated difference information.

Figure 12:
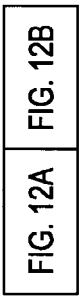
FIG. 12 is a flowchart illustrating the what is being processed in the processing information of difference information.
Figure 12A:
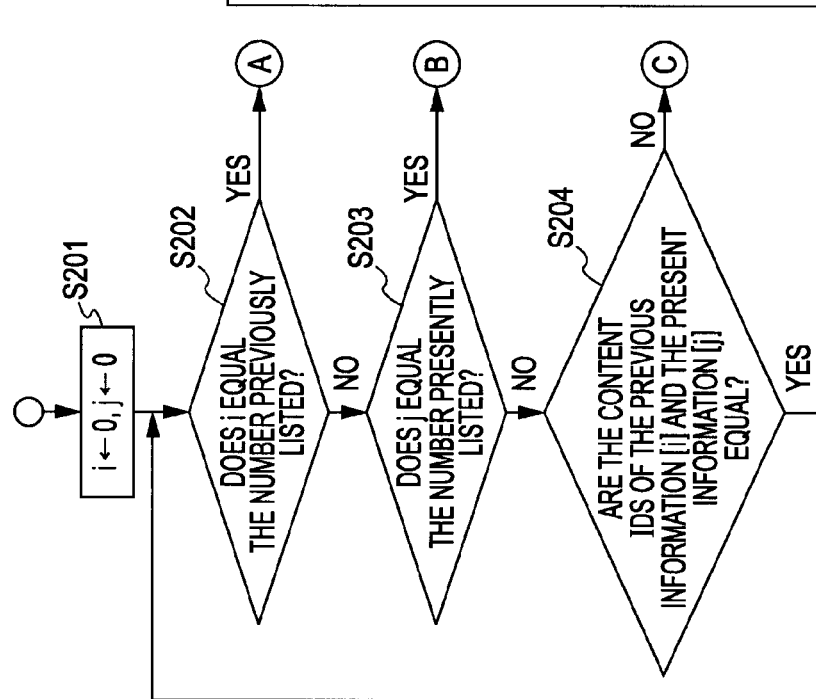
Figure 13:
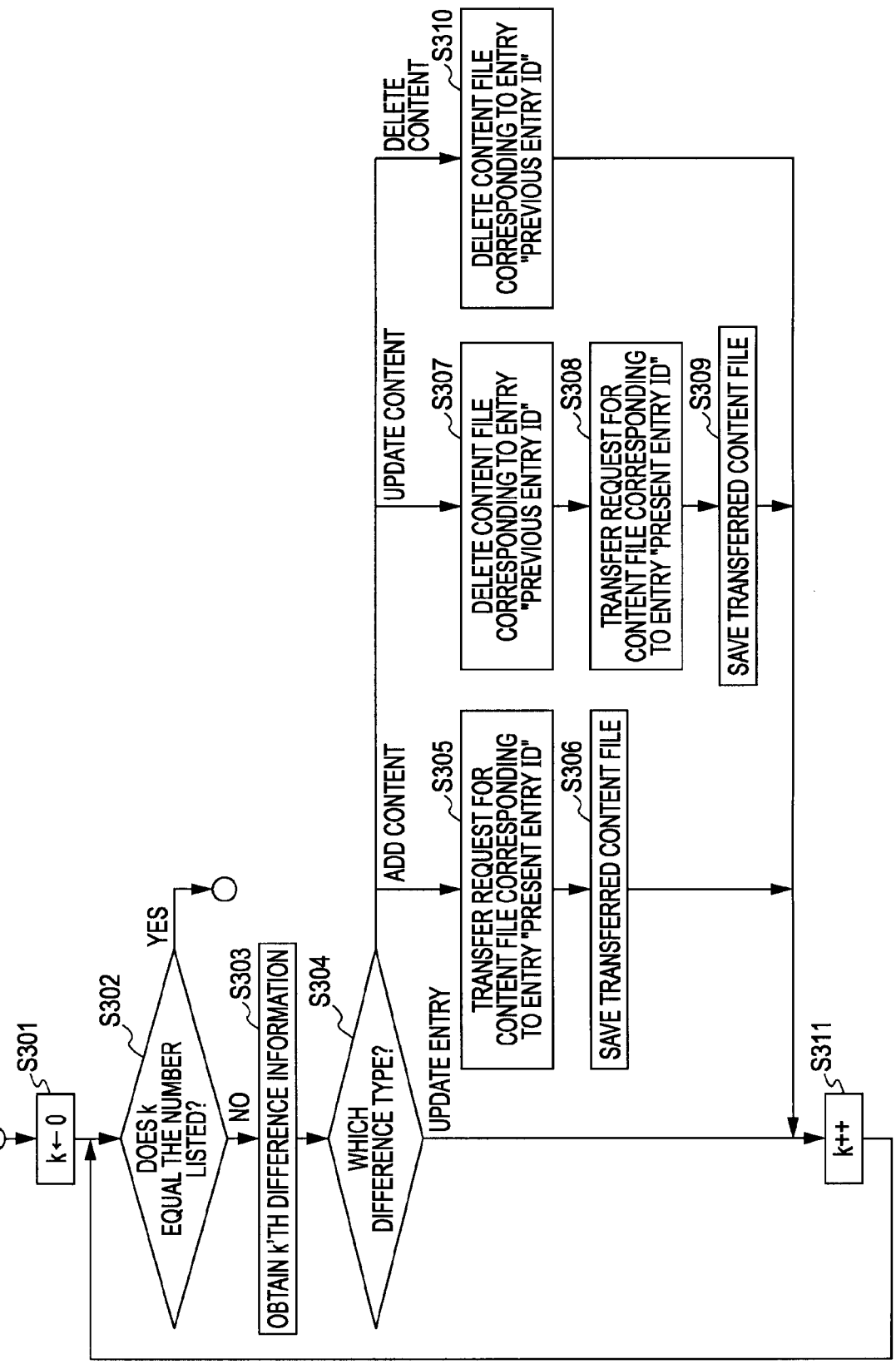
FIG. 13 is a flowchart illustrating what is being processed in difference file group processing (synchronizing)

Note that the processing operations shown in FIGS. 11 through 13 are to be executed by the CPU 21 in the personal computer 20 shown in FIG. 3, based on the back-up processing program 30a stored in the HDD 30.

Note that here only the processing operations to be performed on the personal computer 20 side will be described, but in the case of the first embodiment, regarding the processing operations on the digital video camera 1 side, only the transferring of the content file Fct and index file Findex according to the transfer request from the personal computer 20 side need to be performed, so the description of the drawing thereof will be omitted.

First, the overall flow of the synchronizing processing will be described with reference to FIG. 11. Note that in FIG. 11, a digital video camera 1 and personal computer 20 are already connected via a USB cable in a state capable of data communication, and the personal computer 20 side is in the state of being started up.

First, in step S101, synchronizing instructions are awaited. As described above, the synchronization instructions in this case are performed by the user operating the mouse of the input unit 25 and clicking a predetermined icon on the screen, for example. Accordingly in this case, an operation as to the predetermined icon is awaited whereby synchronization instructions are awaited.

In step S102, the determining processing is performed as to whether or not there is a backed-up index file. That is to say, determining processing is performed as to whether or not the backed-up index file Findex from the digital video camera 1 side is already saved in the HDD 30.

In the case that a negative result is obtained wherein there is no backed-up index file, the flow is advanced to step S107, and a transfer request for all of the content files and index files is performed. That is to say, the transfer request for all of the content files Fct and index file Findex stored in the HDD 14 is performed as to the digital video camera 1.

In the following step S108, the transferred file is saved. That is to say, processing is performed for recording each of the content files Fct and index file Findex transferred from the digital video camera 1 side via the USB interface 23 to the HDD 30.

Note that for clarification we will state that the transfer request of the files to the digital video camera 1 side as described above is performed by the CPU 21 performing control as to the interface 23. Also, the recording of the transferred files to the HDD 30 is realized by performing recording control as to the HDD 30.

Subsequently, the flow is advanced to step S109, and processing is performed to update the PC side management information in accordance with the storage status of the content file. That is to say, in this case processing is executed for updating the information content of the PC side management information 30b so that the content file Fct recorded in the previous step S108 is managed as having been stored in the HDD 30.

With the above-described flow of steps S101→S102→S107→S108→S109, all of the content files Fct held in the digital video camera 1 side and the index file Findex showing the management state thereof are backed up on the PC 20 side at the time of initial synchronizing processing (see point-in-time t1 in FIG. 7).

On the other hand, in step S102, in the case that an affirmative result is obtained as having a backed-up index file Findex, difference information generating information is generated in step S103. That is to say, the difference information generating information Rdy as shown in the previous FIG. 9 is generated.

Specifically regarding the processing in step S103, first the transfer request is performed as to the digital video camera 1 side, the index file Findex held in the HDD 14 is transferred, and this is temporarily held in a memory unit 22 or the like, for example. Subsequently, by generating discrepancy detecting information Dd by extracting the respective predetermined items (content ID C5, entry update date-and-time C4, content update C6, and entry ID C3) from the newly transferred index file Findex and the index file Findex from the previous back-up which is backed up already in the HDD 30 and listing each of these, the discrepancy detection information list LDd-pr from the present back-up such as that shown in the previous FIG. 9 and the discrepancy detection information list LDd-ps from the previous back-up are generated. That is to say, the difference information generating information Rdy is thus generated.

Note that as mentioned earlier, in generating each discrepancy detection information list LDd, the discrepancy detection information Dd is sorted in an ascending order of content ID values and listed. Thus, detecting of the difference type with the technique described with FIG. 10 can be accurately performed.

In the following step S104, difference information is generated. The processing in step S104 is processing to generate difference information SB as described in the previous FIG. 10 and list these, and so is processing to generate the difference information list LSB. The details of this processing will be described in FIG. 12.

In step S105, difference file group processing (synchronizing) is performed. In step S105, this is processing to perform adding/deleting of the content files Fct in accordance with the difference type of the difference information SB as described above, whereby the storage state of the content files Fct are synchronized on the digital video camera 1 side and personal computer 20 side. The details of the difference file group processing (synchronizing) in step S105 will be described in the latter FIG. 13.

In step S106, the index file Findex held on the video camera side is saved. That is to say, processing is performed such that the index file Findex which is transferred to the digital video camera 1 and temporarily held in the previous step S103 is recorded in the HDD 30.

By the index file Findex newly transferred from the digital video camera 1 side being thus saved, the "index file Findex of the previous back-up" at the next synchronizing processing is saved.

Subsequently, the flow is advanced to the previously described step S109, wherein processing is executed to update the PC side management information in accordance with the content file storage status. That is to say, in this case processing is executed for updating the information content of the PC side management information 30*b* so that the content file Fct held in the HDD 30 as a result of the difference file group processing (synchronizing) in step S105 is managed as having been stored in the HDD 30.

FIG. 12 shows generating processing of the difference information which is shown as step S104 in FIG. 11. First, in FIG. 12, a pointer value i and a pointer value j is reset to 0 in step S201.

The pointer value i here achieves the purpose of a pointer indicating the discrepancy detecting information Dd to be subjected to comparison with the discrepancy detecting information Dd listed in the discrepancy detection information list LDd-ps from the previous back-up. That is to say, each time the pointer value i is incremented, the discrepancy detecting information Dd to be subjected to comparison within the discrepancy detection information list LDd-ps from the previous back-up is sequentially shifted.

Similarly, the pointer value j here achieves the purpose of a pointer indicating the discrepancy detecting information Dd to be subjected to comparison with the discrepancy detecting information Dd listed in the discrepancy detection information list LDd-pr from the present back-up, and each time the pointer value i is incremented, the discrepancy detecting information Dd to be subjected to comparison within the discrepancy detection information list LDd-pr from the present back-up is sequentially shifted.

In step S202, determining processing is performed regarding whether or not the pointer value i matches the previous list count. That is to say, determination is performed regarding whether or not the pointer value i matches the discrepancy detecting information Dd within the discrepancy detection information list LDd-ps from the previous back-up.

This is equivalent to determining whether or not comparison of all of the discrepancy detecting information Dd within the discrepancy detection information list LDd-ps from the previous back-up is completed.

In step S202, in the case that negative results are obtained such that the pointer value i does not match with the previous list count, the flow is advanced to step S203, and determining processing is performed this time regarding whether or not the pointer value j matches the list count of the discrepancy detecting information Dd within the discrepancy detection information list LDd-ps from the present back-up, whereby determination is made regarding whether or not comparison of all of the discrepancy detecting information Dd within the discrepancy detection information list LDd-pr from the present back-up is completed.

In the event that negative results are obtained in step S203 such that the pointer value j does not match the present list count, the flow is advanced to step S204.

In step S204, determining processing is performed regarding whether or not the content IDs of the previous information [i] and present information [j] are equal.

Here, the previous information [i] is the discrepancy detection information Dd indicated by the pointer value i within the differential detection information list LDd-ps from the previous back-up. Similarly, the present information [j] is the discrepancy detection information Dd indicated by the pointer value j within the differential detection information list LDd-pr from the present back-up. Accordingly, the step S204 determines whether or not the content IDs are equal discrepancy detection information Dd wherein the discrepancy detection information list LDd-ps side from the previous back-up and the discrepancy detection information list LDd-pr side are to be subjected to comparison.

That is to say, determination is made in the step S204 regarding whether or not content adding/deleting is performed.

In step S204, in the case that affirmative results are obtained such that both content IDs are equal, the flow is advanced to step S205.

In step S205, determination processing is performed regarding whether or not the entry update date-and-time of the previous information [i] and present information [j]. That is to say, determination is made herein regarding whether or not an entry update has been performed.

In the event that affirmative results are obtained in step S205 such that the entry updates date-and-time are equal, determination processing is performed regarding whether or not the content update date-and-time of the previous information [i] and present information [j] are equal. That is to say, determination is made herein regarding whether or not a content update has been performed.

In the event that affirmative results are obtained in step S206 such that the content update date-and-time are equal, the flow is advanced to step S214, and upon incrementing (+1) each of the pointer value i and the pointer value j, the flow is advanced to the previous step S202.

That is to say, obtaining affirmative results in step S206 can indicate that determination is made that none of content adding/deleting, entry updating, or content updating is performed, whereby the point value i and point value j are incremented together and subject the discrepancy detection information Dd to be compared of the previous back-up side and present back-up side together, and performs comparison of the various items (content ID, entry update date-and-time, content update date-and-time) of the discrepancy diction information Dd.

As described up to now, as long as there is no difference in the content file Fct to be subjected to comparison, the loop processing of steps S202→S203→S204→S205→S206→S214→S202 is repeated.

Thus, it is clear that, if there is no difference in the respective content files Fct subjected to comparison by the pointer values i and j, adding of difference information SB to the difference information list LSB is not performed.

In the previous step S204, description has been made regarding determination of whether or not content adding/deleting has been performed, but in this step S204, in the case of obtaining negative results that the content IDs are not equal, the flow is advanced to step S207, and determination processing is performed as to whether or not the content ID of the present information [j] is greater than that of the present information [i].

That is to say, in this step S207, determination is performed as to whether the difference type is "content added" or "content deleted".

As described in the previous FIG. 10 also, if the content ID of the present information [j] is greater than that of the previous information [i] (i.e. if an affirmative result is obtained in step S207), the difference type becomes "content deleted". Accordingly in such a case, the flow is advanced to step S208 as shown in the drawing, the processing is performed to add the difference information wherein the difference type is "content deleted" is added to the difference information list.

In the event that the differential type is "content deleted", the present entry ID does not exist, so the information indicating the difference type "content deleted" is stored, while the difference information SB wherein the previous information [i] entry ID is stored in the previous entry ID is added to the difference information list LSB.

In the following step S209, upon incrementing only the pointer value i the flow is returned to the previous step S202. According to the example in the previous FIG. 10, processing is performed such that the discrepancy detection information Dd where content ID=34 on the previous back-up side and the discrepancy detection information Dd where content ID=35 on the present back-up side are compared and "content deleted" is detected, following which the discrepancy detection information Dd where content ID=35 of the above present back-up is subject to comparison again and is compared to the discrepancy detection information Dd where content ID=35 of the previous back-up. As described above, with such processing, even after the "content deleted" has been detected, the difference type can be accurately detected.

Also, in the event that negative results are obtained in the above step S207, i.e., the content ID of the previous information [i] is greater than that of the present information [j], the difference type becomes "content added", as described in the previous FIG. 10. In this case, the flow is advanced to step S210 as shown in the drawing, and processing is performed to add the difference information wherein the difference type is "content added" to the difference information list.

In the event the differential type is "content added", the previous entry ID does not exist, so the information indicating the difference type "content added" is stored, while the difference information SB wherein the present information [j] entry ID is stored in the present entry ID is added to the difference information list LSB.

In the following step S211, upon incrementing only the pointer value j the flow is returned to the previous step S202. According to the example in the previous FIG. 10, processing is performed such that the discrepancy detection information Dd where content ID=50 on the previous back-up side and the discrepancy detection information Dd where content ID=47 on the present back-up side are compared and "content added" is detected, following which the discrepancy detection information Dd where content ID=50 of the above present back-up is subject to comparison again and is compared to the discrepancy detection information Dd where content ID=50 of the previous back-up.

With such processing, even after the "content added" has been detected, the difference type can be accurately detected.

Also, in the previous step S205, determination is made as to whether or not entry updating has been performed, but in the event that negative results are obtained in step S205 showing the entry update date-and-time are not equal, difference information wherein the difference type is "entry update" is added to the difference information list in step S212.

In the event of "entry updated", the previous entry ID/present entry ID exist together as described with FIG. 10. Accordingly, in step S212, information showing the difference type "entry updated" is stored, while the difference information SB wherein the previous information [i] entry ID is stored in the previous entry ID and the present information [j] entry ID is stored in the present entry ID is added to the difference information list LSB.

When the processing is executed in this step S212, upon the flow being advanced to step S214 as described above and shown in the drawing, and the pointer value i and pointer value j having been incremented, the flow is returned to step S202. That is to say, a comparison of the discrepancy detection information Dd to be subjected to comparison is thereby performed.

Also, in the event that negative results are obtained in step S206 showing the entry update date-and-time are not equal, the flow is advanced to step S213, and the difference information wherein the difference type is "content update" is added to the difference information list.

Similarly in the case of "content update", the previous entry ID/present entry ID exist together. Accordingly, in step S213, information showing the difference type "content updated" is stored, while the difference information SB wherein the previous information [i] entry ID is stored in the previous entry ID and the present information [j] entry ID is stored in the present entry ID is added to the difference information list LSB.

Upon incrementing the pointer value i and pointer value j in the next step S214, the flow is returned to step S202, as shown in the drawing.

In the event that adding/deleting of content is performed as described in the previous FIG. 10, there may be a case wherein there is no more discrepancy detection information Dd in one of the discrepancy detection information list LDd-ps from the previous back-up and discrepancy detection information list LDd-pr from the present back-up, whereby detection operation corresponding thereto becomes necessary.

As processing for this purpose, the determining processing is provided in the above-described step S202 and step S203, and the step S215 shown in the drawing.

First, in the event the affirmative results are obtained in step S202 that the pointer value [i] matches the previous list count, the flow is advanced to step S215, and determination processing is performed regarding whether or not the pointer value j matches the present list count. That is to say, determination is made as to whether or not the pointer value j matches the list count of the discrepancy detection information Dd in the discrepancy detection information list LDd-pr from the present back-up.

According to the steps S202 through S215, determination is made as to whether there is any discrepancy detection information Dd to be subjected to comparison remaining at the present back-up side, when there is no more discrepancy detection information Dd to be subjected to comparison on the present back-up side.

As described in the previous FIG. 10, if there is no more discrepancy detection information Dd to be subjected to comparison remaining at the previous back-up side, and there is discrepancy detection information Dd to be subjected to comparison remaining at the present back-up side, all of the content wherein the content ID of the discrepancy detection information Dd remaining at the present back-up side is the added content.

Accordingly, in the event that negative results are obtained in step S215 that the pointer value j does not match the present list count, the difference information wherein the difference information type is "content added" is added to the difference information list in step S216, as with the step S210 described above. Also, in the next step S217, upon only the pointer value j being incremented as with the previous step S211, according to the detection of "content added", the flow is returned to step S202.

With such a loop processing of steps S202→S215→S216→S217→S202, in the case that there is no more discrepancy detection information Dd to be subjected to comparison at the previous back-up side, the discrepancy detection information Dd remaining at the present back-up side is all detected as "content added", whereby the difference information SB according thereto is added to the difference information list LSB.

Also, in the event that affirmative results are obtained that the pointer value j matches the present list count in step S203, the discrepancy detection information Dd to be subjected to comparison at the previous back-up side is in a state of still remaining, though the discrepancy detection information Dd to be compared with for the present back-up is not present, unlike the above.

According to the description in FIG. 10, in this case, the content shown by the content ID of the discrepancy detection information Dd remaining at the previous back-up side is all deleted. Accordingly, in the case that affirmative results are obtained in step S203, the flow is advanced to step S218, and the difference information wherein the difference type is "content deleted" is added to the difference information list, as with the previous step S208. Also, in the next step S219, upon only the pointer value i being incremented as with the previous step S209, according to the detection of "content deleted", the flow is returned to step S202.

With such a loop processing of steps S203→S218→S219→S202→S203, in the case that there is no more discrepancy detection information Dd to be subjected to comparison at the present back-up side, the discrepancy detection information Dd remaining at the previous back-up side is all detected as "content deleted", whereby the difference information SB according thereto is added to the difference information list LSB.

In the case that detection of all of the difference information from the both discrepancy detection information Dd at the previous back-up side and present back-up side, affirmative results are obtained in step S215, and the flow is accordingly advanced to step S105 shown in FIG. 11. That is to say, accordingly the generating processing for the difference information shown in the drawing is ended.

Next, the difference file group processing (synchronizing) as step S105 in FIG. 11 will be described with reference to FIG. 13.

First, in step S301, the pointer value k is reset to 0. The pointer value k here achieves the purpose of a pointer indicating the difference information SB serving as an object thereof with the difference information SB listed within the difference information list LSB.

In step S302, determination processing is performed as to whether or not the pointer value k matches the list count. That is to say, determination is made as to whether or not the pointer value k matches the list count of the difference information SB in the difference information list LSB.

In the event that negative results are obtained as the pointer value k not matching the list count, the k'th difference information is obtained in step S303. That is to say, the difference information SB shown by the pointer k within the difference information list LSB is obtained. The difference type is determined in the next step S304.

First, in the case that the difference type is "content added", the flow is advanced to step S305, and a transfer request is performed for the content file equating to the "present entry ID" entry. That is to say, the entry ID stored in the "present entry ID" is transmitted to the digital video camera 1 side, while a transfer request is performed to transfer the content file Fct specified by the relevant entry ID.

In the next step S306, processing is performed to save the transferred content file. That is to say, processing is executed to record the content file Fct transferred from the digital video camera 1 side to the HDD 30.

Thus, in accordance with the "content added", the newly added content file Fct at the digital video camera 1 side can be transferred and backed up on the HDD 30.

When the saving process in step S306 is executed, upon the pointer value k having been incremented in step S311, the flow is returned to the previous step S302.

Also, in the event that "content updated" is determined in step S304, the flow is advanced to step S307, wherein processing is executed to delete the content file equating to the "previous entry ID" entry. That is to say, processing is executed for deleting the content file Fct specified by the entry ID stored in "previous entry ID" from the HDD 30.

Following this, a transfer request is performed is step S308 for the content file equating to the "present entry ID" entry. In the following step S309, processing is performed to save the transferred content file.

With such processing in steps S307 through S309, in accordance with the "content updated", the content file Fct wherein the content is updated at the digital video camera 1 side can be arranged such that the content is similarly updated at the PC 20 side also.

When the saving process in step S309 is executed, upon the pointer value k having been incremented in step S311, the flow is returned to the previous step S302.

Also, in the case wherein "content deleted" is determined in step S304, processing is executed for deleting the content file equating to the "previous entry ID" entry in step S310. That is to say, processing is executed for deleting the content file Fct specified by the entry ID stored in "previous entry ID" from the HDD 30. Thus, according to "content deleted", the content file Fct deleted at the digital video camera 1 side can also be deleted at the PC 20 side.

Upon the pointer value k having been incremented in the following step S311, the flow is returned to step S302.

Note that in the case of the first embodiment, in the case that "entry updated" is determined in step S304, upon the pointer value k having been incremented in step S311 as shown in the drawing, the flow is returned to step S302. That is to say, in the case of "entry updated", processing is executed based on the next difference information SB without executing particular processing.

However, in the event of managing the metadata of each content file Fct on the PC 20 side, for example, by the PC side management information 30b, as with the digital video camera 1 side, in accordance with the "entry updated", an arrangement may be made wherein processing is performed to update the metadata which is managed by the PC side management information 30b associated with the content file Fct thereof, based on the metadata within the index file Findex of the digital video camera 1 side.

Specifically, updating processing is performed so that the content of the metadata which is managed so as to associate with the content file Fct specified by the "previous entry ID" by the PC side management information 30b becomes the content of the metadata within the entry data (within the management file slot Sm) wherein the "present entry ID" within the index file Findex newly transferred from the digital video camera 1 side is stored.

Also, in the event that affirmative results are obtained that the pointer value k matches the list count in the above-described step S302, the flow is advanced to the processing in step S106 in the previous FIG. 11. That is to say, processing operations shown in this drawing are ended.

Note that according to the description of FIG. 11 through FIG. 13 up to now, upon the difference information SB having been temporarily listed (generated the difference information list LSB), processing is performed of the content file Fct (adding/deleting) based on the following difference information SB, but instead, an arrangement may be made wherein, for each difference information SB generated, processing is performed for the content file Fct based on the difference information SB thereof.

Also, in the event of saving the index file Findex for the next back-up processing (step 106 in FIG. 11), aside from saving in the HDD 30 as described, for example saving in the memory unit 22 can be performed. Alternatively, the index file Findex can be saved in a necessary recording media of the digital video camera 1 side (for example, a nonvolatile memory 12a).

Regardless, the index file Findex saved for such next back-up processing needs to be recorded in a recording media readable (obtainable) by the PC 20 side.

2. Second Embodiment 2-1. Back-up Processing as Second Embodiment

Next, the back-up processing according to the second embodiment will be described.

With the second embodiment, a back-up processing itself performs synchronizing processing as with the case in the previous first embodiment, but in addition to the synchronizing processing function, a restoration processing function is executed.

Note that with the second embodiment also, the configuration of the digital video camera 1 and personal computer 20 are similar to the case with the first embodiment, so the description here will be omitted. However, in accordance with adding a restoration processing function as mentioned above, the content of the back-up processing program 30a stored in the HDD 30 is changed.

First, the restoration processing here is processing to return the storage state of the content file Fct on the digital video camera 1 side to the storage state of the content file Fct which in the past has been backed-up on the PC 20 side.

In particular the restoration processing of the second embodiment is processing to return to the storage state of the content file Fct immediately prior to back-up (restoration processing of the previous synchronizing state).

Here, even if such as restoration process is assumed to be performed, if the content file group which is backed-up on the personal computer 20 side is simply copied to the HDD 14 at the digital video camera side without change, copy processing must be performed for all of the content files Fct held on the personal computer 20 side, thereby required that much longer time.

Thus with the present embodiment, such restoration processing is also performed based on results wherein the difference of the storage states of the content files Fct between the digital video camera 1 side and the personal computer 20 side is detected, as with the case of the back-up processing.

Figure 14:
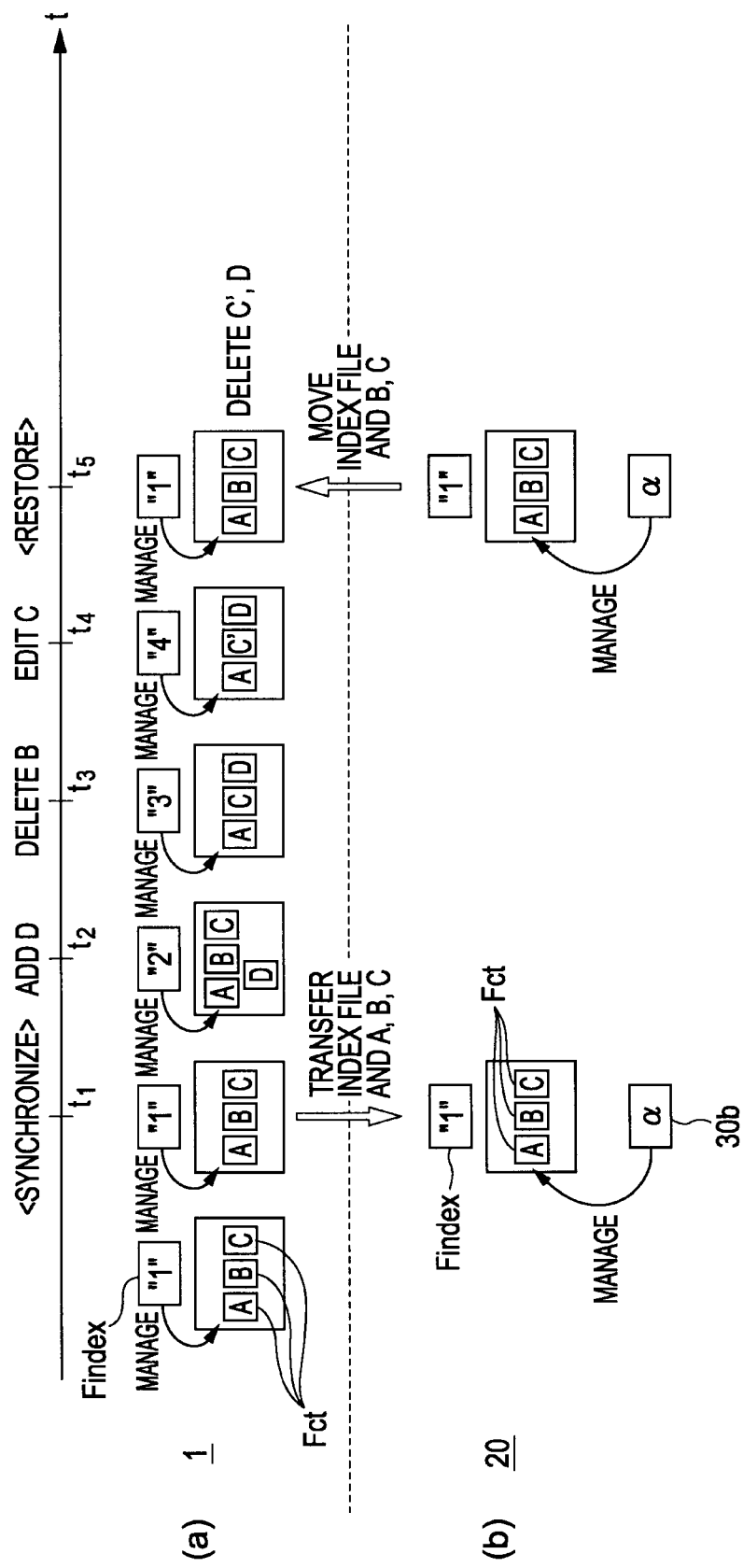
FIG. 14 is a drawing schematically illustrating back-up processing (restoration of the state at the time of previous synchronizing) according to a second embodiment.

FIG. 14 is a schematic drawing showing the back-up processing (restoring of the previous synchronization state) of the second embodiment. In this FIG. 14 also, as with the previous FIG. 7, (a) in FIG. 14 shows the state transition of the index file Findex and content files Fct recorded in the HDD 14 on the digital video camera 1 along the time axis t, and (b) in FIG. 14 shows the state transition of the index file Findex, content files Fct, and PC side management information 30b recorded in the HDD 30 on the personal computer 20 similarly along the time axis t.

In FIG. 14, in this case also let us say that the content files "A", "B", "C" are recorded on the digital video camera 1 side shown in (a) in FIG. 14 as an initial state, and the index file Findex is recorded having content of "1" according to the storage state thereof.

First, in performing the restoration processing in this case, it goes without saying that performing synchronizing between the digital video camera 1 side and personal computer 20 side is a prerequisite thereof.

Therefore, first in point-in-time t1, let us say that the digital video camera 1 and personal computer 20 are connected via a USB cable so as to be capable of data communication, and the first synchronizing process is performed. As described above, the synchronizing processing in this case is similar to the case in the previous first embodiment so repeated description here will be omitted.

Let us say that, after the synchronizing process, at point-in-time t2 the content file "D" is newly added on the digital video camera 1 side. Further let us say that, at point-in-time t3 the content file "B" is deleted, and next at point-in-time t4 the content of the content file "C" is corrected and updated to the content file "C'".

That is to say, the content files Fct on the HDD 14 at this point-in-time t4 is in a state of storing "A", "C'", and "D".

Note that in accordance with the transition at points-in-time t2→t3→t4, the content of the index file Findex is transitioned as "2"→"3"→"4".

Next, let us say that at point-in-time t5, the digital video camera 1 side and PC 20 side are connected again, and restoration processing is performed according to the restoration instructions.

Let us say here that restoration processing is performed according to instruction as to the PC 20, by the user operating the mouse on the input unit 25 to click a predetermined icon on the screen, for example.

On the PC 20 side, in accordance with such restoration instructions performed, as with the case of synchronizing processing first, the discrepancy detection information list LDd-ps from the previous back-up and the discrepancy detection information list LDd-pr from the present back-up are generated, based on the index file Findex held by the digital video camera 1 side and the index file Findex from the previous back-up itself saved in the HDD 30. Based on the results of performing a comparison of the discrepancy detection information Dd on the previous back-up side and present back-up side, a difference information list LSB is generated.

In this case also, processing for a difference file group is performed based on the difference information SB within the difference information list LSB, but as restoration processing, the file storage state on the personal computer 20 side is reflected on the digital video camera 1 side which is the opposite from the synchronizing process, whereby the processing based on the difference information SB is processing performed opposite from the synchronizing processing.

Specifically, immediately prior to the restoration processing performed at the point-in-time t5 in FIG. 14, the file storage states "A", "C'", "D" on the digital video camera 1 side remains as the file storage states "A", "B", "C" on the PC 20 side as after the synchronizing processing at point-in-time t1. Thus, the difference information SB is information indicating "content deleted" for the content file "B", "content updated" for the content file "C", and "content added" for the content file "D", and is listed in the difference information list LSB.

As the difference file group processing in this case, first, in accordance with "content deleted", the content file Fct is transferred from the PC 20 side to the digital video camera 1 side and recorded. That is to say, in this case the content file "B" which is "content deleted" is transferred from the PC 20 side to the digital video camera 1 side and recorded in the HDD 14, whereby the content file "B" deleted on the digital video camera 1 side can be restored.

Also, in accordance with "content updated", the content file Fct specified by the "present entry ID" is deleted from the digital video camera 1 side, while transferring and recording the content file Fct which is held on the PC 20 side and specified by the "previous entry ID" to the digital video camera 1 side. Thus, regarding the content file which is "content updated" in the example sown in FIG. 14 ("C", "C'"), the content file "C'" is deleted from the digital video camera 1 side, and the content file "C" held on the PC 20 side is moved to the digital video camera 1 side and copied thereto. That is to say, the content file "C" held at point-in-time t1 on the digital video camera 1 side is thus restored.

Also, in accordance with "content added", the content file Fct thereof is deleted from the digital video camera 1 side. That is to say, the content file "D" which is "content added" in FIG. 14 is deleted on the digital video camera 1 side, whereby the state of synchronizing processing at point-in-time t1 when the content file "D" did not exist can be restored.

Note that in the case that the difference type is "entry updated", particular processing is not performed with the second embodiment. However, in the case of performing restoration processing such as that in the second embodiment, the "entry updated" is information indicating that the metadata of the content file Fct is updated at the digital video camera 1 side between the previous synchronizing time to the present synchronizing time.

Accordingly, in the case that the metadata is thus updated on the digital video camera 1 side, restoration can be considered to be performed as to the previous synchronized state thereof.

In the case that the metadata is managed on the PC 20 side also, and such metadata is also to be restored, for example, an arrangement may be made wherein the relevant metadata on the digital video camera 1 side is updated to the content of metadata at the previous synchronization point-in-time held by the PC 20 side.

Upon thus performing file group processing according to each difference type, the index file Findex on the digital video camera 1 side is replaced with the index file Findex which is backed-up to the previous synchronization processing time (synchronization processing time immediately prior).

That is to say, as shown at the point-in-time t5 in the drawing, the index file Findex on the digital video camera 1 side is replaced with the index file Findex at the point-in-time t1 (information content "1") which is the previous synchronization time.

Thus, the index file Findex with the information content matched to the storage state of the restored content file Fct can be recorded in the HDD 14. That is to say, the digital video camera 1 side can thus be accurately managed as that wherein the restored content group is recorded in the HDD 14.

Note that for clarification, in the example in this case, the storage state of the content file Fct on the PC 20 side does not change after the synchronizing processing at point-in-time t1, so the information content of the PC side management information 30b does not change ("α" in the drawing).

With the second embodiment, restoration processing is performed by difference file group processing based on the difference information SB. Thus, the actual transferring in this case can be limited to only the difference file, and the restoration processing can be performed at a higher speed when compared to realizing restoration by copying the entire contents. Also, the content files Fct to be transferred is reduced, so the processing load is also reduced.

Also, the difference information SB in this case is also generated by comparing the content of the index files Findex from the previous and present back-ups, so the difference information SB can be obtained that much faster, and accordingly the restoration process can be performed faster as well.

Further, the content of the index files Findex wherein file related information other than the file identifiers such as content update date-and-time are also entered is compared to obtain the difference information SB, whereby difference types other than adding/deleting content such as "content updated" and "entry updated" can be obtained by only comparing the managing information. Thus, in the event of determining the difference type other than content adding/deleting, the difference type thereof can be determined by comparing the management information, and accordingly processing according to the difference types other than the content adding/deleting (in this case, restoration processing of files which are "content updated") can be performed at a faster speed.

2-2. Processing Operation

Figure 15:
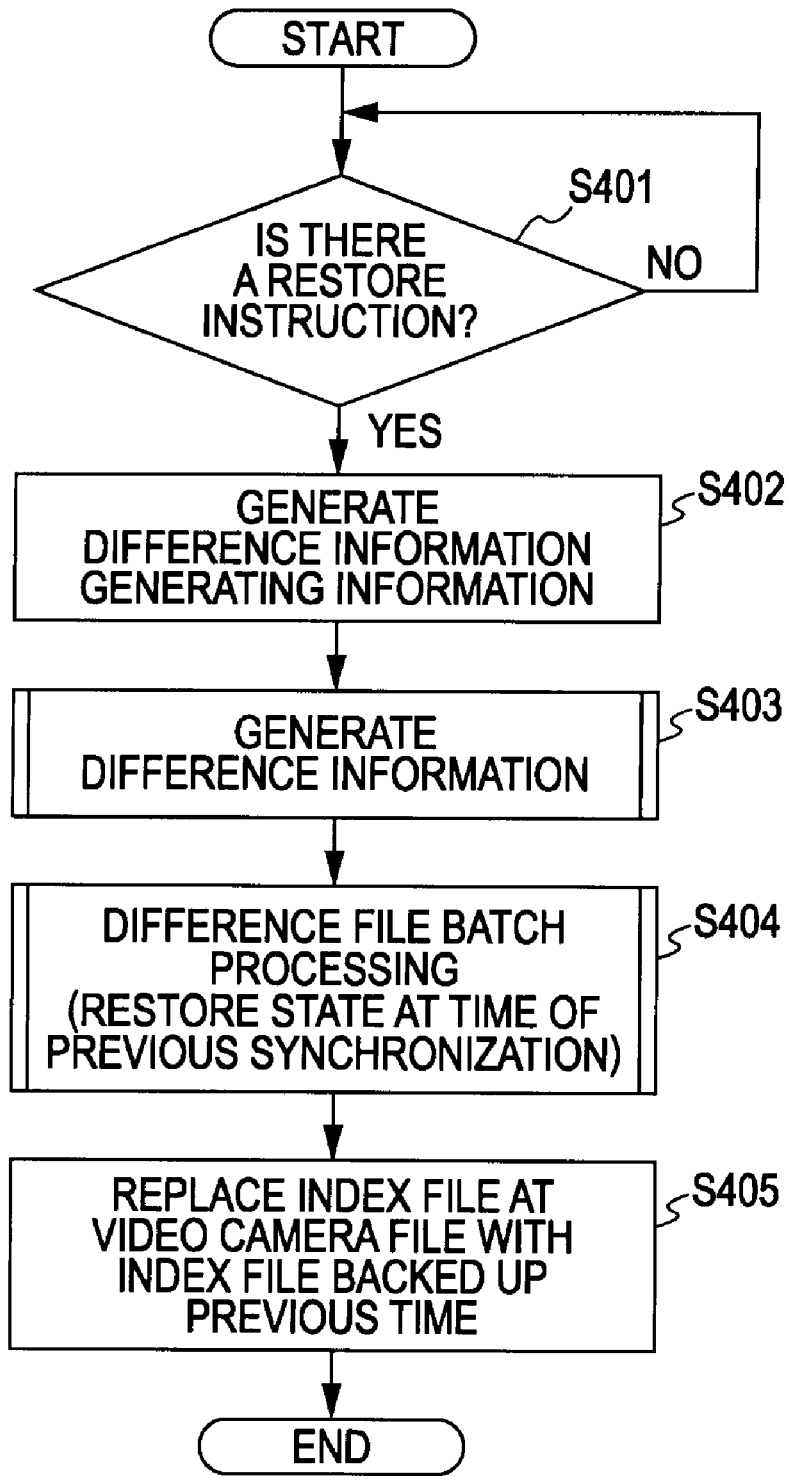
FIG. 15 is a flowchart illustrating processing operations to be performed for realizing the restoration processing according to the second embodiment.

FIG. 15 shows the processing operation to be performed in order to realize the restoration process according to the second embodiment as described above.

In executing the processing operations shown in FIG. 15, let us assume that synchronizing processing has already been performed in the past. The content of the synchronizing processing has been described already with the first embodiment (FIGS. 11 through 13) so will not be described again here.

Also, with this drawing, let us say that the digital video camera 1 side and personal computer 20 side are in a state of already connected so as to be capable of data communication.

Also, in this case the processing operation shows only the personal computer 20 side, but the processing operation on the digital video camera 1 side in this case only includes processing to transfer the index file Findex according to a request from the PC 20 side to generate difference information generating information Ryd, saving (or overwriting saving) processing of the content files Fct and index file Findex transferred from the PC 20 side, and deleting processing of the content files Fct according to the deleting request from the PC 20 side, so the description thereof will be omitted here.

Also, the processing operation shown in FIG. 15 (and FIG. 16 to be described later), is executed by the CPU 21 based on the back-up processing program 30a.

In FIG. 15, first, restoration instructions are awaited in step S401. That is to say, for example in this case, restoration instructions are performed by the user operating the mouse of the input unit 25 to click a predetermined icon on the screen. Accordingly in this case also, an operation as to the above-mentioned predetermined icon is awaited to await the restoration instructions.

In the event that affirmative results are obtained that there are restoration instructions, processing is performed in step S402 to generate difference information generating information. The processing in step S402 is similar to step S103 in FIG. 11, so the description thereof will be omitted. Although not shown in the drawing, the processing in step S402 includes processing to perform a transfer request of the index file Findex to the digital video camera 1 side for generating the difference information generating information Ryd and processing to temporarily hold the index file Findex which has been transferred according to the relevant transfer request, as with the processing in step S103.

In the next step S403, generating processing of the difference information is performed. The generating processing of the difference information in step S403 is similar to step S104 shown in FIG. 11 (i.e. the processing in FIG. 12) so the description thereof will also be omitted.

In step S404, difference file group processing (restoring the previous synchronizing state) is performed. That is to say, this is processing to perform adding/deleting of content files Fct as described above in order to restore the previous synchronizing state.

Figure 16:
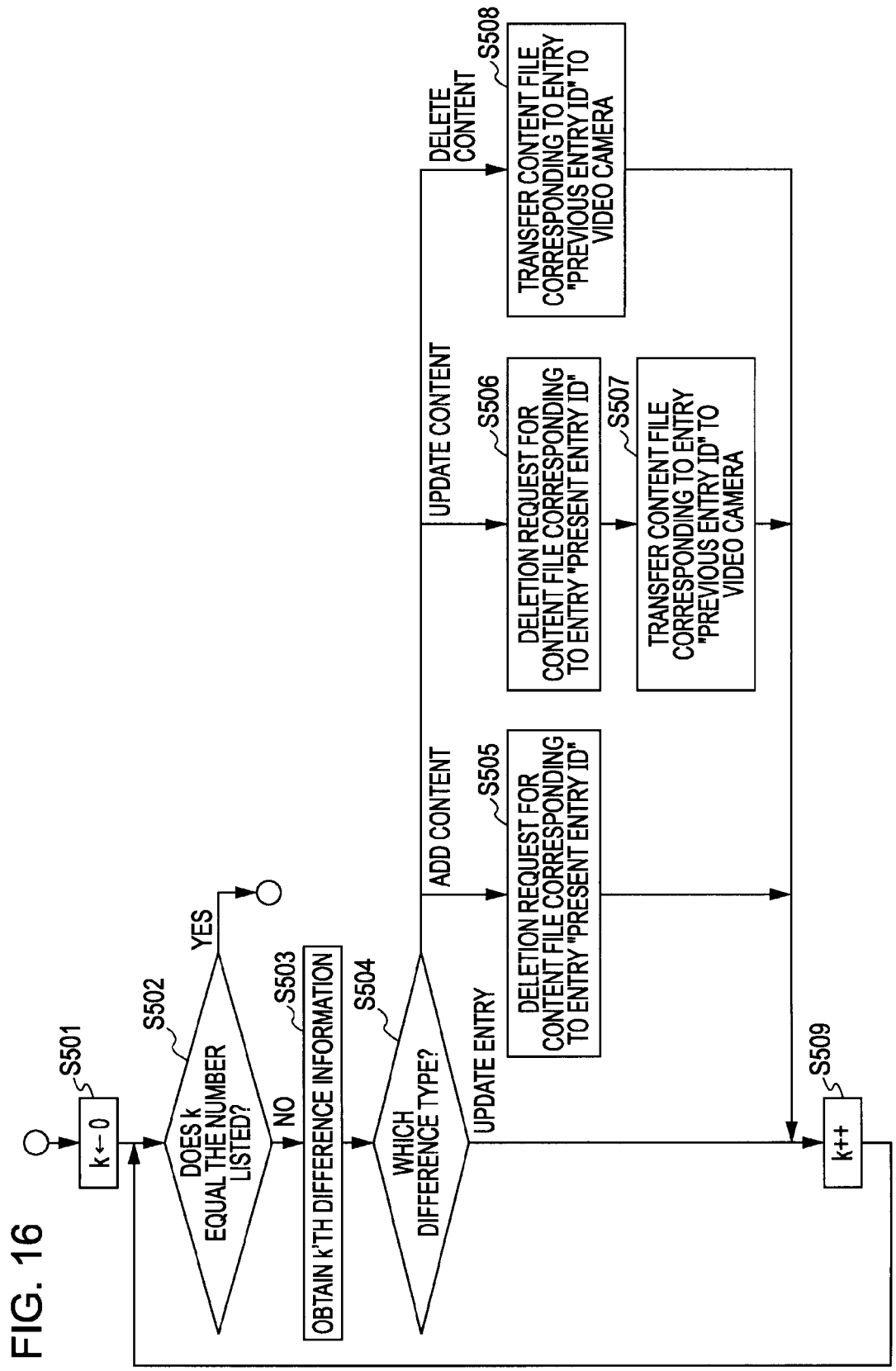
FIG. 16 is a flowchart illustrating difference file group processing (restoration of the state at the time of previous synchronizing)

FIG. 16 shows specific processing content of the difference file group processing (restoring the previous synchronizing state) as step S404. In FIG. 16, first in step S501, the pointer value k is reset to 0. In the following step S502, determination processing is performed as to whether or not the pointer value k matches the list count (the list count of the differential information SB in the difference information list LSB).

In the event that negative results are obtained in step S502 that the pointer value k does not match the list count, the k'th difference information is obtained in step S503. That is to say, the difference information SB shown with the pointer value k is obtained. Following this, the difference type stored within the obtained difference information SB is determined in the next step S504.

As described above, the processing according to the difference type in this case has opposite content from the case of synchronizing processing.

First, in step S505 wherein "content added" is determined, a delete request for the content file equating to the entry of "present entry ID" is performed. That is to say, a deleting request is performed for the content file Fct specified with the "present entry ID" within the obtained difference information SB as to the digital video camera 1 side. Thus, the content file Fct which did not exist during the previous synchronization is deleted on the digital video camera 1 side, whereby at this point the previous synchronizing state has been restored.

When this deleting request is performed, upon incrementing the pointer value k in step S509 as shown in the drawing, the flow is returned to the previous step S502.

Also, in step S506 wherein "content updated" is determined, a deleting request for the content file equating to the entry of "present entry ID", as with the previous step S505, is performed. Following this, in the next step S507, processing is performed to transfer the content file equating to the entry of "previous entry ID" to the video camera side.

Thus, regarding the content file Fct wherein content updating has been performed, the content file Fct after updating is deleted, and the content file Fct before updating which existed during the previous synchronizing held on the PC 20 side is transferred instead to the digital video camera 1 side and recorded thereto. That is to say, at this point the previous synchronizing state has been restored.

Note that for clarification, in the event of transferring the content file Fct recorded in the HDD 30 from the PC 20 side to the digital video camera 1 side, the CPU 21 controls the HDD 30 to read out the relevant content file Fct, while also performs control as to the USB interface 23 so that the read out content file Fct is transferred to the digital video camera 1 side.

Following executing the processing in the above step S507, upon the flow advancing to step S509 and incrementing the pointer value k, the flow is returned to step S502.

Also, in step s508 wherein "content deleted" is determined, as with the step S507 above, processing is performed to transfer the content file equating to the entry of the "previous entry ID" to the video camera side. Thus, the content file Fct deleted on the digital video camera 1 side between the previous synchronizing to the present synchronizing is restored.

Following executing the processing in the above step S508, upon the flow advancing to step S509 and incrementing the pointer value k, the flow is returned to step S502.

Note that in the case shown in the drawing, in the event that "entry updated" is determined, following the incrementing processing in step S509, the flow is returned to step S502 and particular processing is not performed.

However, as described above, in the case of metadata managed on the PC 20 side also, for example, this can also be seen as restoration.

Specifically, updating processing is performed such that the content of the metadata within the entry data (within the management file slot Sm) wherein "present entry ID" is stored in the index file Findex which is newly transferred from the digital video camera 1 side becomes the content of the metadata managed as associated with the content file Fct specified by the "previous entry ID" by the PC side management information 30b.

Also in the described step S502, in the case that affirmative results are obtained that the pointer value k matches the list count, the flow is advances to step S405 in the previous FIG. 15. That is to say, the processing operations shown in this drawing are ended.

Returning to FIG. 15, in step S405, processing is performed to replace the index file on the video camera side with the previously backed-up index file. That is to say, the index file Findex saved during the previous synchronizing (synchronizing processing performed immediately prior) held in the HDD 30 is transferred to the digital video camera 1 side, and instructions are given so as to overwrite and save this in the index file Findex held in the HDD 14.

Thus, the index file Findex with the information content matching the storage state of the restored content file Fct can be recorded in the HDD 14. That is to say, on the digital video camera 1 side, the restored content group can be accurately managed as having been recorded in the HDD 14.

3. Third Embodiment

3-1. Back-up Processing as Third Embodiment

Next the back-up processing of the third embodiment will be described. The back-up processing in the third embodiment differs from the synchronizing processing in the case of the first embodiment, and performs save-all-contents processing wherein all of the content files Fct which are added (recorded) on the digital video camera 1 side and subjected to saving on the PC 20 side in the past are saved.

Note that in the third embodiment also, the configuration of the digital video camera 1 and personal computer 20 are similar to the case of the first embodiment, so the description herein will be omitted. However, processing different from the synchronizing processing of the first embodiment is executed in this case, so the content of the back-up processing program 30*a* to be stored in the HDD 30 is changed.

Also, with the third embodiment as well, the generating operations for the difference information generating information Rdy are similar to that described with the first embodiment, so the description thereof will not be performed again here.

Figure 17:
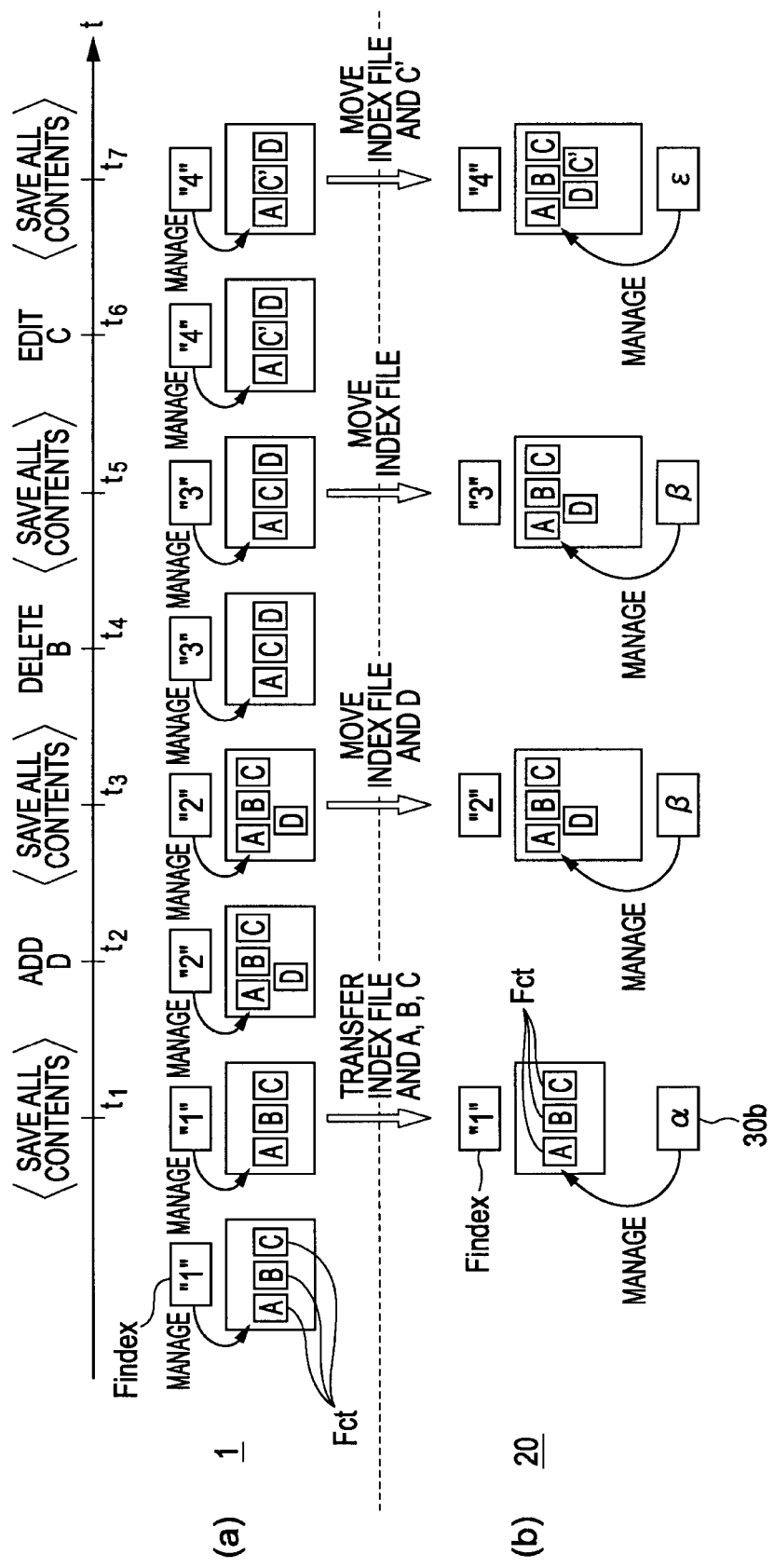
FIG. 17 is a drawing schematically illustrating back-up processing (save all contents) according to a third embodiment.

FIG. 17 is a schematic drawing showing the back-up processing for the third embodiment (save all contents). With FIG. 17 also, as with the previous FIGS. 7 and 14, (a) in FIG. 17 shows the state transition of the index file Findex and content file Fct recorded in the HDD 14 on the digital video camera 1 along the time axis t, and (b) in FIG. 17 shows the state transition of the index file Findex, content files Fct, and PC side management information 30*b* recorded in the HDD 30 on the personal computer 20 along the same time axis t.

In this case also as shown in the drawing, let us say that the content files "A", "B", "C" are recorded in the digital video camera 1 side shown in (a) in FIG. 17 as an initial state, and the index file Findex has recorded therein the content "1" in accordance with the storage state thereof.

At point-in-time t1, in this case also, save-all-contents processing is performed in accordance with instructions from a user operation or the like, for example.

At the point-in-time t1, the content file Fct is not stored on the PC 20 side, whereby all of the content files Fct held on the digital video camera 1 side and the index file Findex are transferred and recorded in the HDD 30. That is to say, with the back-up processing at point-in-time t1, the content files "A", "B", "C" are subject to saving on the PC 20 side.

Note that the information content of the index file Findex according to the storage state of the content files "A", "B", "C" is "1" in this case, and the information content of the PC side management information 30*b* according to the same storage state is "α".

Let us say that after the saving processing of all the content, at point-in-time t2, the content file "D" is newly added on the digital video camera 1 side. The information content of the index file Findex in accordance therewith becomes "2" in this case.

Further let us say that at point-in-time t3, the digital video camera 1 side and personal computer 20 side are connected again so as to be capable of data communication, and instructions are given to save all content. In this case, the content file "D" becomes "content added", whereby the content file "D" becomes a file subject to saving to the PC 20 side. Accordingly, in accordance with the instructions to save all content in this case, the content file "D" and the index file Findex are transferred from the digital video camera 1 side, and respectively recorded in the HDD 30.

Note that the information content of the PC side management information according to the storage state of the content files "A", "B", "C", "D" become "β" in this case.

As long as the content file Fct is newly added on the digital video camera 1 side as described above, the operations are the same as the case of the saving process for all content. In this case when the content file Fct is deleted or updated on the digital video camera 1 side, operations differing from the case of synchronizing processing are performed.

For example, after the content file "B" is deleted on the digital video camera 1 side at the next point-in-time t4 as shown in the drawing, the saving process for all content performed at point-in-time t5 is as follows. Note that the information content of the index file Findex in accordance with the storage state of the content files "A", "C", "D" which accompany the deleting of the content file "B" is "3".

The save-all-contents processing at point-in-time t5 only transfers the index file Findex held on the digital video camera 1 side and records this in the HDD 30, and no adding/deleting of content files Fct is performed. That is to say, with such "content added" only back-up processing of the index file Findex to be compared as previous information is performed at the next save-all-contents processing.

Thus, the content file "B" subjected to saving on the PC 20 side in the past can be saved on the PC 20 side.

Also, let us say that after the save-all-contents processing is performed at the point-in-time t5, content correction of the content file "C" is performed on the digital video camera 1 side at point-in-time t6, and the content file "C" is updated to content file "C'". The information content of the index file Findex according to the storage states of the content files "A", "C'", "D", in accordance with the updating, becomes "4". The save-all-contents processing performed at the next point-in-time t7 is as below.

That is to say, with such "content updating", the newly updated content file "C'" becomes subject to saving, so the content file "C'" is transferred and recorded in the HDD 30. In this case, the content file "IC" which is a file prior to updating is not deleted on the PC 20 side. That is to say, the content file "C" subjected to saving on the PC 20 side in the past can be continually saved on the PC 20 side.

Note that at the point-in-time t7, the index file Findex (information content "4") which is held on the digital video camera 1 side is saved on the PC 20 side, and the index file Findex, which is to be the previous information at the next save-all-contents processing, is backed-up.

Also, the information content of the PC management information 30*b* is updated to "ε" as shown in the drawing, in accordance with the storage states ("A", "B", "C", "C'", "D") of the content files Fct on the PC 20 side at the point-in-time t7.

The handling of the difference type="entry updated" in the save-all-contents processing follows the case of the previous synchronizing processing.

With the save-all-contents processing as described with FIG. 17, the content file Fct subjected to saving on the PC 20 side in the past can all be saved on the PC 20 side.

Also, an arrangement may be made wherein only the difference file is to be actually transferred in this case, enabling higher speed of save-all-contents processing compared to the case wherein the entire contents are overwritten and copied. Also, since the content files Fct to be transferred are reduced, the processing load can also be reduced.

Also, the difference information SB in this case is generated by comparing the content of the index files Findex from previous and present back-ups, so the difference information SB can be obtained that much faster, whereupon the save-all-contents processing can be performed at a faster speed from this perspective as well.

Further, in this case also, difference information SB is obtained by comparing the content of the index files Findex wherein file-related information other than file identifiers such as content update date-and-time are entered, so difference types other than content adding/deleting such as "content updated" or "entry updated" can be obtained simply by comparing the management information. Thus, in the event of determining a difference type other than content adding/deleting, determination of these difference types can be made by comparing the management information, whereby processing according to such difference types other than content adding/deleting (back-up processing for a "content updated" file in this case) can be performed at a faster speed.

3.2 Processing Operation

Figure 18:
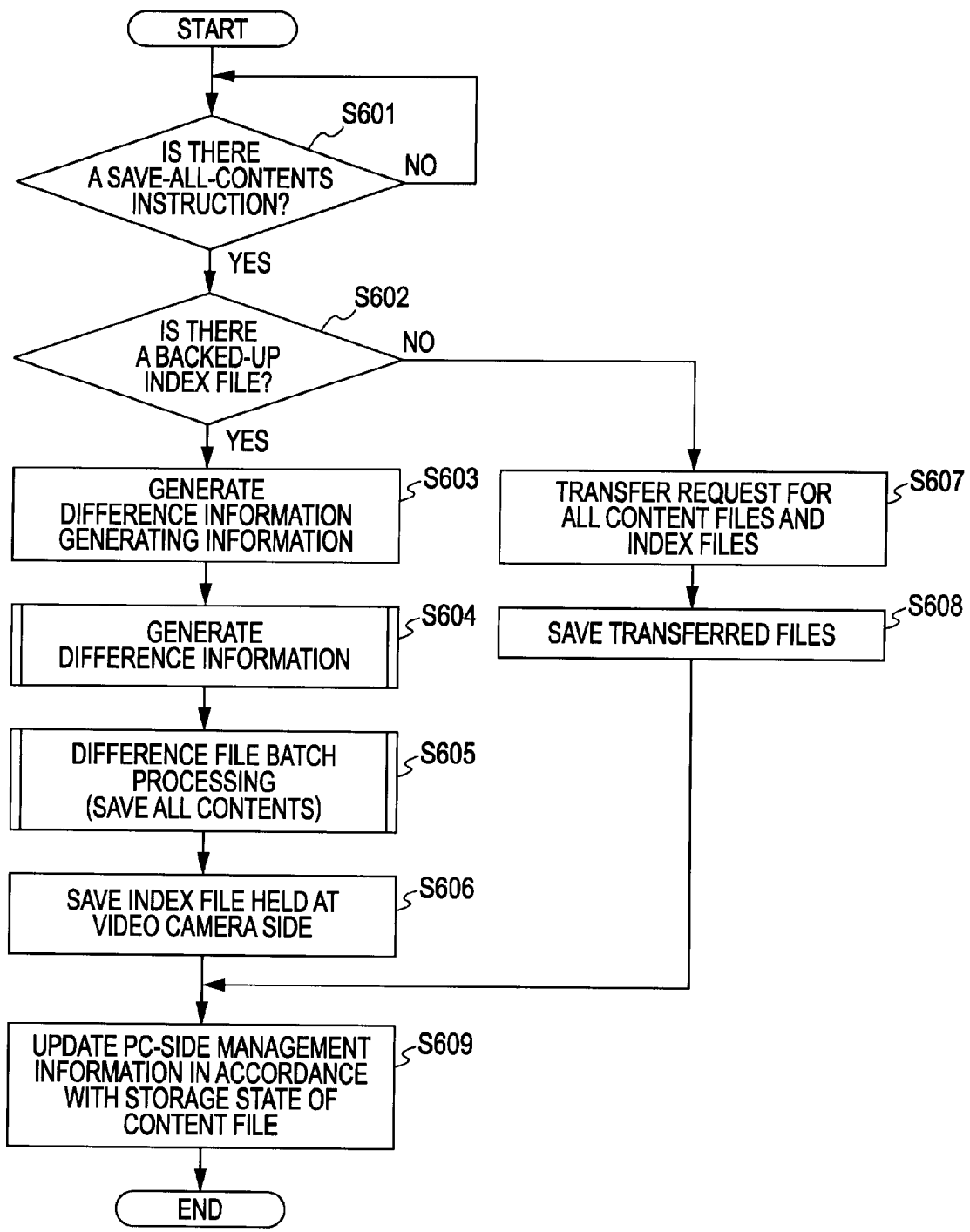
FIG. 18 is a flowchart illustrating processing operations to be performed for realizing the save-all-contents processing according to the third embodiment.

FIG. 18 is a flow chart showing the processing operations for realizing the save-all-contents processing as described above.

Note that in FIG. 18 also, the digital video camera 1 side and personal computer 20 side are in a state of being connected so as to be capable of data communication. Also, the processing operation in this case is shown only for the personal computer 20 side, but the processing operation for the digital video camera 1 side is only processing to transfer the content files Fct and index file Findex in accordance with the transfer request from the PC 20 side, so the description thereof will be omitted here.

Also, the processing operation shown in FIG. 18 (and in FIG. 19 to be described later) is executed by the CPU 21 based on the back-up processing program 30a.

With FIG. 18, first in step S601, saving instructions for all content is awaited. That is to say, for example in this case, the saving instructions for all content is performed by a user operating a mouse on the input unit 25 to click a predetermined icon on the screen, and the step S601 according thereto is processing to await the operation as to the predetermined icon.

In the case that affirmative results are obtained that there are saving instructions for all content, determining processing is performed as to whether or not there is a backed-up index file in step S602. That is to say, determining processing is performed as to whether or not the backed-up index file Findex from the digital video camera 1 side is already saved in the HDD 30.

Note that, in the case that negative results are obtained in step S602 that there is no backed-up index file, the processing flow of steps S607→S608→S609 is similar to the steps S107→S108→S109 in the case of the synchronizing processing described with FIG. 11. That is to say, even in the case of thus save-all-contents processing, all of the content files Fct held on the digital video camera 1 side and the index file Findex showing the management state thereof is backed-up on the PC 20 side at the initial processing.

Also, in the above step S602, in the event that affirmative results are obtained that there is an already backed-up index file, processing is performed to generate difference information generating information in step S603. The processing for step S603 is similar to step S103 with the previous FIG. 11, so the description thereof will be omitted. While omitted from the drawing in this case, as with step S103, the processing in step S603 includes processing to perform a transfer request for in index file Findex on the digital video camera 1 side and processing to temporarily hold the index file Findex transferred according to the relevant transferring request to generate difference information generating information Ryd.

In the next step S604, generating processing for difference information is performed. The generating processing of the difference information of step S603 is the same as the step S104 shown in FIG. 11 (i.e., the processing shown in FIG. 12), and thus will be omitted.

In step S605, difference file group processing (saving all content) can be performed.

Figure 19:
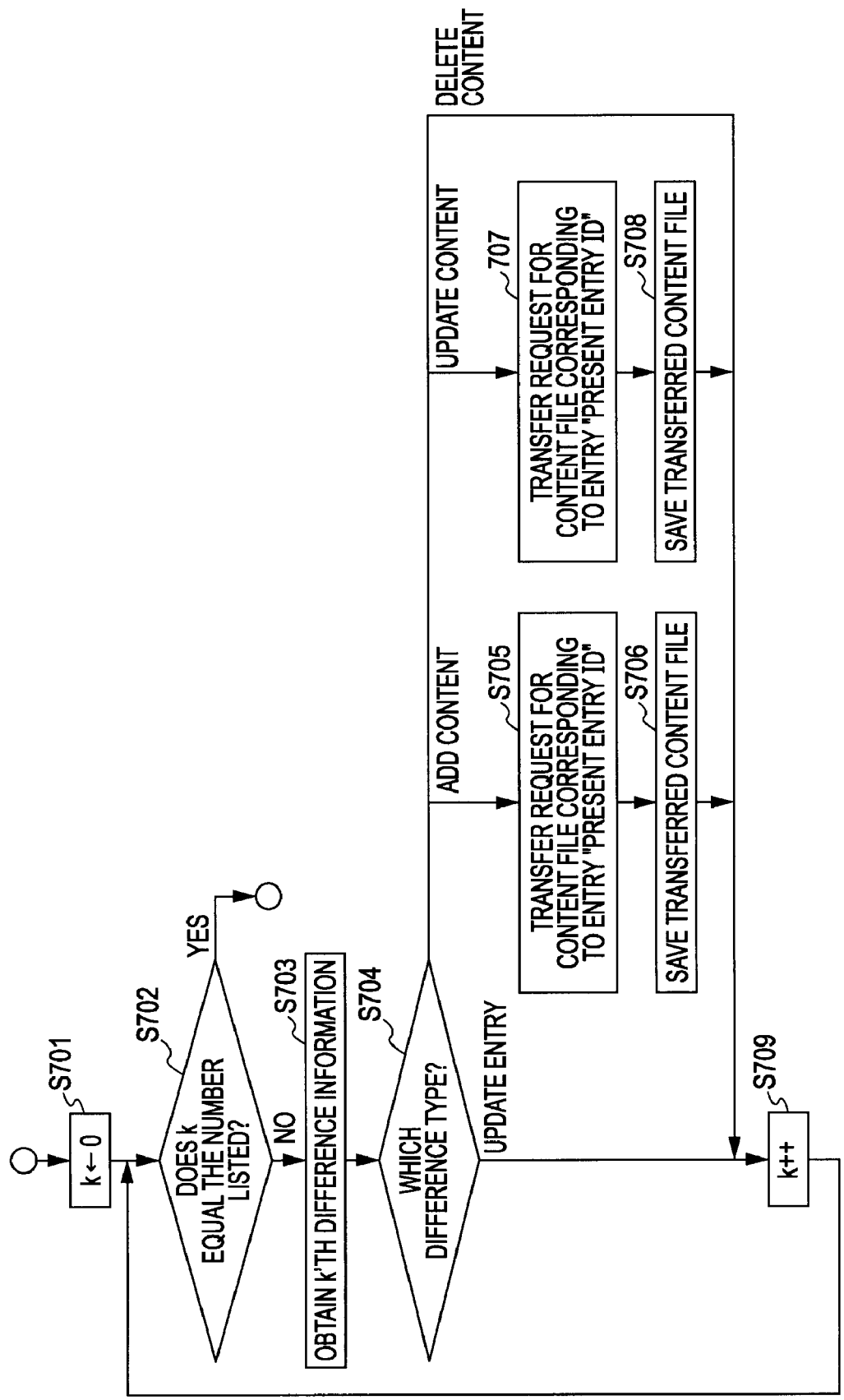
FIG. 19 is a flowchart illustrating what is being processed in difference file group processing (save all contents)

FIG. 19 shows specific processing content of the difference file group processing (saving all content) in the above step S605. In FIG. 19, the processing in steps S701, S702, S703, S704 are similar to the processing in steps S301, S302, S303, S304 respectively, which are described with the first embodiment above (FIG. 13). Accordingly, the description here will be omitted.

In this case, the processing operations obtained as a result of the determining process for the difference types in step S704 are as follows.

First, in step S705 wherein "content added" is determined, a transfer request is performed for the content file equating to the "present entry ID" entry. In the following step S706, the transferred content file is saved. That is to say, with this processing, as with the case of the synchronizing processing, the content added to the digital video camera 1 side is also added to the PC 20 side.

Upon the saving processing in step S706 being executed, after the pointer value k is incremented in step S709, the flow is returned to step S702.

Also, in step S707 wherein "content updated" is determined, a transfer request is performed for the content file equating to the "present entry ID" entry. In the following step S708, the transferred content file is saved.

Thus, the content file Fct whereupon updating of content has been performed on the digital video camera 1 side can be added to the PC 20 side. Thus, as opposed to the case of the synchronizing processing, the file prior to updating is not deleted, according to the "content updated", so the relevant file prior to updating which has been subject to saving in the past can be continually saved on the PC 20 side.

Even after the saving processing in step S708 is executed, upon the flow advancing to step S709 and the point value k being incremented, the flow is returned to step S702.

Also, in the case that "content deleted" is determined, upon the flow advancing to step S709 and the point value k being incremented as shown in the drawing, the flow is returned to step S702. Thus, the content file Fct deleted on the digital video camera 1 side can be continually saved on the PC 20 side, without performing any particular processing for "content deleted".

Note that as described above, the handling in the case that the difference type "entry updated" is determined follows the case of the previous synchronizing processing (FIG. 13).

In the case that affirmative results are obtained in step S702 that the pointer value k matches the list count, the flow is advanced to step S606 in the previous FIG. 18. That is to say, the processing operations shown in this drawing are ended.

With FIG. 18, in the above-mentioned step S606 and the following step S609, processing similar to step S106 and S109 shown in the previous FIG. 13 are performed. That is to say, first in step S606, an index file Findex held on the video camera side is saved. Therefore the "index file Findex from previous back-up" is saved with the next save-all-contents processing. Also, in step S609, processing is executed to update the PC side management information according to the content file storage situation. Thus on the PC 20 side, the content file Fct held in the current HDD 30 can be accurately managed as a file stored in the HDD 30.

4. Fourth Embodiment

4-1. Back-Up Processing of Fourth Embodiment

The fourth embodiment is to perform back-up processing wherein the synchronizing processing and save-all-contents processing which have been described up to now are combined.

Note that for the fourth embodiment also, the configuration of the digital video camera 1 and personal computer 20 are similar as the case of the first embodiment, so the description thereof will be omitted here. However, in this case also, processing differing from the synchronizing processing in the first embodiment is executed, so the content on the back-up processing program 30*a* stored in the HDD 30 is changed.

Also, with the fourth embodiment also, the generating operation for the difference information generating information Rdy is similar to that described with the first embodiment so will not be described again.

Figure 20:
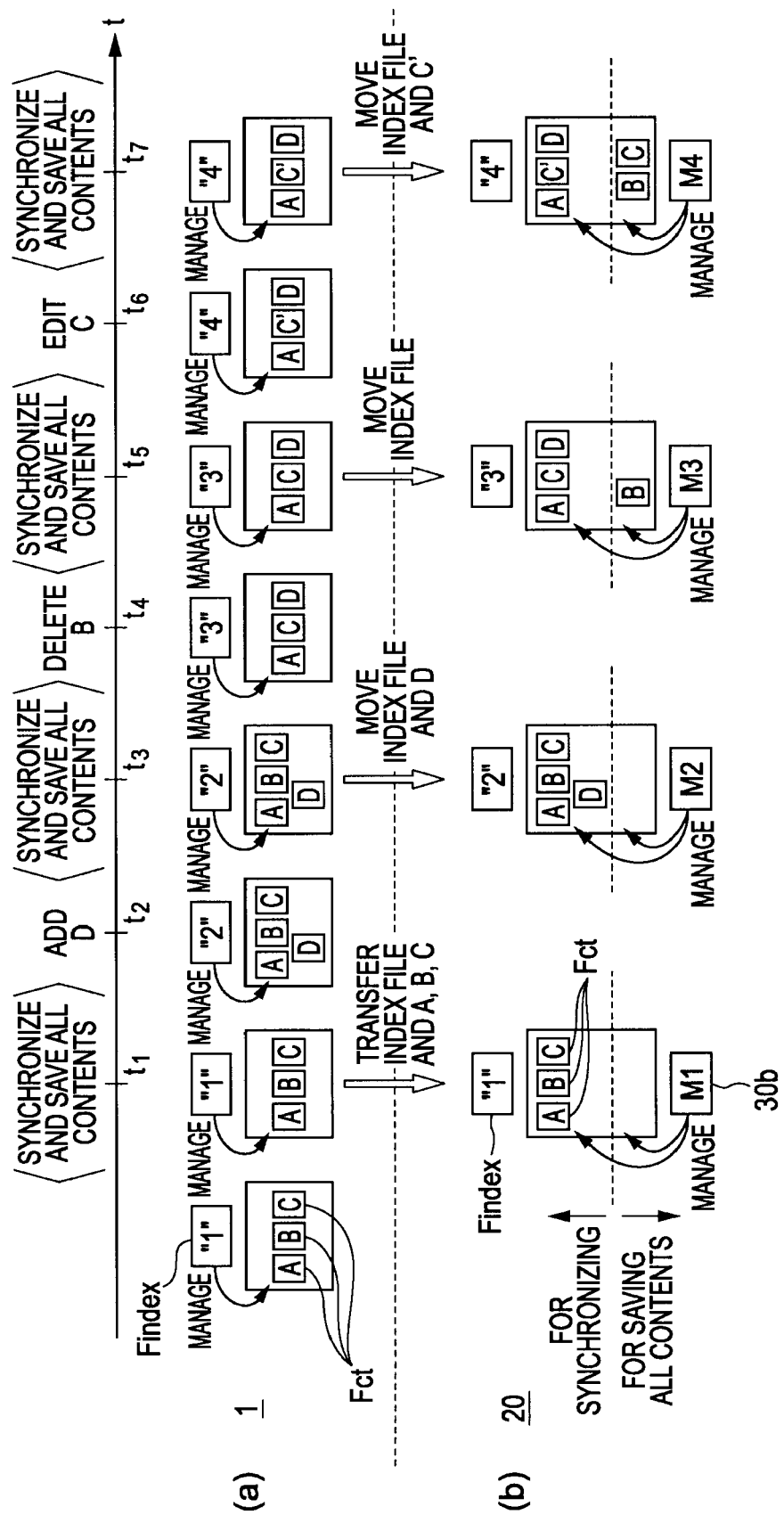
FIG. 20 is a drawing schematically illustrating back-up processing (synchronize and save all contents) according to a fourth embodiment.

FIG. 20 is a schematic drawing showing the back-up processing (synchronizing and saving all contents) of the fourth embodiment. With FIG. 20 also, as with the previous FIGS. 7, 14, and 17, (a) in FIG. 20 shows the state transition of the index file Findex and content file Fct recorded in the HDD 14 on the digital video camera 1 along the time axis t, and (b) in FIG. 20 shows the state transition of the index file Findex, content files Fct, and PC side management information 30*b* recorded in the HDD 30 on the personal computer 20 along the same time axis t.

As shown in the drawing, in this case also let us say that the content files "A", "B", "C" are recorded on the digital video camera 1 side shown in (a) in FIG. 20 as an initial state, and the index file Findex is recorded having content of "1" according to the storage state thereof.

At point-in-time t1, in accordance with instruction such as user operations or the like for example in this case, synchronizing and save-all-contents processing are performed.

Let us say that the synchronizing and save-all-contents processing is a function added as an optional mechanism to the synchronizing processing for example. That is to say, let us say that, using a setting menu in advance, a selection can be made regarding synchronizing as to whether simply synchronizing processing will be performed or synchronizing and save-all-contents processing will be performed, and under the condition that the synchronizing and all content saving processing has been selected, synchronizing processing is performed, whereby the synchronizing and save-all-contents processing shown in the drawing can be executed.

In this case, "synchronizing and saving instructions for all content" refers to synchronizing instructions under the condition of having selected "synchronizing and saving for all content" with a selection menu or the like, for example.

At the point-in-time t1 in FIG. 20, the content file Fct is not stored on the PC 20 side, so all of the content files held on the digital video camera 1 side and also the index file Findex, are transferred to record in the HDD 30. That is to say, with the synchronizing and save-all-contents processing, the content files "A", "B", and "C" are subject to saving on the PC 20 side.

Note that the information content of the index file Findex according to the storage sate of the content files "A", "B", "C" is "1".

However, the information content of the PC side management information 30*b* according to the same file storage information in this case is not "α" but rather (M1).

In the case of the synchronizing and save-all-contents processing, the content file Fct synchronized with the digital video camera 1 side and the content file Fct other than that synchronized along with the save-all-contents processing and saved in the HDD 30 is managed separately on the PC 20 side.

Therefore, a theoretical configuration of the HDD 30 on the PC 20 side may have a region for managing the content file Fct which is synchronized with the storage state of the digital video camera 1 side as "for synchronizing", and a region for managing the content file Fct other than synchronized which is saved along with the save-all-contents processing as "for saving all content", as shown in (b) in FIG. 20.

Thus, by separately managing the content files Fct as "for synchronizing" and "for saving all content", only displaying a menu for content files Fct which are synchronized with the digital video camera 1 side, for example, or providing a list of content files Fct saved for saving all content to the user as necessary, can be performed at the PC 20 side, for example.

With the synchronizing and save-all-contents processing at point-in-time t1, the files storage state on the PC 20 side becomes synchronized with the digital video camera 1 side, so the information content of the PC side management information 30 is updated so that all of the content files Fct saved in the HDD 30 are managed as "for synchronizing".

Note that as can be understood from the above description, the "synchronizing and save-all-contents processing" is simply dividing and managing the content files Fct saved on the PC 20 side as "for synchronizing" and "for saving all content", and the processing itself for the content files Fct and index file Findex perform similar processing as the case of save-all-contents processing on the previous third embodiment. This can also be understood when, compared to the storage state transitions of the same content files Fct and index file Findex on the digital video camera 1 side as shown in (a) in FIG. 20 and (a) in FIG. 17, the transition of the content files Fct and index file Findex saved on the PC 20 side is the same as the cases with (b) in FIG. 20 and (b) in FIG. 17.

Thus, the processing itself of the content files Fct at the following point-in-time t2 through point-in-time t7 are similar to the case in FIG. 17 so the description thereof will be omitted here, and only the differing points will be described.

Let us say that first, at point-in-time t2, a content file "D" is newly added on the digital video camera 1 side, and at the following point-in-time t3, the digital video camera 1 side and personal computer 20 side are connected again so as to be capable of data communication, and instructions are given again for synchronizing and saving all content. In this case, the relevant added content file "D" is transferred and saved on the PC 20 side, but as long as content files Fct are being added thus, the situation continues wherein the content files storage state on the digital video camera 1 side and the content file storage state on the PC 20 side are synchronized, so the PC side management information 30*b* is updated such that the content files "A", "B", "C", "D" held on the PC 20 side are all managed as "for synchronizing". The information content of the PC side management information 30*b* after updating becomes "M2" as shown in the drawing.

As we can see from this, with the synchronizing and saving process for all content, the content files Fct which are "content added" simply all need to be managed as "for synchronizing". Thus the content files Fct which are synchronized with the digital video camera 1 side and PC 20 side (held together) can be managed accurately as "for synchronizing".

In this case also, the storage states of the content files Fct at the digital video camera 1 side and the personal computer 20 side differ when the back-up processing is performed after the content files Fct are deleted or updated at the digital video camera 1 side.

That is to say, according to the synchronizing and save-all-contents processing at point-in-time t5 after the content files "B" is deleted on the digital video camera 1 side at point-in-time t4, as shown in the drawing, the content file "B" continues to be saved without being deleted at the PC 20 side from the perspective of saving all content, but the storage states of the content files Fct on the digital video camera 1 side and PC 20 side differ from one another. That is to say, in this case, instead of "for synchronizing", the content file "B" is a content file Fct which should be managed as "for saving all content". Thus, the content in the PC side management information 30*b* is updated so as to manage the content files Fct which are "for saving all content" as "for saving all content (information content "M3" in the drawing).

Thus, with the synchronizing and save-all-contents processing with the fourth embodiment, in the case that the difference type "content deleted" is determined, the content file Fct can be determined as a file to be managed as "for saving all content". Accordingly, in the case that "content deleted" is determined, the PC side management information 30*b* is updated so that this content file Fct is managed as "for saving all content".

Also, let us say that after the synchronizing and save-all-contents processing is performed at point-in-time t5, the content correction of content file "C" is performed on the digital video camera 1 side at point-in-time t6 and updated to content file "C'".

Then let us say that synchronizing and save-all-contents processing is performed again at point-in-time t7.

In accordance thereto, as described with the previous FIG. 17 also, the content file "C'" after updating which is held on the digital video camera 1 side is transferred and saved on the PC 20 side. Accordingly, the content file "C" before updating which remains on the PC 20 side instead of being deleted becomes a file "for saving all content" instead of "for synchronizing". Therefore, the PC side management information 30*b* is updated so that the relevant content file "C" is managed as "for saving all content" (information content "M4" in the drawing).

In the case that the "content updated" is thus determined, the content file Fct before updating which continues to be saved on the PC 20 side instead of being deleted can be specified as a file to be managed as "for saving all content", whereby the PC side management information 30*b* is updated so that the content file Fct before updating is managed as "for saving all content".

Note that the handling of difference type="entry updated" with the synchronizing and save-all-contents processing follows the case of the previous synchronizing processing.

With the synchronizing and save-all-contents processing such as that described in FIG. 18, the content file Fct subjected to saving on the PC 20 side in the past can be all saved on the PC 20 side. Also, on the PC 20 side, the content file Fct synchronized on the digital video camera 1 side by the PC side management information 30*b* and the content file Fct other than for synchronizing which is saved in accordance with the save-all-contents processing can be managed separately.

Also, an arrangement may be made wherein only the difference file is actually transferred. At this point the synchronizing and save-all-contents processing can be performed at a faster speed. Also, by reducing the content file Fct to be transferred, the processing load can also be reduced.

Also, the difference information SB can be generated by comparing the content of the index files Findex from each of the previous and present back-up, whereby the difference information SB can be obtained that much faster, whereby the synchronizing and save-all-contents processing can be performed at a faster speed.

Further, the content of the index files Fct wherein is entered the file related information other than file identifiers such as the content update date-and-time is compared and difference information SB is obtained, whereby management information can be obtained by comparing difference types other than content adding/deleting such as "content updated" and "entry updated", and processing (in this case, back-up processing of the files which are "content updated") according to the difference type other than content adding/deleting can be performed at a faster speed.

4-2. Processing Operation

Figure 21:
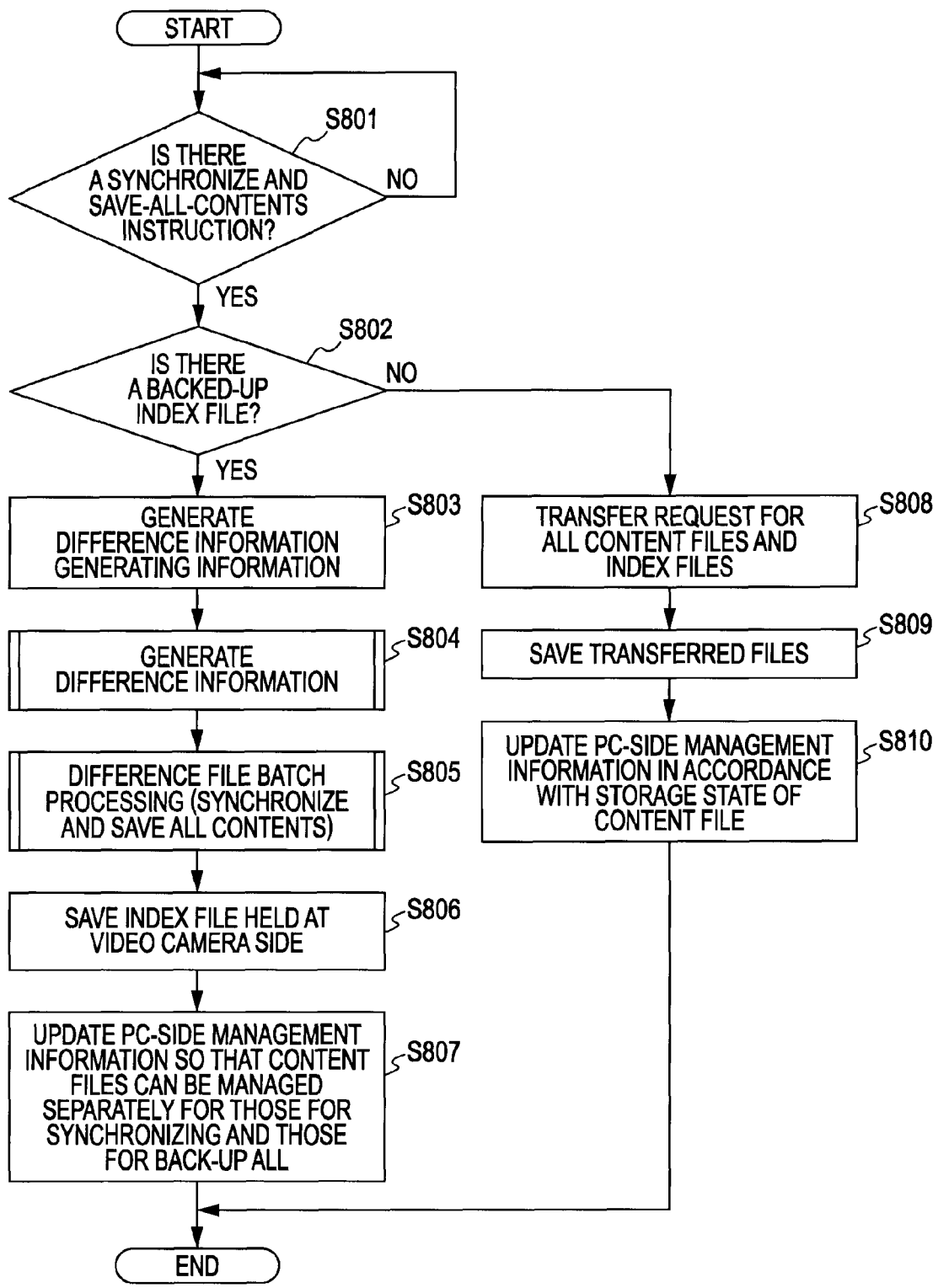
FIG. 21 is a flowchart illustrating processing operations to be performed for realizing the synchronize and save-all-contents processing according to the fourth embodiment.

FIG. 21 is a flow chart showing the processing operation for realizing the synchronizing and save-all-contents processing according to the above description.

Note that in this FIG. 21, the digital video camera 1 side and personal computer 20 side are in a connected state so as to be capable of data communication. Also, in this case the processing operation shows only for the personal computer 20 side, but processing operation for the digital video camera 1 side in this case is only processing to transfer the content files Fct and index file Findex in accordance with the transfer request from the PC 20 side, as with the case in the third embodiment, so the description thereof will be omitted.

Also, the CPU 21 executes the processing operation shown in FIG. 21 (and the later-described FIG. 22) based on the back-up processing program 30*a*.

In FIG. 21, first in step S801 the synchronizing and saving instructions for all content is awaited. As described above, synchronizing and saving instructions for all content is defined as synchronizing instructions while "saving all content" is selected, for example, whereby the step S801 becomes processing to await an operation as to the predetermined icon.

In the case that affirmative results are obtained that there are synchronizing and saving instructions for all content, determining processing is performed in step S802 as to whether or not there is a backed-up index file. That is to say, determining processing is performed as to whether or not the backed-up index file Findex is saved in the HDD 30 from the digital video camera 1 side.

In this case also, the processing flow of steps S808→S809→S810 in the case wherein negative results are obtained in step S802 that there is no backed=up index file is similar to the processing flow of steps S607→S608→S609 in the case of all back-up processing described in the earlier FIG. 18. That is to say, in the case of synchronizing and saving instructions for all content also, all of the content files Fct held on the digital video camera 1 side during initial processing and the index file Findex showing the management state thereof are backed-up on the PC 20 side.

Note that it is clear that the processing flow up to step S810 is synchronizing processing (see steps S107→S108→S109 in FIG. 11). Accordingly in step S810, the PC side management information 30*b* is updated so that all of the content files Fct saved in the HDD 30 are managed as "for synchronizing".

Also, in the case that affirmative results are obtained in step S802 that there is already a backed-up index file, the flow proceeds to step S803.

The steps hereafter of S804 and S806 which include the step S803 are similar to the steps S603 and S606 in the previous FIG. 18, so the description thereof will be omitted. In this case also, although omitted from the drawing, the processing in step S803 includes processing to perform a transfer request for the index file Findex on the digital video camera 1 side and processing to temporarily hold the index file Findex transferred according to the relevant transfer request, to generate difference information generating information Ryd.

The difference file group processing in step S805 (synchronizing and saving for all content) and the updating processing of the PC side management information in step S807, serving as a portion differing from the case of the save-all-contents processing shown in FIG. 18, will be described.

Figure 22:
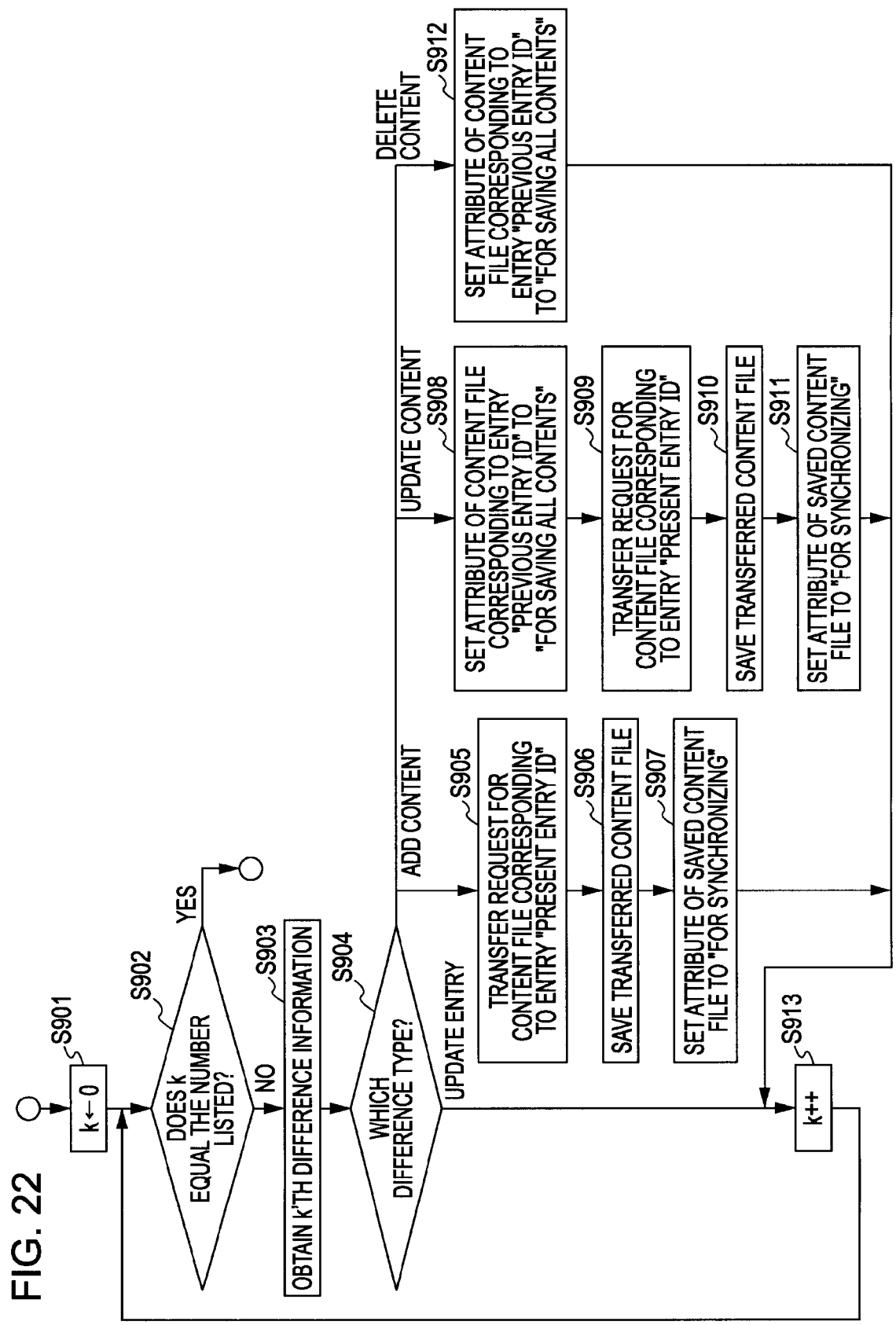
FIG. 22 is a flowchart illustrating what is being processed in difference file group processing (synchronize and save all contents)

FIG. 22 shows specific processing content for the difference file group processing (synchronizing and saving for all content) serving as step S805.

Note that in FIG. 22 the processing in steps S901, S902, S903, S904 are similar to the processing steps S701, S702, S703, S704 described in the previous FIG. 19, so the description thereof will be omitted here. In this case, the processing operations to be performed as a result of the determining processing of the difference type in step S904 are as follows.

First in step S905 wherein "content added" is determined, a transfer request of the content file equating to the "present entry ID" entry is performed. In step S906, the transferred content file is saved. That is to say, the processing up to this point is the same as the save-all-contents processing.

Following this, processing is performed in the following step S907 to set the attribute of the saved content file to "for synchronizing". Thus the attribute of the content file Fct (for synchronizing/for saving all content) can be accurately determined when performing updating processing of the PC side management information in the later step S807 (FIG. 21).

Upon executing the processing in step S907, after the pointer value k is incremented in step S913, the flow is returned to step S902.

Also, in step S908 wherein "content updated" is determined, processing is performed to set the attribute of the content file equating to the "previous entry ID" entry. That is to say, when the difference type="content updated", the content file Fct specified by the "previous entry ID", i.e. the content file Fct prior to updating which is held in the PC 20 side is a file to be "for saving all content".

In the following step S909, a transfer request is performed for the content file equating to the "present entry ID" entry. Also, in the following step S910, the transferred content file is saved. These processes become file moving processes to realize the save-all-contents processing.

Following this, in the next step S911, processing is performed to set the attribute of the saved content file to "synchronizing", as with the previous step S907. That is to say, as described above, the content files Fct newly added and saved on the PC 20 side are to all be "for synchronizing".

After executing the processing in step S911, the flow is advanced to step S913 wherein the pointer value k is incremented, following which the flow is returned to step S902.

Also, in the case that "content deleted" is determined, processing is performed to set the attribute of the content file equating to the "previous entry ID" entry to "for saving all content" in step S912 as shown in the drawing. Thus the attribute of "for saving all content" can be accurately set for the content files Fct which are deleted on the digital video camera 1 side but to be continually saved on the PC 20 side as saving all content.

After step S912, the flow is advanced to step S913 wherein the pointer value k is incremented, following which the flow is returned to step S902.

Note that as described above, the handling in the case that the difference type "entry updated" is determined, this case also follows the case of the previous synchronizing processing (FIG. 13).

In step S902, in the case that affirmative results are obtained as the pointer value k having matched a list count, the flow is advanced to the processing in step S806 as in the previous FIG. 21. That is to say, the processing operation shown in the drawing is ended.

In FIG. 21, processing is performed in step S806 to save the index file Findex having a video camera side, and the "index file Findex for previous back-up" at the next back-up is saved in this case also.

In the following step S807, processing is executed to update the PC side management information so that the content file is managed separately for synchronizing and for saving all content. That is to say, the PC side management information 30b is updated so that the attribute of each content file Fct held in the HDD 30 currently on the PC 20 side becomes the attribute set by the processing in the previous FIG. 22. Thus, each content file Fct thus held in the HDD 30 can be accurately managed separately as "for synchronizing" and "for saving all content".

5. Fifth Embodiment 5-1. Back-Up Processing as Fifth Embodiment

The fifth embodiment is arranged such that, in addition to the synchronizing and save-all-contents processing as described in the fourth embodiment, restoration processing to an arbitrary point-in-time is performed.

The arbitrary point-in-time restoration processing is processing to restore the synchronizing state of an arbitrary time in the save-all-contents processing, from the (synchronizing and) save-all-contents processing performed in the past.

Note that the configuration of the digital video camera 1 and personal computer 20 in the fifth embodiment are the same as the case of the first embodiment, so the description thereof here will be omitted. However, processing is executed in this case which differs from the synchronizing processing in the first embodiment, so the content in the back-up processing program 30a stored in the HDD 30 is changed.

Also, the generating operation itself for the difference information generating information Rdy is generally the same as the description with the first embodiment (differs in the point that the index file Findex to be referenced for generating the discrepancy detection information list LDd-ps from the previous back-up is selectable, as described later) so no description here by way of drawings is made.

Figure 23:
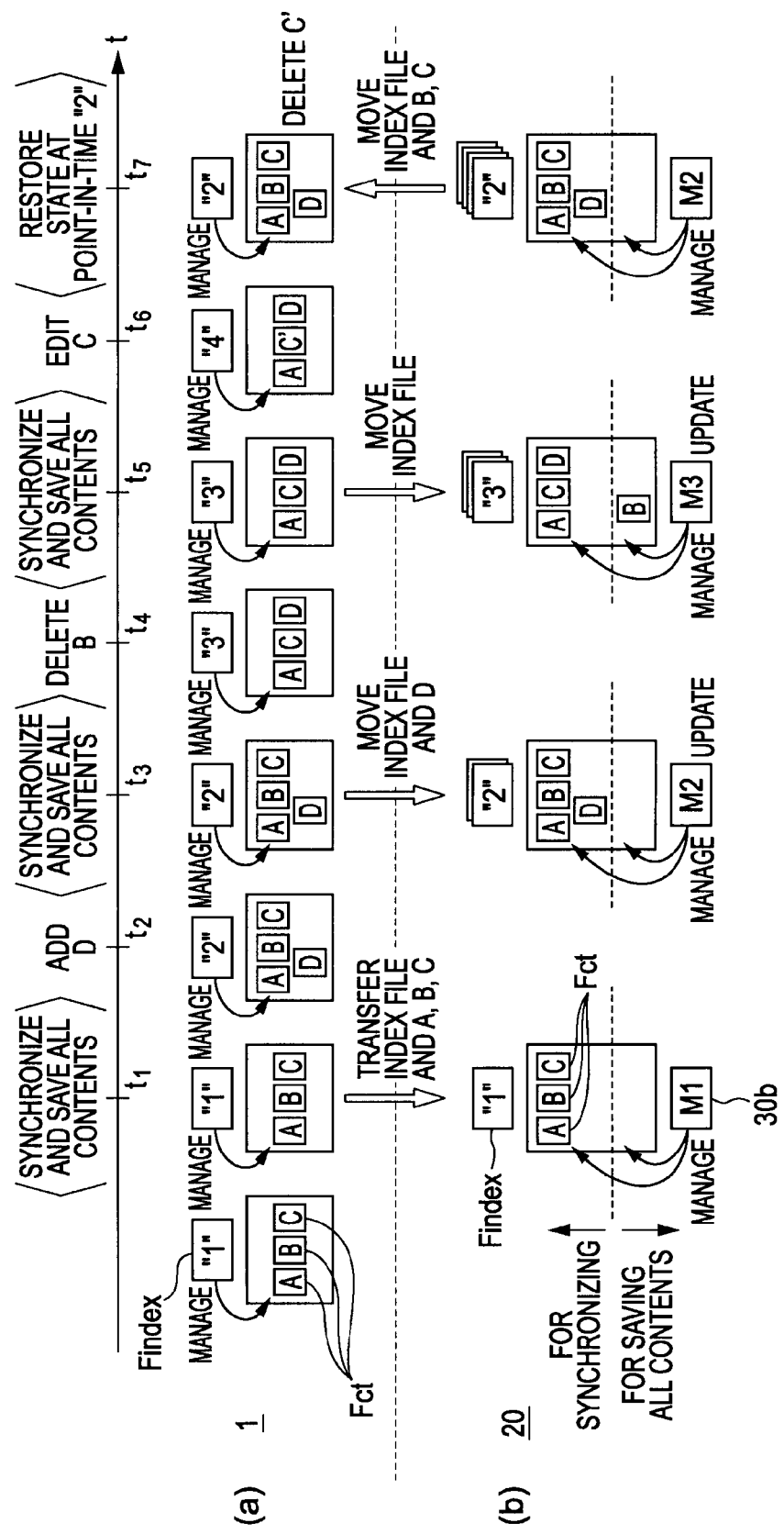
FIG. 23 is a drawing schematically illustrating back-up processing (synchronize and save all contents and restore arbitrary point-in-time) according to a fifth embodiment.

FIG. 23 is a schematic drawing showing the back-up processing of the fifth embodiment (synchronizing and saving all content and arbitrary point-in-time restoration). With FIG. 23 also, as with the previous FIGS. 7, 14, 17, and 20, (a) in FIG. 23 shows the state transition of the index file Findex and content file Fct recorded in the HDD 14 on the digital video camera 1 along the time axis t, and (b) in FIG. 23 shows the state transition of the index file Findex, content file Fct, and PC side management information 30b, recorded in the HDD 30 on the personal computer 20 along the time axis t.

First, as can be seen from comparing the point-in-time t1 through t6 in FIG. 23 and the point-in-time t1 through t6 shown in the previous FIG. 20, with the synchronizing and save-all-contents processing in this case, the synchronizing and save-all-contents processing differs from that in the case of the fourth embodiment, and it is a feature in this case that the index file Findex saved from the digital video camera 1 side at each synchronizing and save-all-contents processing is continually saved.

This is so that the content file storage state at the point-in-time of arbitrary synchronizing and save-all-contents processing can be restored. That is to say, the synchronizing state of an arbitrary point-in-time for synchronizing and save-all-contents processing can be understood from the content of the index file Findex which is transferred from the digital video camera 1 side at the synchronizing and save-all-contents processing, and saved on the PC side. Accordingly in this case, the index file Findex which is transferred from the digital video camera 1 side with a process of synchronizing and save-all-contents processing is associated to the point-in-time for synchronizing and save-all-contents processing on the PC 20 side, and saved therein.

Note that in FIG. 23, other than associating the index files to the point-in-time for each synchronizing and save-all-contents processing, and saving the index file Findex at the respective point-in-time, the transition of the file storage states on both the digital video camera 1 side and PC 20 side at point-in-time t1 through point-in-time t6 are similar to the transition at point-in-time t1 through point-in-time t6 in the previous FIG. 20, so the description thereof will be omitted here.

Updating is performed at point-in-time t6 from the content file "C" to the content file "C'", the content file storage states on the digital video camera 1 side are "A", "C'", "D", and the information content of the index file Findex is "4", whereby we can say that arbitrary point-in-time restoration instructions are performed at the next point-in-time t7.

Note that the restoration instructions in this case also are to be performed according to user operation, for example. The restoration instructions in this case are restoration instructions at an arbitrary point-in-time, so the selection of the point-in-time to be subject to restoration is performed together. The selection of the point-in-time for restoration is also performed according to a user operation, for example.

As shown in the drawing, let us say that restoration instructions are given to specify the point-in-time (i.e. point-in-time 3) for the information content 11211 of the index file Findex for the point-in-time for restoration.

In accordance with such arbitrary point-in-time restoration instructions, first the index file Findex associated with the specified point-in-time for restoration is obtained from the index filed Findex held on the PC 20 side, whereby the content in this index file Findex and the index file Findex held on the digital video camera 1 side are compared and a difference information list LSB is generated.

That is to say in this case, the index file "2" which is associated with the point-in-time t3 and held and the index file "4" held on the digital video camera 1 side are compared, and based on the comparison results thereof the difference information list LSB is generated.

The difference information list LSB generated in this case shows information "content deleted" regarding the content file "B" and "content updated" regarding the content files "C" and "C'".

In this case also in accordance with the "content deleted", as with the case of restoration processing in the second embodiment, the content file Fct specified by the "previous entry ID" (i.e. content file "B" in this case) is transferred from the PC 20 side to the digital video camera 1 side and recorded in the HDD 14.

Also, in accordance with "content updated", also as with the case of the second embodiment, the content file Fct specified by the "previous entry ID" (i.e. content file "C") is transferred from the PC 20 side to the digital video camera 1 side and recorded therein, and further the content file Fct specified by the "present entry ID" (i.e. content file "C'") is deleted on the digital video camera 1 side.

Thus as shown in point-in-time t7 in (a) in FIG. 23, the content file storage state on the digital video camera 1 side is restored to the storage state at the point-in-time t3.

Further, so that the content of the index file Findex on the digital video camera 1 side becomes content according to the restored state, the index file Findex at the point-in-time specified as a point-in-time for restoration (i.e. index file "2") is transferred from the PC 20 side to the digital video camera 1 side, and the index file Findex ("4") held on the digital video camera 1 side is replaced with the index file Findex ("2").

Also, on the PC 20 side, the management state "for synchronizing/for saving all content" in the HDD 30 needs to be updated in accordance with the content file storage state on the digital video camera 1 side which has been changed by the restoration process.

That is to say, the content file "B" which had been managed up to that point as "for saving all content" on the PC 20 side is restored on the digital video camera 1 side, so the PC side management information 30b is updated so that the content file "B" is managed as "for synchronizing".

Thus with the restoration processing in this case, the content file Fct which is "content deleted" becomes a file to be managed as "for synchronizing" in accordance to being restored on the digital video camera 1 side. Accordingly on the PC 20 side in this case, the PC side management information 30b is updated so that the content file Fct which is "content deleted" is changed to be managed from "for saving all content" to "for synchronizing" (information content M2 in the drawing).

Note that regarding the content file "B" wherein "content deleted is determined in this case, after deleting is already performed on the digital video camera 1 side, the synchronizing and save-all-contents processing is performed, and this is reflected on the PC 20 side, whereby the attribute thereof exemplifies the case of "for saving all contents", but regarding a content file Fct deleted from a previous back-up time as seen from the point-in-time wherein restoring instructions are given, such as the content file "D" deleted on the digital video camera 1 side between the points-in-time t6 and t7, for example, the deletion thereof is not reflected on the PC 20 side, and accordingly the attribute of the content file Fct remains as "for synchronizing". That is to say, in such a case, even when the content file Fct is restored on the digital video camera 1 side in accordance with the restoring process, there is no need to set the attribute to "for synchronizing".

However, if we consider a case which needs to be reset from "for saving all content" to "for synchronizing", it becomes appropriate to set the attribute of the content file Fct which is "content deleted" to "for synchronizing". That is to say, the PC side management information 30b is updated so that the content file Fct which is "content deleted" is managed as "for synchronizing".

Also, in the case that "content updated" is determined, the content file Fct before updating is transferred to the digital video camera 1 side and recorded (movement of content file "C" in the drawing), as with the content file Fat which is "content deleted". Thus, the content file Fct before updating in the case that "content updated" is determined (i.e. the content file Fct specified by the "previous entry ID") needs to be updated so as to be similarly managed as "for synchronizing" on the PC 20 side. However, in the case that the update from content file "C" to "C'" is not reflected on the PC 20 side, as in the example in FIG. 23, the content file "C" is managed as "for synchronizing" at the time of synchronizing and save-all-contents processing, so updating again to "for synchronizing" should not be necessary.

However, assuming that the update to the content file "C'" is arbitrary point-in-time restoring processing after being reflected on the PC 20 side (for example in the case that similar arbitrary point-in-time restoring processing is performed after the synchronizing and save-all-contents processing at point-in-time t7 in FIG. 20, the content file "C" before updating is managed as "for saving all contents"), if the content file Fct before updating is not updated to "for synchronizing", the file which should be actually managed as "for synchronizing" will continue to be managed as "for saving all contents".

With this in mind, the management information 30b is updated so that the content file Fct before updating in the case that "content updated" is determined (i.e. the content file Fct specified by "previous entry ID") is managed as "for synchronizing" on the PC 20 side.

Also, regarding the content file Fct after updating in the case that "content updating" is determined (i.e. the content file Fct specified by "present entry ID") in the case that the updating to content file "C'" is not reflected on the PC 20 side as exemplified in FIG. 23, for example, particular processing to manage for synchronizing and for saving all contents is unnecessary, since this content file "C'" is not stored at the CP 20 side.

However, in this case, assuming that the update to the content file "C'" is arbitrary point-in-time restoring processing after being reflected on the PC 20 side as described above, the content file "C'" is managed as "for synchronizing" on the PC 20 side. Accordingly, in the case that the content file Fct after updating when "content updated" is determined is held on the PC 20 side, the need arises to change the attribute thereof from "for synchronizing" as it had been up to that point to "for saving all contents". That is to say, in the case that the content file Fct after updating in the case of "content updated" is held on the PC 20 side, the PC side management information 30b is updated so as to manage this as "for saving all contents".

Although not shown in FIG. 23, in the case that the difference type is "content added", the content file Fct added on the digital video camera 1 side (the content file Fct specified by "present entry ID") can be deleted on the digital video camera 1 side, as with the case in the second embodiment.

The managing for synchronizing and for saving all contents regarding the content file Fct which is "content added" differs in the case wherein the content file Fct added after the point-in-time for restoring is not backed-up on the PC 20 side before restoration processing is performed and the case wherein the content file Fct is backed-up.

In the case of the former, a case can be given wherein an unshown content file "E" is added between the points-in-time t6 and t7 in FIG. 23, for example. In this case, at the point-in-time wherein arbitrary point-in-time restoration instructions are performed at point-in-time t7, the relevant content file "E" is not backed-up on the PC 20 side. Thus it can be seen that regarding a content file Fct which is added after point-in-time for restoration, and which is not backed-up on the PC 20 side before restoration processing is performed, there is no particular processing needed.

However, in the case of the latter, i.e. in the case that the content file "E" is added between the points-in-time t4 and t5 for example, the relevant content file "E" is held on the PC 20 side as "for synchronizing" at the back-up point-in-time for point-in-time t5, but in this case, when restoration to the state in point-in-time t3 is performed with the arbitrary point-in-time restoration processing at point-in-time t7, the content file "E" is to be managed as "for saving all contents". Accordingly, regarding a content file Fct which is added after the point-in-time for restoration and also backed-up on the PC 20 side before restoration processing is performed, the PC side management information 30b is updated to change from "for synchronizing" used so far to "for saving all contents".

With the handling of the difference type="entry updated" with the restore arbitrary point-in-time processing, this follows the case of restoration processing as described with the second embodiment.

Thus according to the fifth embodiment, the synchronizing state at an arbitrary synchronizing and save-all-contents processing can be restored from the synchronizing and processing to save all content performed in the past. Also on the PC 20 side, when such restoration processing is performed, the content files Fct which are synchronized with the digital video camera 1 side and the content files Fct other than synchronized which are saved in accordance with the save-all-contents processing, can be managed separately. Also, in this case also, only the difference file is actually transferred, and at this point the restore arbitrary point-in-time processing can be performed at a faster speed. Also, the content files Fct to be transferred are decreased so the processing load thereof is also decreased.

Also, the difference information SB in this case is generated by comparing the content for the index file Findex at the point-in-time for restoration and the index file Findex from the present back-up, so the difference information SB can be obtained that much faster, and accordingly the restore arbitrary point-in-time processing can be performed at a faster speed.

Further, the content of index file Findex wherein file-related information other than file identifiers such as content updated date-and-time is entered is compared to obtain the difference information SB, whereby difference types other than content adding/deleting such as "content updated" and "entry updated" can also be obtained by only comparing the management information, and the processing (restoration processing for a file which is "content updated" in this case) according to the difference types other than content adding/deleting can be performed at a faster speed.

5-2. Processing Operations

Figure 24:
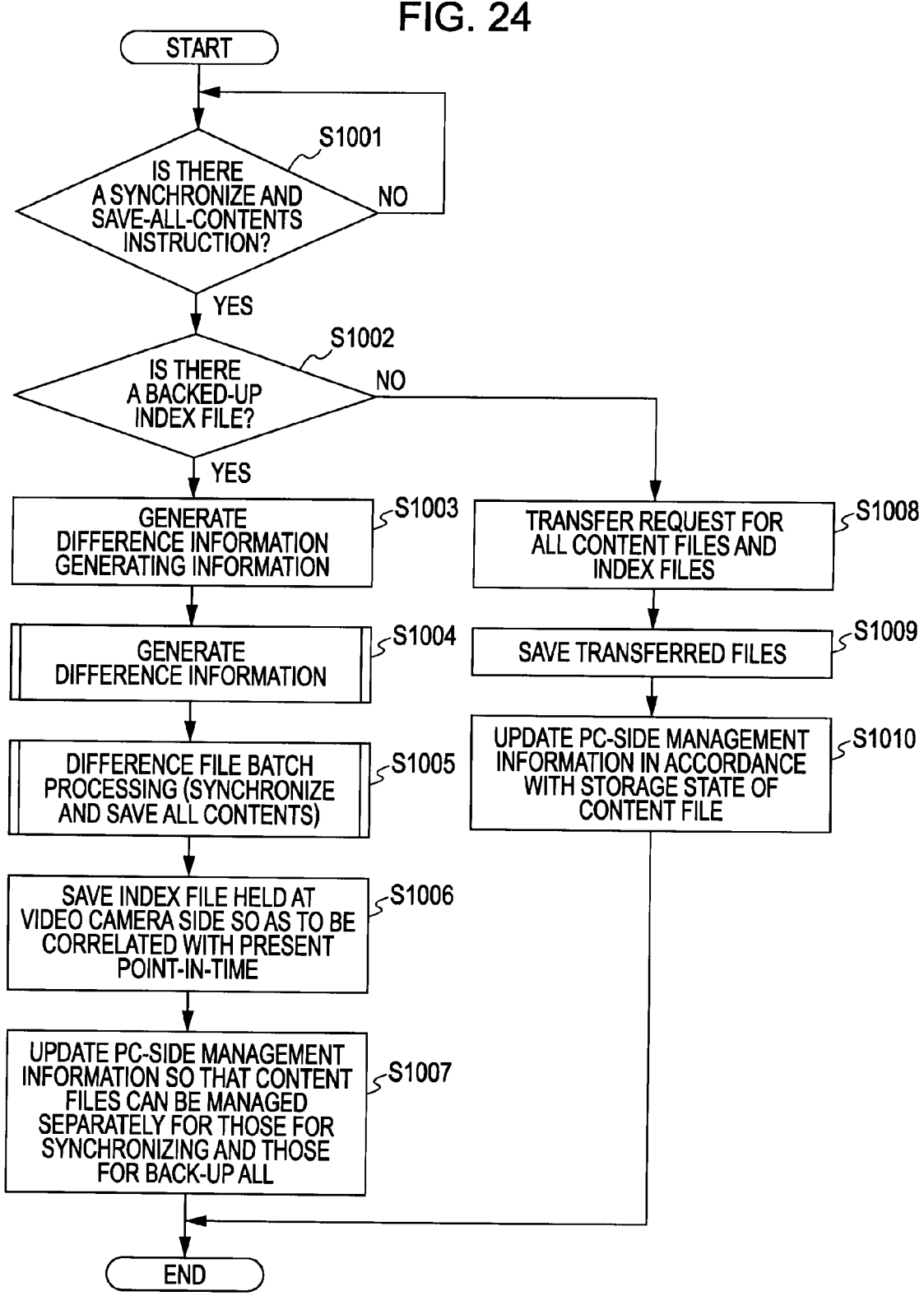
FIG. 24 is a flowchart illustrating processing operations to be performed for realizing the synchronize and save-all-contents and restore-arbitrary-point-in-time processing according to the fifth embodiment.
Figure 25:
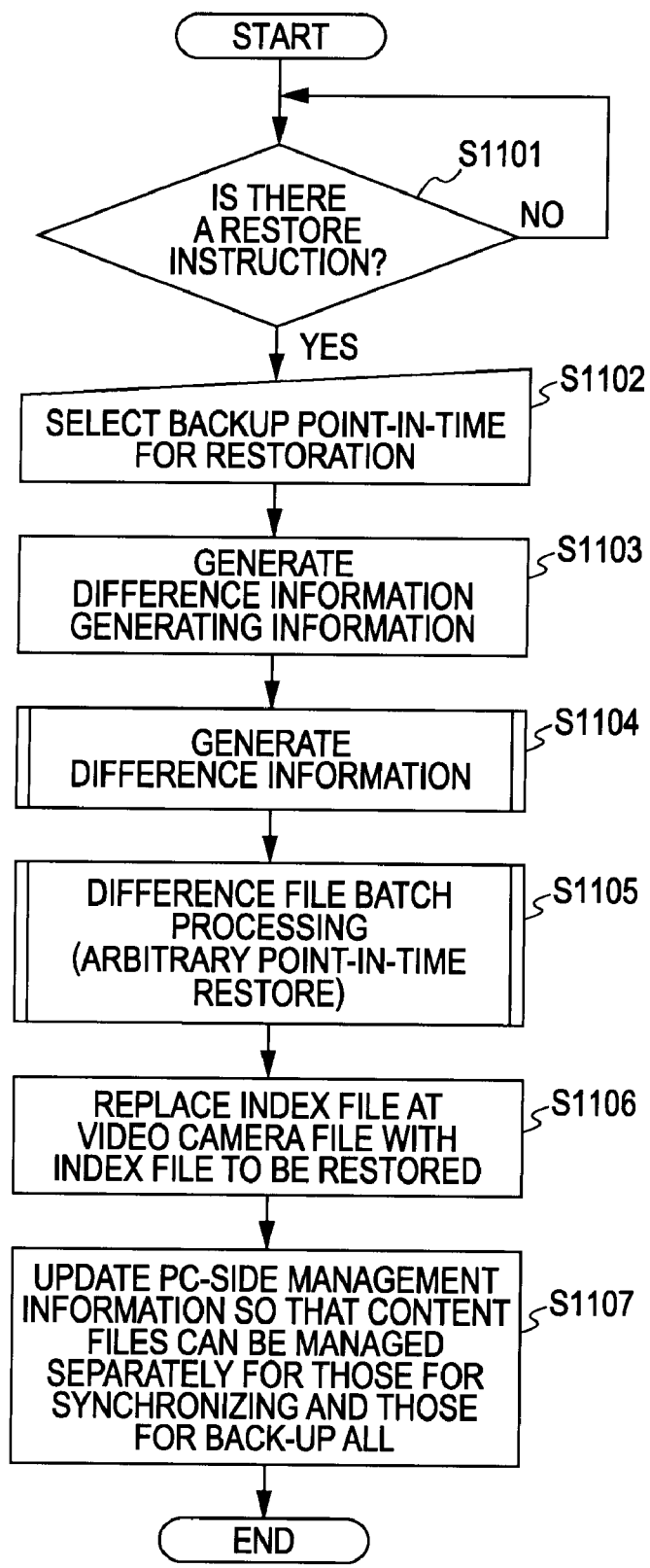
FIG. 25 is a flowchart illustrating restore-arbitrary-point-in-time processing.
Figure 26:
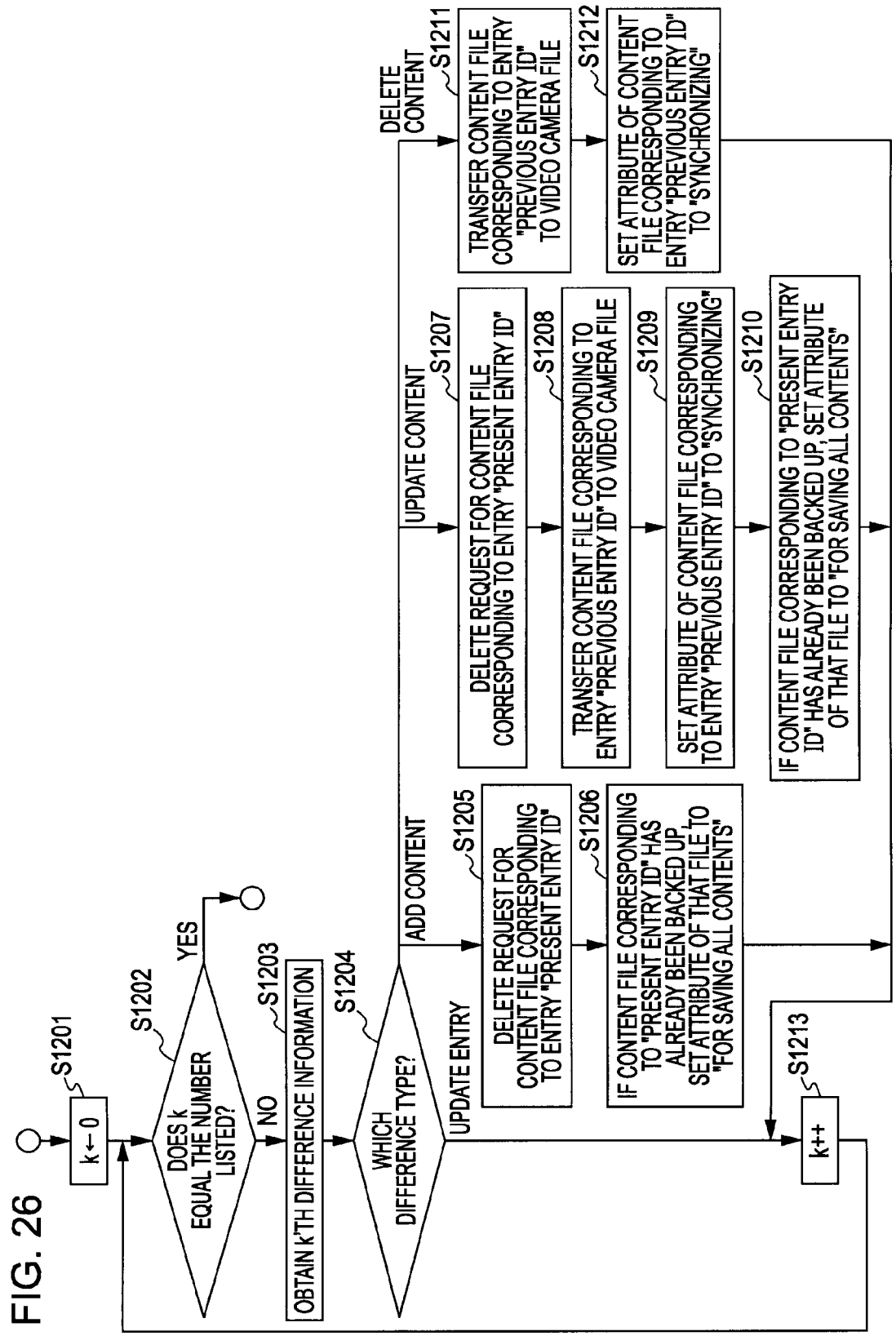
FIG. 26 is a flowchart illustrating what is being processed in difference file group processing (restore arbitrary point-in-time)

FIGS. 24 through 26 are flow charts showing the processing operations to be performed in order to realize the operations (synchronizing, saving all contents, and restore arbitrary point-in-time) for the fifth embodiment as described above.

Here, FIG. 24 shows synchronizing and save-all-contents processing (for restoring arbitrary point-in-time), and FIG. 25 shows the restore arbitrary point-in-time processing. Also, FIG. 26 shows the processing content for difference file group processing (restore arbitrary point-in-time) in step S1105 shown in FIG. 25.

Note that the processing operations shown in these drawings are executed by the CPU 21 based on the back-up processing program 30a.

Also, in this case the processing operations are shown only for the personal computer 20 side, but the processing operations of the digital video camera 1 side in this case only has processing to transfer the index file Findex according to a request from the PC 20 side, saving (or overwriting/saving) processing of the content files Fct and index file Findex transferred from the PC 20 side, and deleting processing for the content files Fct in accordance with the delete request from the PC 20 side, in order to generate the difference information generating information Rdy, so the description thereof will be omitted here.

Also in FIGS. 24 and 25, let us assume that the digital video camera 1 and personal computer 20 are already connected so as to be capable of data communication.

First in FIG. 24, the overall flow of the synchronizing and save-all-contents processing is similar to the synchronizing and save-all-contents processing shown in FIG. 21. That is to say, the processing operations in steps S1001 through S1010 other than step S1006 is similar processing as the steps S801 through S810 other than step S806 as described with FIG. 21, so the description thereof will be omitted.

That is to say, with FIG. 24 and the previous FIG. 21, step S1006 and step S806 differ from one another, so accordingly description will be made here only for step S1006.

In step S1006, processing is performed to associate the index file held on the video camera side with the present synchronizing point-in-time and save this index file. That is to say, in order for the content file storage state to be restored at the point-in-time for arbitrary synchronizing and save-all-contents processing as described above, the index file Findex which is transferred from the digital video camera 1 side and held temporarily in step S1003 is associated to the present point-in-time for synchronizing and save-all-contents processing, and saved. The destination for saving this index file Findex can be the HDD 30, for example.

Next, the processing operations to be performed corresponding to the time of restore arbitrary point-in-time will be described with reference to FIG. 25. Note that in FIG. 25, an assumption is made that the synchronizing and save-all-contents processing as shown in FIG. 24 has already been performed.

First, in step S1101, restoration instructions are awaited. When affirmative results are obtained that there are restoration instructions, processing is performed to select the back-up point-in-time for restoration in step S1102.

In this case, the restoring instructions in the step S1101 are instructions similar to the case of the fourth embodiment. That is to say, in accordance with restoration instructions being performed in step S1102, a screen display is performed for selection of the back-up point-in-time in the past, for example, (point-in-time for synchronizing and processing for saving all contents, in this case), and the back-up point-in-time is selected by user operation of this screen.

When the back-up point-in-time for restoration is selected in step S1102, the restore arbitrary point-in-time instructions are generated in the sense described with FIG. 23.

In step S1103, processing is executed to generate the difference information generating information.

The difference information generating information Rdy in this case is generated based on the index file Findex transferred from the digital video camera 1 side and temporarily held, and the index file Findex at a back-up point-in-time in the past already held on the PC 20 side, and is basically similar to that which has been generated up to now, but regarding the index file Findex associated with the back-up point-in-time selected in the step S1102 of the index file Findex associated with the back-up point-in-time in the past on the PC 20 side and held, difference information generating information Rdy is generated so as to generate a discrepancy detection information list LDd-ps from the previous back-up.

In step S1104, processing is executed to generate the difference information. The processing content of the step S1104 is the discrepancy detection information list LDd-ps from the previous back-up generated based on the index file Findex at the back-up point-in-time selected to be restored as described above, and other that this, is similar to that described with the previous FIG. 12, so the description thereof will be omitted.

In step S1105, difference file group processing (restore arbitrary point-in-time) is executed.

The processing content of step S1105 is shown in FIG. 26. In FIG. 26, the difference file group processing (restore arbitrary point-in-time) is basically a restoration process, and as described above, the discrepancy detection information list LDd-ps from the previous back-up is generated based on the index file Findex at the back-up point-in-time selected as described above, and other that this, has similar processing as the difference file group processing (previous synchronizing state restoration) in FIG. 16 described with the second embodiment (steps S1201 through S1204 correspond to steps S501 through S504, step S1205 corresponds to step S505, steps S1207 and S1208 correspond to steps S506 and S507, step S1211 corresponds to step S508 and step S1213 corresponds step S509).

As can be understood from the description of FIG. 23, in the fifth embodiment the files synchronized with the digital video camera 1 side is managed as "for synchronizing" and other files are managed as "for saving all content". With this management relation, in accordance with the content file storage state on the digital video camera 1 side changed by the restoration processing, processing to perform attribute changes for synchronizing/for saving all contents of the content files Fct, saved on the PC 20 side, is added (steps S1206, S1209, S1210, step S1212).

First, in the case that "content added" is determined, the content file Fct thereof does not exist in the selected point-in-time for restoration, and shows to be added on the digital video camera 1 side in the time until the restore arbitrary point-in-time instructions are given, whereby a delete request is performed to the digital video camera 1 side as shown in step S1205.

However, as described above, from the sense of managing for synchronizing/for saving all contents, if the content file Fct which is "content added" is already backed-up on the PC 20 side, attribute changes need to be made from the "for synchronizing" up to that point into "for saving all contents".

Accordingly in the following step S1206, in the case that the content file equating to the "present entry ID" entry is already backed-up, processing is performed to set the attribute of the file thereof to "for saving all contents".

Also, in the case that "content updated" is determined, the content file Fct (i.e. the content file Fct specified by the "previous entry ID") before updating, which is held on the PC 20 side, is to be subjected to the attribute thereof being set to "for synchronizing".

Also, if the content file Fct after updating (content file Fct specified by "present entry ID") is already backed-up on the PC 20 side, as with the case with the above "content added", attribute changes need to be made from the "for synchronizing" up to that point into "for saving all contents".

Accordingly, following processing being performed for changing the storage state of the actual content file Fct in accordance with the "content updated" in steps S1207 and S1208, first in step S1209, processing is performed to set the attribute of the content file equating to the "previous entry ID" entry to "for synchronizing".

Further, in the next step S1201, in the case that the content file equating to the "previous entry ID" entry is already backed-up, processing is performed to set the attribute of the file thereof to "for saving all contents".

Further, in the event that "content deleted" is determined, the attribute of the content file Fct held on the PC 20 side is to be set as "for synchronizing". Accordingly, after processing is performed to change the storage state of the actual content file Fct in accordance with the "content deleted" in step S1211, processing is performed in step S1212 to set the attribute of the content file equating to the "previous entry ID" entry to "for synchronizing".

Note that as described above, the handling of a case wherein the difference type "entry updated" is determined follows the case of restoration processing described with the second embodiment.

In the case that affirmative results are obtained that the pointer value k matches the list count in step S1202 in this case also, the processing operations shown in the drawing are ended. Following this, the flow is advanced to the processing in step S1106 in FIG. 25 in this case.

Returning to FIG. 25, in the step S1106, processing is executed to replace the index file on the video camera side with the index file to be restored. That is to say, the index file Findex associated with the point-in-time for restoration selected in step S1102 and held is transferred to the digital video camera 1 side, and instructions are given so as to overwrite and save this over the index file Findex held in the HDD 14.

In the following step S1107, processing is executed to update the PC side management information so that the content files are managed separately for synchronizing and for saving all contents. That is to say, the PC side management information 30b is updated such that the attribute of each content file Fct currently held in the HDD 30 on the PC 20 side becomes an attribute set by the processing in FIG. 23. Thus, even in the case that the relevant restore arbitrary point-in-time processing is performed, each content file Fct held in the HDD 30 is accurately managed by "for synchronizing" and "for saving all contents".

Note that with the restore arbitrary point-in-time processing described up to now, the file storage state on the digital video camera 1 side at the point-in-time of such processing being performed is not reflected on the PC 20 side, but if an arrangement is made wherein the synchronizing and save-all-contents processing shown in FIG. 24 is performed before executing the restore arbitrary point-in-time processing described in FIG. 25, the content file storage state changed at the digital video camera 1 side from the previous back-up as seen at the restore arbitrary point-in-time processing can be reflected on the PC 20 side.

In performing the restore arbitrary point-in-time processing described up to now, as a premise thereto, the digital video camera 1 and PC 20 side need to have been connected already in the past and back-up processing already have been performed, but in the case that synchronizing processing is performed as the back-up processing instead of the save-all-contents processing, for example, the index file Findex itself can be obtained at the arbitrary point-in-time, but a case may occur wherein the content file Fct indicated by the index file Findex does not exist. That is because with the next synchronizing processing following the arbitrary point-in-time, the relevant content file Fct may be deleted from the HDD 30. In this sense, in the case of performing restore arbitrary point-in-time processing, save-all-contents processing is the required back-up processing.

With this in mind, in the case of performing restore arbitrary point-in-time processing as in the fifth embodiment, a combination of synchronizing and processing to save all content, as exemplified here, and a combination with only the processing to save all content as described with the third embodiment, is possible (of course, processing to associate with each back-up point-in-time and save the index file Findex becomes necessary in that case also).

Also, in the case that restore arbitrary point-in-time processing is performed, the storage location of (on the directory configuration of) the content files Fct restored on the digital video camera 1 side are not always in the same location.

On the other hand, the index file Findex which is replaced on the digital video camera 1 side by the restore arbitrary point-in-time processing reflects the file storage state at the point-in-time of restoration of course, so in accordance with this, the storage location of the content file Fct restored on the digital video camera 1 side by the restoration processing may not match the location indicated by the file path C7 within the index file Findex replaced by the restoration processing.

Therefore, on the digital video camera 1 side, even if the file path C7 information is referenced within the newly replaced index file Findex, there is the possibility of not being able to access the restored content file Fct.

However, with the digital video camera 1, the content files Fct themselves which are transferred from the PC 20 side and are to be restored are recorded in the HDD 14, so the path information to these files Fct can be understood. Accordingly, if the file path C7 within the entry data of the relevant content file Fct within the index file Findex replaced from the PC 20 side is updated based on the file path information thus understood, each content file Fct thereafter can be accurately specified by referencing the file path C7.

Alternatively, the index file Findex is arranged to be able to specify each content file Fct with the content ID also. Accordingly after the restore arbitrary point-in-time processing is performed, even with each content file Fct being specified to change with the content ID within the index file Findex, problems such as that described above can be avoided.

Note that in the case that the restore arbitrary point-in-time processing is performed with the fifth embodiment, in the case that the content IDs realize a later-described recording order, after restoration processing, processing is particularly necessary to prevent a recording order broken out into content files Fct newly created (added) to not duplicate a recording order broken out from the point-in-time of restoration to the restoration processing performed.

Note that such processing is unnecessary in the event that the content IDs are realized in a pair between the file path and file update date-and-time, as with the embodiments up to now.

6. Sixth Embodiment

6-1. Back-up Processing with Sixth Embodiment

The sixth embodiment performs save-all-contents processing as a back-up processing, as with the case of the third embodiment, but the technique thereof differs. Specifically, save-all-contents processing is realized with a simpler technique.

Note that the configuration of the digital video camera 1 and personal computer 20 with the sixth embodiment is similar to that of the first embodiment, so the description thereof will be omitted here. However, processing is executed in this case which differs from the synchronizing processing in the first embodiment, so the content of the back-up processing program 30a stored in the HDD 30 is changed.

Figure 27:
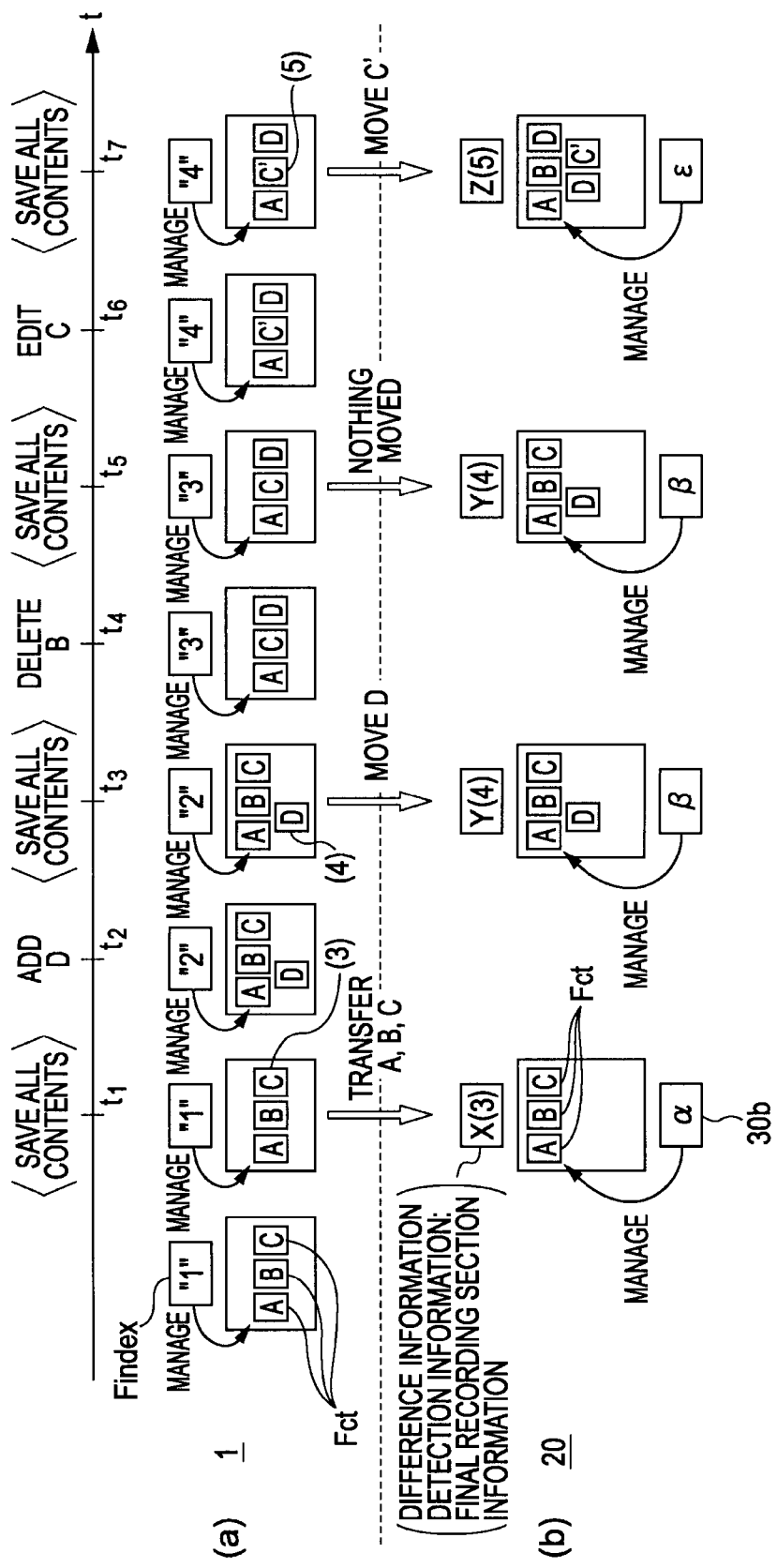
FIG. 27 is a drawing schematically illustrating back-up processing (simplified difference information list) according to a sixth embodiment.

FIG. 27 is a schematic drawing showing the back-up processing (simplified save-all-contents) for the sixth embodiment.

With FIG. 27 also, as with the previous FIGS. 7, 14, 17, 20, and 23, (a) in FIG. 27 shows the state transition of the index file Findex and content file Fct recorded in the HDD 14 on the digital video camera 1 along the time axis t, and (b) in FIG. 27 shows the state transition of the index file Findex, content files Fct, and PC side management information 30b recorded in the HDD 30 on the personal computer 20 along the same time axis t.

First, as can be seen from a comparison with the FIG. 17 described in the third embodiment, in this case also the storage state transition of the content files Fct on the digital video camera 1 side, the information content transition of the index file Findex according thereto, and the storage state transition of the content files Fct on the PC 20 side from the point-in-time t1 to the point-in-time t7 are similar to the transitions in point-in-time t1 to the point-in-time t7 in FIG. 17, so the description thereof will be omitted.

The point that differs between the save-all-contents processing in the case of the third embodiment and the save-all-contents processing in the case of the sixth embodiment is in that, upon detecting a difference, comparison is not performed between the previous and present index file Findex, but only the content IDs are compared.

In the case of the sixth embodiment, as the content ID C5 within each management file slot Sm (entry data) stored within the index file Findex such as that shown in FIG. 6, information is stored called a recording order (recording sequence information) which indicates the sequence of recording of content files Fct associated to the entry data.

That is to say, with the digital video camera 1 in this case, the above-mentioned recording order is generated by incrementing the value of each newly created content file Fct on the HDD 14, and the recording order is stored as content ID C5 within the entry data to be entered within the index file Findex according to the creation of the content file Fct.

Thus employing the recording order information associated with each content file Fct, the difference information is to be detected, but in the case of "save all contents", only the content files Fct added from the time of the previous back-up to the time of the present back-up on the digital video camera 1 side needs to be specified.

Thus, in order to understand the content files Fct added on the digital video camera 1 side from the previous to the present back-up, with the sixth embodiment, each time the digital video camera 1 and the PC 20 side are connected and back-up processing performed (save-all-contents processing), the recording order of the content files Fct recorded last on the digital video camera 1 side, i.e. the recording order with the greatest value (hereafter will be called the last-in-recording-order), is retained. That is to say, the last-in-recording-order at the time of the previous back-up can be held at the time of the next back-up.

Following this, at the next back-up time, the last-in-recording-order from this previous back-up time and the recording order of each content file Fct stored within the index file Findex held on the digital video camera 1 side is compared, whereby a content file Fct having a recording order with a value greater than the last-in-recording-order can be understood to be the content file Fct added from the previous time to the present time.

Note that according to such operations, the information of the last-in-recording-order held on the PC 20 side in this case can be understood as functioning as information to detect the difference information (i.e. only "content added" in this case). In this sense, with FIG. 27, the last-in-recording-order is indicated as being difference information detecting information (difference information detecting information in the drawing: last-in-recording-order).

To describe specifically the operations in the case in FIG. 27, with the first processing for saving all contents at point-in-time t1, there are three content files Fct held on the digital video camera 1 side, "A", "B", "C", so the last-in-recording-order is "3", for example. On the PC 20 side in this case, the content files "A", "B", "C" are transferred and saved as shown in the drawing, whereupon only the recording order "3" is retained ("X" in the drawing). That is to say, with the PC 20 in this case, there is no need to transfer and save the index file Findex held on the digital video camera 1 side as with the other embodiments up to now.

With the save-all-contents processing at point-in-time t3 after the content file "D" is added on the digital video camera 1 side at point-in-time t2, the value of the last-in-recording-order saved at the time of save-all-contents processing at point-in-time 1 and the value of the recording order of each content file Fct within the index file Findex held on the digital video camera 1 side at the point-in-time t2 (value of content ID C5) are compared, whereby content file Fct associated to a recording order with a value greater than that of the last-in-recording-order is specified.

That is to say, the recording order of each content file Fct within the index file Findex on the digital video camera 1 side in this case is "1", "2", "3", "4" respectively for the content files "A", "B", "C", "D", and the content file "D" associated with the recording order "4" which is greater than the last-in-recording-order "3" is specified as the content file Fct which has been added from the previous time.

Figure 28:
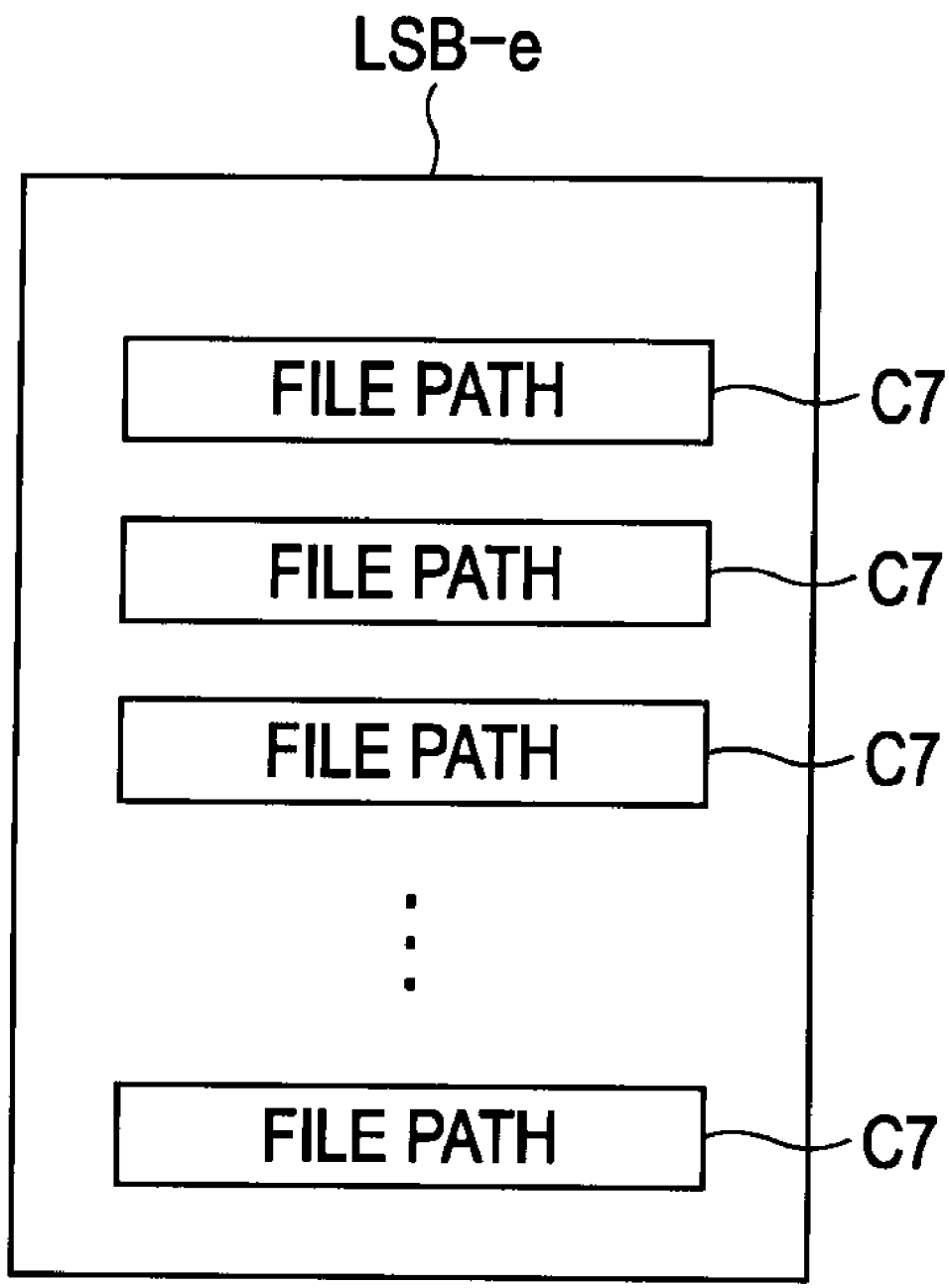
FIG. 28 is a drawing illustrating the structure of a simplified difference information list.

In the case of the sixth embodiment, information wherein the value is greater than the last-in-recording-order, and which is for specifying the content file Fct which has been added from the last time, is listed in the simplified difference information list LSB-e, as shown in FIG. 28.

With the example in this case, the file path C7 is listed as information to specify the content file Fct which has a value greater than the last-in-recording-order.

Note that content ID C5 can be listed instead of such file path C7, as information to specify the above content file Fct.

Returning to FIG. 27, if the content file Fct added from the previous time is specified by such simplified difference information list LSB-e, the PC 20 performs a transfer request to the digital video camera 1 side so as to transfer the content file Fct thereof. That is to say, in this case a transfer request is performed for the content file "D". The transferred content file Fct ("D") is then saved in the HDD 30.

Further, in this case also the PC 20 saves the recording order with the greatest value (i.e. "4" in this case) as the last-in-recording-order (difference information detecting information), based on the content of the index file Findex held on the digital video camera 1 side ("Y" in the drawing).

With the save-all-contents processing at the point-in-time t5 after the content file "B" is deleted at point-in-time 4, the content file Fct is not moved from the digital video camera 1 side to the PC 20 side as shown in the drawing. That is to say, in this case a content file Fct having a recording order greater than the last-in-recording-order "4" does not exist at the digital video camera 1 side, so the simplified difference information list LSB-e is empty, and accordingly no transfer request is performed to the digital video camera 1 side.

In this case the PC 20 saves the last-in-recording-order "4", based on the index file Findex transferred from the digital video camera 1 side ("Y" in the drawing).

Also, as processing to save all content at the point-in-time t7 after the content file "C" has been updated to "C'" at point-in-time t6, two ways of operation can be considered as to the method of assigning the recording order on the digital video camera 1 side.

First, the first case is to assign a new recording order as to the content files Fct after updating on the digital video camera 1 side.

In this case, the recording order of the content file "C'" after updating becomes "5", as shown in the drawing, whereby the value is greater than the last-in-recording-order "4" held on the PC 20 side, and the file path C7 of the content file "C'" is added to the simplified difference information list LSB-e. The relevant content file "C'" is transferred from the digital video camera 1 side and saved in the HDD 30, based on the simplified difference information list LSB-e.

Further, in this case also the PC 20 saves the recording order ("5") with the greatest value as the last-in-recording-order (difference information detection information), based on the index file Findex held on the digital video camera 1 side ("Z" in the drawing).

On the other hand, although omitted from the drawing, in the case of not assigning a new recording order to the content file Fct after updating on the digital video camera 1 side, there is no following content file Fct having a value greater than the last-in-recording-order "4", and accordingly the storage state of the content file Fct on the PC 20 side does not change from the state of the point-in-time t5. Also, the last-in-recording-order continues to remain as "4".

As described first above, an arrangement wherein a new recording order is assigned to the content files Fct after updating on the digital video camera 1 side will be described below.

According to the above-described simplified save-all-contents processing, as with the case of the third embodiment, the content file Fct subjected to be saved on the PC 20 side in the past can all be saved on the PC 20 side.

Also, only the difference files are actually transferred in this case, and compared to the case of realizing saving by overwriting all contents and copying, the save-all-contents processing can be performed faster. Also the content files Fct to be transferred can be reduced, whereby processing load can also be lessened.

Also, according to the simplified save-all-contents processing in this case, only the recording order for generating difference information (recording sequence information) need to be compared, and difference information can be obtained at a faster speed than the case of comparing the index files Findex for previous and present back-up times as with the third embodiment, whereby the save-all-contents processing can be performed at a faster speed in this way.

6-2. Processing Operations

Figure 29:
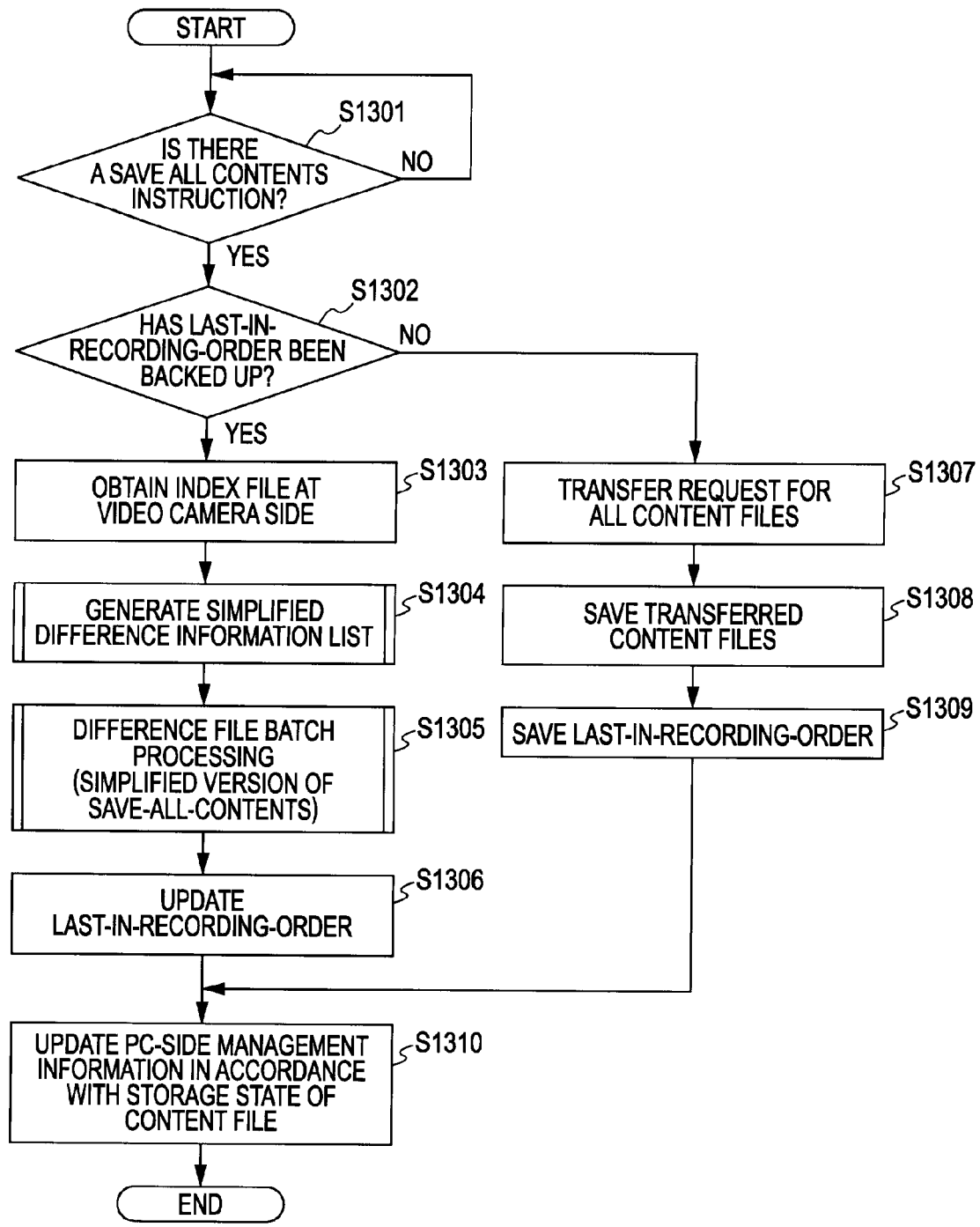
FIG. 29 is a flowchart illustrating the overall flow of simplified content saving processing according to the sixth embodiment.
Figure 30:
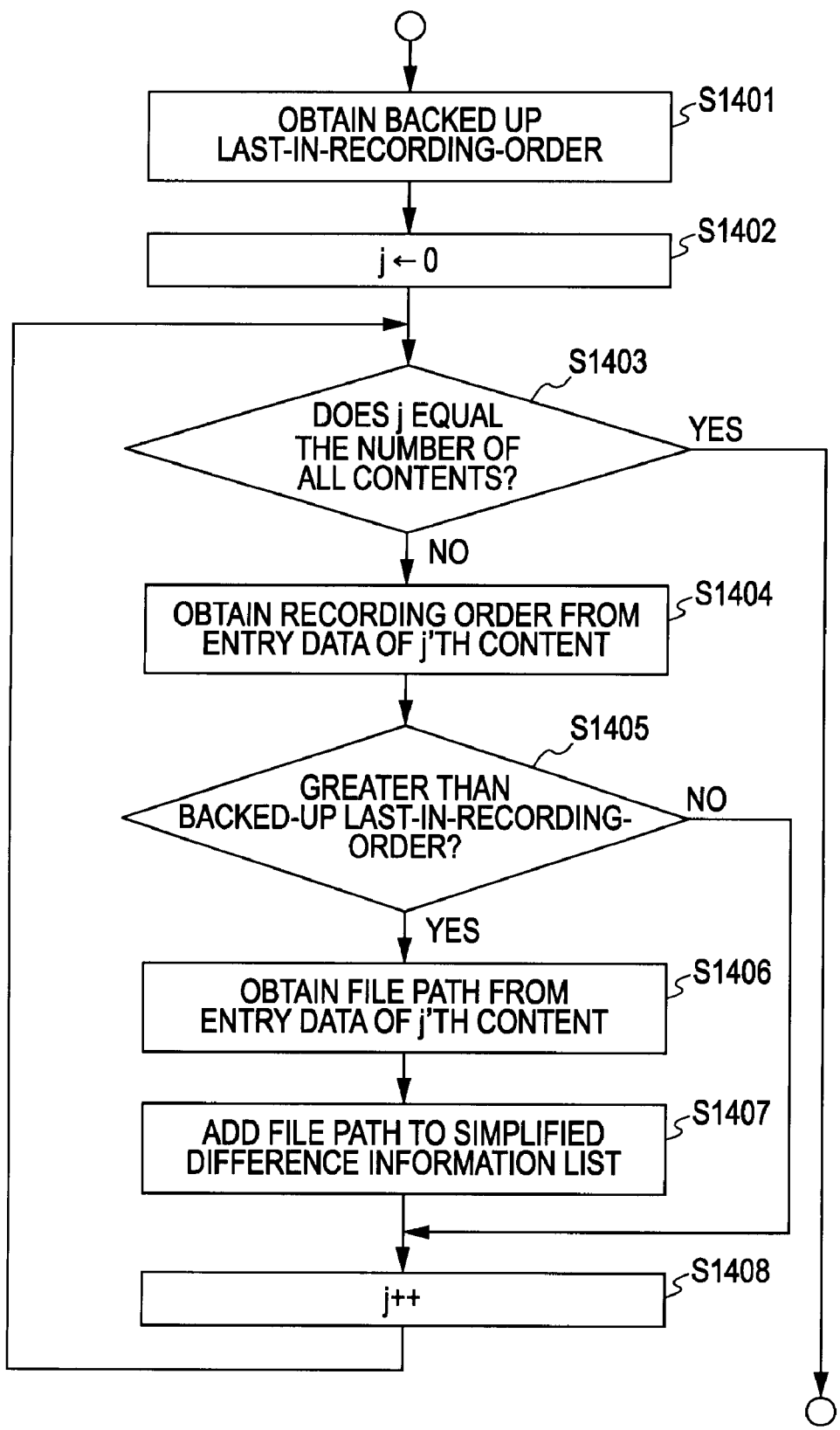
FIG. 30 is a flowchart illustrating what is being processed in simplified difference information list generating processing.
Figure 31:
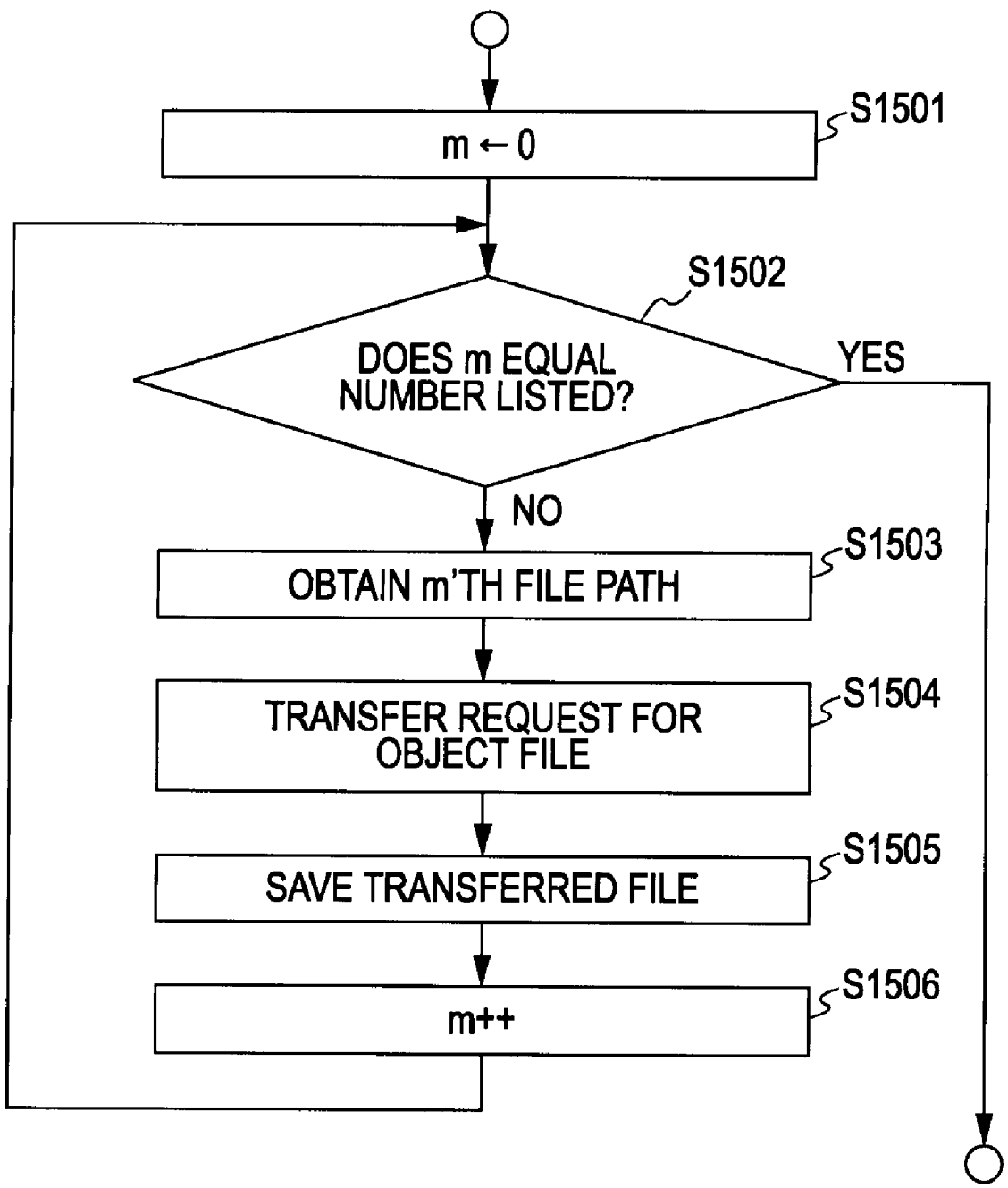
FIG. 31 is a flowchart illustrating what is being processed in difference file group processing (simplified content saving)

FIGS. 29 through 31 show the processing operations for realizing the operations of the simplified save-all-contents according to the above description.

With these drawings, FIG. 29 shows an overall flow of the simplified save-all-contents processing. Also, FIG. 30 shows the content for the simplified difference information list generating processing serving as step S1304 in FIG. 29, and FIG. 31 shows the processing content of the difference file group processing (simplified save-all-contents) serving as the step S1305 shown in FIG. 29.

Note that the processing operations shown in these drawings are to be executed by the CPU 21 based on the back-up processing program 30*a*.

Also, with FIG. 29, the digital video camera 1 and personal computer 20 are assumed to already be in a state of being connected so as to be capable of data communication.

Also, the processing operations in this case are shown only for the personal computer 20 side, but on the digital video camera 1 side in this case, processing to transfer the content files Fct/index file Findex according to a request from the PC 20 side is performed. Also, as can be understood from the descriptions up to now, as a premise in this case, a recording order is generated for every creation of content file Fct (includes content files Fct after updating) in the HDD 14 on the digital video camera 1 side, and this is stored as content ID C5 within the entry data corresponding to the index file Findex.

First, with FIG. 29, instructions for save all contents is awaited in step S1301. This step S1301 can be similar to the step S601 in the case of save-all-contents processing shown in FIG. 18.

In the case that affirmative results are obtained that there is instruction for saving all contents, in step S1302 determining processing is performed as to whether or not a last-in-recording-order is backed-up. This is to determine whether or not the last-in-recording-order has been backed-up, as with the processing in step S602 of FIG. 18 as to whether or not the index file Findex had been already backed-up, whereby determination is made as to whether or not processing for saving all contents has been already made in the past.

In the case that negative results are obtained that the last-in-recording-order is not backed-up, this is the first save-all-contents processing, in which case the flow is advanced to step S1307 to perform a transfer request for all content files, and also executes processing to save the content files transferred in the following step S1308.

Following this, processing is executed in the next step S1309 in this case to save the last-in-recording-order. That is to say, in step S1309, a transfer request is performed to the digital video camera 1 side, and the index file Findex is transferred, whereupon the recording order with the greatest value of the content ID C5 (i.e. recording order in this case) within each entry data (each management file slots Sm) in the transferred index file Findex is saved as the last-in-recording-order. The saving destination for this last-in-recording-order may be the HDD 30, for example.

Upon saving the recording order in step S1309, the flow is advanced to step S1310, and the processing to update the PC side management information 30*b* is executed according to the storage states of the content files. That is to say, with the simplified save-all-contents processing, the content files Fct stored in the HDD 30 are managed by the PC side management information 30*b* on the PC 20 side.

Also, in step S1302, in the case that affirmative results are obtained that a last-in-recording-order is saved, this is a case wherein save-all-contents processing has already be performed, so in that case the flow is advanced to step S1303, and processing is executed first to obtain the index file on the video camera side. That is to say, a transfer request is performed to the digital video camera 1 side and the index file Findex is transferred, and this is temporarily held by a memory unit 22, for example.

Following this, in the following step S1304, the simplified difference information list generating processing is executed.

FIG. 30 shows the content of the simplified difference information list generating processing serving as the step S1304.

With FIG. 30, first in step S1401, the backed-up last-in-recording-order is obtained. Following this in the next step S1402, the pointer value j is reset to 0. The pointer value j serves as a pointer to indicate the entry data object from each entry data (management file slot Sm) which is entered within the index file Findex obtained from the digital video camera 1 side in the step S1303. In this sense, the pointer value j has been denoted with the same symbol with regard to the discrepancy detection information list LDd-ps for back-up this time, as described earlier.

In the following step S1403, determining processing is performed as to whether or not the pointer value j matches the all contents count. That is to say, determination processing is performed as to whether or not the pointer value j matches the count of entry data entered in the obtained index file Findex.

In the case that negative results are obtained that the pointer value j does not match the all contents count, this is a case wherein processing to be described below regarding all entry data is not yet performed, in which case processing to follow the step S1404 is executed.

First, in step S1404, the recording order is obtained from the entry data of the j'th content. That is to say, the content ID C5 (recording order) within the entry data indicated by the pointer value j is obtained.

Following this, in step S1405, determination processing is performed as to whether or not the value of the recording order thus obtained is greater than the value of the last-in-recording-order. In the event that affirmative results are obtained that the value is greater than the last-in-recording-order (i.e. last in the recording sequence), in step S1406 the file path is obtained from the entry data of the j'th content. That is to say, the file path C7 within the entry data indicated by the pointer value j is obtained. In the following step S1407, processing is executed to add the file path to the simplified difference information list. That is to say, the information of the obtained file path C7 is listed in the simplified difference information list LSB-e described with FIG. 28.

The simplified difference information list LSB-e can be temporarily held in a memory unit 22 or the like, for example.

The file path is thus added to the simplified difference information list in step S1407, and after incrementing the pointer value j in the following step S1408, the flow is returned to step S1403.

On the other hand, in the case that negative results are obtained in step S1405 that the value is smaller than the backed-up last-in-recording-order (i.e. forward in the recording sequence), the flow is advanced to step S1408 as shown in the drawings and after the pointer value j is incremented, the flow is returned to step S1403. That is to say, the content file Fct having a recording order with a value smaller than the last-in-recording-order is a content file Fct saved already on the PC 20 side, so the information of the file path C7 thereof is not added to the simplified difference information list LSB-e.

In the event that affirmative results are obtained in step S1403 that the pointer value j matches the all-contents count, the comparison with the last-in-recording-order regarding all of the entry data within the index file Findex obtained from the digital video camera 1 side is completed, and the generating of the simplified difference information list LSB-e is completed. Accordingly, in the case that affirmative results are thus obtained in step S1403, the flow is advanced to the step S1305 shown in FIG. 29.

FIG. 31 shows the content of the difference file group processing (simplified save-all-contents) serving as the step S1305 shown in FIG. 29.

In FIG. 31, first in step S1501 the pointer value m is reset to 0. This pointer value m serves as a pointer for indicating the file path C7 out of the file paths C7 to be listed in the simplified difference information list LSB-e.

In the following step S1502, determining processing is performed as to whether or not the pointer value m matches the list count. That is to say, determination is made as to whether or not the pointer value m matches the list count of the file paths C7 in the simplified difference information list LSB-e.

In the case that negative results are obtained in step S1502 that the pointer value m does not match the list count in the simplified difference information list LSB-e, this indicates that processing to be described below regarding all listed file paths C7 (content files Fct) has not been performed, in which case the flow is advanced to follow the step S1503.

First, in step S1503, the m'th file path is obtained. That is to say, the file path C7 indicated by the pointer value m in the simplified difference information list LSB-e is obtained.

In step S1504, a transfer request for an object file is performed. That is to say, a transfer request for the content file Fct specified by the obtained file path C7 is performed as to the digital video camera 1 side.

Following this, in step S1505, processing is executed to save the transferred files. Thus the content files Fct held only on the digital video camera 1 side can be transferred and saved on the PC 20 side.

Upon executing the saving process in step S1505, after incrementing the pointer value m in step S1506, the flow is returned to the previous step S1502. In the case that affirmative results are obtained that the pointer value m matched the list count in step S1502, this is a case wherein the transfer request and saving processing for all of the files listed in the simplified difference information list LSB-e is completed, in which case the difference information file group processing (simplified save-all-contents) shown in this drawing is ended, and the flow is advanced to step S1306 in FIG. 29.

With FIG. 29, in step S1306, processing is executed to update the last-in-recording-order. That is to say, the content ID within each entry data in the index file Findex obtained from the digital video camera 1 side in the step S1303 is referenced, and the recording order with the greatest value is obtained as the new last-in-recording-order. Following this, processing is executed wherein the value of the last-in-recording-order already saved is updated to the value of the newly obtained last-in-recording-order.

Upon executing the updating processing of the last-in-recording-order in step S1306, the flow is advanced to step S1310 described above, and processing is executed to update the PC side management information 30b according to the storage state of the content file.

As can be understood from the descriptions in FIGS. 29 and 30 above, with the sixth embodiment, a transfer request for each file listed sequentially upon generating the difference information list, and saving the transferred files, are performed, but an arrangement may be made wherein a difference information list is not generated, and the transfer request and saving processing is performed for each file each time a specification is made for one difference file.

Alternatively in this case, a configuration may be made wherein transfer requests and saving processing can be performed all at once for all of the files listed in the difference list.

Also, with the sixth embodiment, a case to realize the recording sequence information with a recording order has been exemplified, but the content ID C5 depending on a combination of the file path C7 and file update date-and-time described in each of the embodiments up to now can be employed as recording sequence information.

7. Seventh Embodiment

7-1. Back-up Processing as Seventh Embodiment

As described above, with the sixth embodiment, a method has been described for using the recording order (recording order information) indicating he recording order of contents recorded with the digital video camera 1 to detect content files which have not been backed up, which are content files Fct added from the time of the previous back-up processing to the time of the present back-up processing. That is to say, the recording order of the content files last backed-up (i.e., last-in-recording-order) is held at the PC 20 side as difference information detection information, and at the time of detecting the difference information next time, content files which have not been backed up can be detected by searching at the digital video camera 1 side for content files FCT having a recording order value greater than the last-in-recording-order held at the PC 20 side.

Thus, the back-up method described with the sixth embodiment can realize save-all-contents processing in the case that (A) each content file Fct is uniquely assigned with a recording order, or (B) there are multiple content files Fct having the same value for the recording order, given that these content files Fct are to be always backed-up together.

Now, a case wherein the recording orders of multiple content files Fct have the same value will be described with reference to the drawing. An example of such a case that is conceivable is a case wherein at least one of the content files recorded with the digital video camera has been divided by user operations, such that each of the divided content files have recording order with the same value.

FIG. 32 is a drawing schematically illustrating the relation between index files stored in the HDD 14 (FIG. 2) and content files, showing a case wherein content files following division have been assigned a new recording order.

For example, as shown in (a) in FIG. 32, with regard to content A (2101) through content C (2103), file a (2210), file b (2220), and file c (2230), which are content files to be stored in the content file (2200), are correlated respectively with the entry α (2110), entry β (2120), and entry γ (2130), which are entry data stored in the index file (2100). In this case, the recording order (RO) 2111 stored in the entry α (2110) is "1", the recording order (RO) 2112 stored in the entry β (2120) is "2", and the recording order (RO) 2113 stored in the entry γ (2130) is "3".

Now, in the event that a content file has been divided, each content file following division is handled as new content. For example, let us say that the content B (2102) shown in (a) in FIG. 32 has been divided in two. In this case, as shown in (b) in FIG. 32, new recording orders (RO) "4" and "5" are appropriated respectively to the content D (2104) and content E (2105) following division. In the event that recording order has been appropriated to content files following division, a recording order is uniquely assigned to each content file, so the above condition (A) is satisfied. Thus, save-all-contents processing can be realized with the back-up method illustrated in the sixth embodiment.

However, there may be situations wherein save-all-contents processing cannot be realized/in the case that (C) there are multiple content files Fct having the same value for the recording order, but these content files Fct are not necessarily to be always backed-up together.

Examples of the above state (C) include a case (C1) where division editing processing has been performed on an already-existing file, and the user desires to keep the recording order of the content group following division the same as that before division (i.e., in a case wherein the user does not want the content files following division to be handled as new contents), and a case (C2) where there are multiple content files of the content files following division having the same value for the recording order, but back-up is terminated before back-up processing of all content files having the recording order of the same value has been completed in the process of executing back-up processing regarding the content files following division (i.e., a case wherein back-up processing is terminated without at least one of the content files being backed-up).

These cases (C1) and (C2) will be described with reference to the drawings.

FIG. 33 is a drawing schematically illustrating the relation between index files stored in the HDD 14 (FIG. 2) and content files, showing a case wherein content files following division have been assigned the same recording order as that before division.

As shown in (a) in FIG. 33, the configuration before division is the same as that shown in (a) in FIG. 32, so the same reference numerals are used and description thereof will be omitted.

Now, let us say that at the time of division of a content file, content files following division have been assigned the same recording order as that before division. For example, we will say that the content B (2102) shown in (a) in FIG. 33 has been divided into two. In this case, as shown in (b) in FIG. 33, the same recording order (RO) "2" as that before division thereof is appropriated to both the content B1 (2102a) and content B2 (2102b) following division. In the event that the same recording order as that before division thereof is appropriated to both content files following division, each content file is not assigned with a unique recording order, so the above condition (A) is not satisfied.

Figure 34:
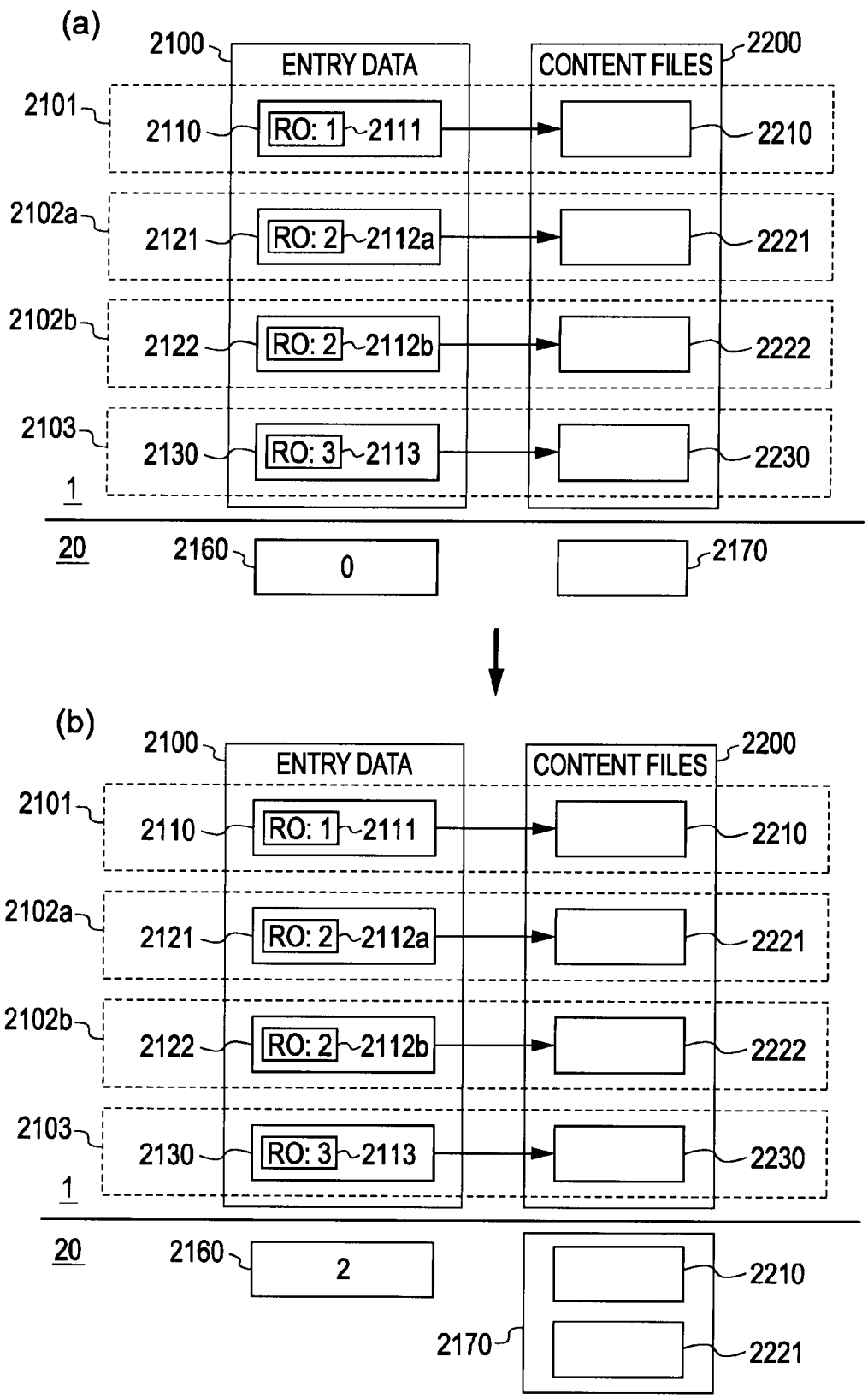
FIG. 34 is a schematic drawing illustrating the relation between index files and content files stored in the HDD 14.

FIG. 34 is a drawing schematically illustrating the relation between index files stored in the HDD 14 and content files, and the relation between difference information detection information stored in the HDD 30 (FIG. 3) and backed-up content files. The configurations at the digital video camera 1 side in (a) in FIG. 34 are the same as those shown in (b) in FIG. 33, so the same reference numerals are used and description thereof will be omitted.

A case wherein content files following division have been appropriated the same recording order as before division, and back-up processing is terminated while back-up processing is being performed, as shown in (b) in FIG. 33 and (a) in FIG. 34, will be described. For example, let us say that content A (2101), content B1 (2102a), content B2 (2102b), and content C (2103) have been detected as different information, and back-up processing is performed, but the back-up processing is terminated partway through for one reason or another, to where back-up processing is completed for only the content A (2101) and content B1 (2102a) of the detected content files while back-up processing is not completed for content B2 (2102b) and content C (2103).

In such a case, with the back-up processing described in the sixth embodiment, the last-in-recording-order is saved at the PC 20 side as difference information detection information, so as shown in (b) in FIG. 34, of the recording order of the content A (2101) and content B1 (2102a) regarding which processing has ended, the recording order "2" of the content B1 (2102a) is stored in the difference information detection information 2106 as the last-in-recording-order.

In this case, upon the back-up processing described with the sixth embodiment being executed, a content file having a content order with a value greater than the last-in-recording-order "2" saved at the PC 20 side is detected at the time of difference information detection. Accordingly, a content file having a recording order value "3" is detected. This means that while the content C (2103) which has not been backed-up is saved, the content B1 (2102*a*) is not saved. That is to say, in this case, the above conditions (C1) and (C2) are satisfied, so save-all-contents processing cannot be realized.

Thus, the back-up processing described with the sixth embodiment cannot handle some cases wherein the same value is assigned to multiple contents as the recording order indicating the order of recording.

Accordingly, with the seventh embodiment, a method is described wherein the state (C) can be handled by storing the date-and-time of creating contents and the recording time, along with the recording order, as the difference information detection information.

Note that the seventh embodiment is a modification of the sixth embodiment, and performs save-all-contents processing with a simplified method as back-up processing, but the method thereof differs from that of the sixth embodiment.

With the seventh embodiment, the configurations of the digital video camera 1 and personal computer 2 are the same as those in the first embodiment, so description thereof will be omitted here. Note however, that difference back-up processing is performed from that in the first embodiment, so the back-up processing program 30*a* stored in the HDD 30 is also different.

FIG. 35 is a drawing schematically illustrating updating of entry data at the time of division processing, with (a) schematically illustrating the recording section of content (content file) A (2400), and also an entry a which is entry data stored corresponding to the content A (2400). As shown in (a) in FIG. 35, of the entry data, information wherein the recording order, date-and-time of creating the content, and the recording time, is correlated is stored as recording section information. The date-and-time of creating the content is the date-and-time at which the corresponding content was created, and the recording time is information indicating the duration of time over which the corresponding content file was recorded. For example, recording order 11211, content creating date-and-time "2004/12/02 12:00:00" and recording time "30 min 50 s" is stored as the entry a as the entry data corresponding to the content A (2400).

Now, an example of an entry data updating method in a case of dividing content files will be described with reference to the drawings.

For example, let us express the entry data of content A1 and content A2 following division, in a case of performing division processing at a point in recording D from the head of content A, as shown in (1) through (3) below.

(1) Entry α (entry data of content A)
  Recording order: RO 0
  Content creating date-and-time: CCT 0
  Recording time: D 0
(2) Entry α1 (entry data of content A1)
  Recording order: RO 1
  Content creating date-and-time: CCT 1
  Recording time: D 1
(3) Entry α2 (entry data of content A2)
  Recording order: RO 2
  Content creating date-and-time: CCT 2
  Recording time: D 2

In this case, each entry data is updated as shown in (4) or (5) below.

(4) Entry α1 (entry data of content A1)
  Recording order: RO 1=RO 0
  Content creating date-and-time: CCT 1=CCT 0
  Recording time: D1=D 0
(5) Entry α2 (entry data of content A2)
  Recording order: RO 2=RO 0
  Content creating date-and-time: CCT 2=CCT 0+D
  Recording time: D 2=D 0−D In the event that the content A (2400) has been divided as shown in (b) in FIG. 35 for example, entry data is stored corresponding to each of the content A1 (2410) and the content A2 (2420) which are the content files following dividing. For example, recording order "2", content creating date-and-time "2004/12/02 12:00:00" and recording time "20 min 30 s" is stored as the entry α1 as the entry data corresponding to the content A1 (2410). Also, recording order "2", content creating date-and-time "2004/12/02 12:20:30" and recording time "10 min 20 s" is stored as the entry α2 as the entry data corresponding to the content A2 (2420). In this way, entry data corresponding to content files following division are appropriated the same recording order with the seventh embodiment.

Next, description will be made regarding the order relation of recording section information in a case of dividing content files.

For example, we will define the order relation of two sets of recording section information "RD1={RO1, CCT1, D1}" and "RD2={RO2, CCT2, D2}" as shown below in (i) through (iii).

(i) If RO1<RO2 then RD1<RD2
(ii) If RO1>RO2 then RD1>RD2
(ii) If RO1=RO2, define according to (iv) or (v) below.
(iv) Precision of content creating date-and-time CCTac≦precision of recording time Dac
  (iv-1) If CCT1+D1<CCT2+D2, RD1<RD2
  (iv-2) If CCT1+D1>CCT2+D2, RD1>RD2
  (iv-3) If CCT1+D1=CCT2+D2, RD1=RD2
(v) Precision of content creating date-and-time CCTac>precision of recording time Dac
  (vi) If D2≦2×CCTac,
    (vi-1) If CCT1+D1<CCT2+D2, RD1<RD2
    (vi-2) If CCT1+D1>CCT2+D2, RD1>RD2
    (vi-3) If CCT1+D1=CCT2+D2, RD1=RD2
  (vii) If D2>2×CCTac,
    (vii-1) If CCT1+D1+CCTac<CCT2+D2, RD1<RD2
    (vii-2) If CCT1+D1+CCTac>CCT2+D2, RD1>RD2
    (vii-3) If CCT1+D1+CCTac=CCT2+D2, RD1=RD2

Thus, when determining the order relation of sets of recording section information, in the event that the two sets of recording section information to be compared have different values for recording order as indicated by (i) and (ii), determination is made based on the recording order. Also, in the event that the two sets of recording section information to be compared have the same value for recording order as indicated by (iii), determination is made based on the date-and-time of creating the content, and the recording time.

Depending on the precision of the content creating date-and-time or the recording time, there may be error in the recording section information. Error in the recording section information will be described with reference to the drawings.

Figure 36:
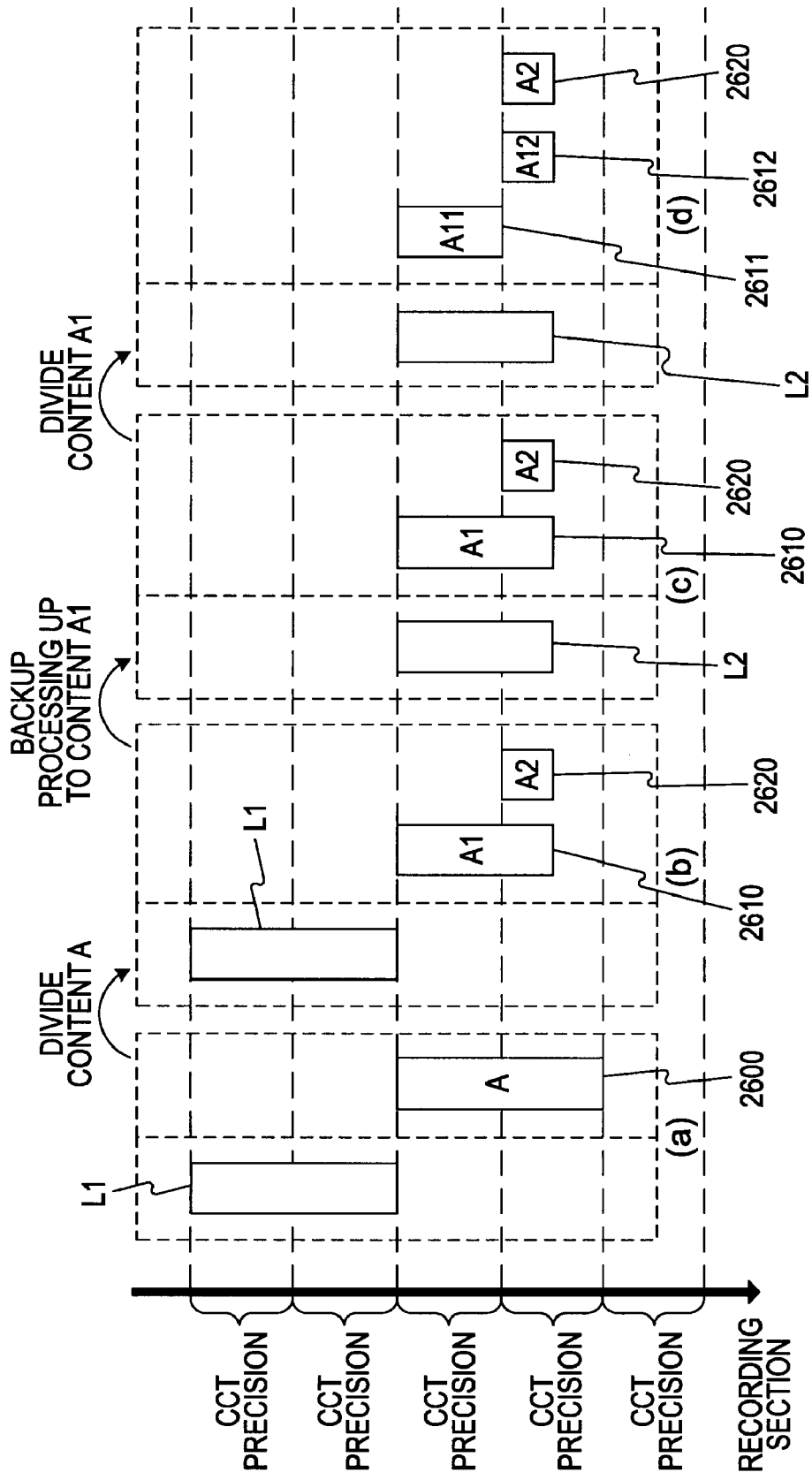
FIG. 36 is a transition drawing illustrating the relation between recording section information of content files recorded at the digital video camera 1 side, and last-recorded-section information recorded at the PC 20 side.

FIG. 36 is a transition drawing illustrating the relation between content file recording section information at the digital video camera 1 side and last-recorded-section information recorded at the PC 20 side.

In the graph shown in FIG. 36, the vertical axis represents point-in-time, and the horizontal axis represents the precision of CCT (content creating date-and-time). Also, with the frames of (a) through (d) in FIG. 36, the left side schematically illustrates the last-recorded-section of the last-recorded-section information recorded at the PC 20 side, and the frame at the right side schematically illustrates the recording section of the content file recorded at the digital video camera 1 side.

For example, description will be made regarding a case wherein the last-recorded-section L1 is written as the last-recorded-section information at the PC 20 side, and the recording section 2600 has been recorded at the digital video camera 1 side as recording section information of a content file A. We will say there that the content file A has not been backed-up at the PC 20 side.

In this case, the content file A recorded at the digital video camera 1 side is divided into a content file A1 and content file A2 for example, as shown in (b) in FIG. 36. Here, the recording section 2600 of the content file A is divided into a recording section 2610 of the content file A1 and a recording section 2620 of the content file A2. There may be cases wherein error occurs in the precision of the content creating date-and-time with regard to the recording section 2620 of the content file A2 for example, such that the content creating date-and-time is recorded as being earlier than the actual content creating date-and-time, as shown in (b) in FIG. 36.

Let us say that that back-up processing is being performed between the digital video camera 1 and the PC 20 in the state shown in (b) in FIG. 36, and that only the content file A1 is backed-up due to one cause or another. As a result, the last-recorded-section L2 corresponding to the recording section 2610 is recorded as last-recorded-section information at the PC 20 side, as shown in (c) in FIG. 36, and the recording section 2610 of the content file A1 and the recording section 2620 of the content file A2 are recorded at the digital video camera 1 side.

Further, we will say that, in the state shown in (c) in FIG. 36, the content file A1 recorded at the digital video camera 1 side is divided into a content file A11 and content file A12. Here, the recording section 2610 of the content file A1 is divided into a recording section 2611 of the content file A11 and a recording section 2612 of the content file A12.

In this case, there is already error in precision of the content creating date-and-time regarding the recording section 2620 of the content file A2, so the values of the recording section 2612 of the content file A12 and the recording section 2620 of the content file A2 may be the same value.

In the case of being based on the actual content creating date-and-time, a comparison result can be obtained that the recording section 2612 of the content file A12 is not later in order than the last-recorded-section L2, and that the recording section 2620 of the content file A2 is later in order than the last-recorded-section L2.

However, in the event that there is error in the recording section information as described above, the order relation may not be able to be correctly determined. The comparison results in cases wherein correct determination cannot be made differ depending on how the precision of content creating date-and-time and the precision of recording time are used in the comparison processing. With the determination methods of (vi) and (vii) shown above, erroneous determination is avoided for contents having a certain recording period.

As described above, with the seventh embodiment, each time a new content file Fct is created on the HDD 14, the digital video camera 1 generates the recording order so as to increment the value thereof, and as shown in (a) in FIG. 35, in accordance with the creation of this content file Fct, stores this recording order as a content ID C5 within the entry data to serve as an entry in the index file Findex, and also stores the content creating date-and-time of the content file Fct and the recording time in the entry data. Also, in the event that the created content file Fct is divided at the digital video camera 1, as shown in (b) in FIG. 35, a recording order with the same value as before dividing is stored in the entry data for the content file Fct following dividing, and also the content creating date-and-time and recording time is stored in the entry data according to the content file Fct following dividing.

Also, each time the digital video camera 1 and the PC 20 are connected and back-up processing is performed in order for the PC 20 side to find out the content files Fct that have been added from the time of the previous back-up processing (save-all-contents processing) to the present back-up processing, the recording section information of the content file Fct recorded last at the digital video camera 1 (i.e., last-recorded-section information) is held at the PC 20 side. Accordingly, the last-recorded-section information held at the time of the present back-up processing can be used at the time of the next back-up processing.

Further, at the time of the next back-up processing, the last-recorded-section information saved at the PC 20 side at the time of the previous back-up processing, and the recording section information of each content file Fct stored in the index file Findex saved at the digital video camera 1 side are compared. Accordingly, the PC 20 can find out that the content file Fct having a recording order of a value greater than the recording order included in the last-recorded-section information held at the PC 20 side is a content file Fct added at the digital video camera 1 side from the time of the previous back-up processing to the time of the present back-up processing. Further, in the event that there is a content file Fct having a recording order of a value equal to that of the recording order included in the last-recorded-section information held at the PC 20 side, the PC 20 can find out that this is a content file Fct added from the time of the previous back-up processing to the time of the present back-up processing, by comparing the content creating date-and-time and recording time of the content file Fct with the content creating date-and-time and recording time included in the last-recorded-section information held at the PC 20 side.

Thus, it can be understood that the last-recorded-section information held at the PC 20 side functions as difference information (in this case, only "contents added"). In this light, in FIGS. 37 and 38 described below, the last-recorded-section information will be presented as difference information detection information.

As described above, the difference between the save-all-contents saving processing according to the seventh embodiment and the save-all-contents saving processing according to the sixth embodiment is in that in the event that recording order of the same value is assigned to multiple content files Fct, back-up processing is performed based on the content creating date-and-time and recording time.

Next, back-up processing (simplified save-all-contents) according to the seventh embodiment in a case wherein a content file Fct which has already been backed-up is divided, will be described with reference to the drawings.

Figure 37:
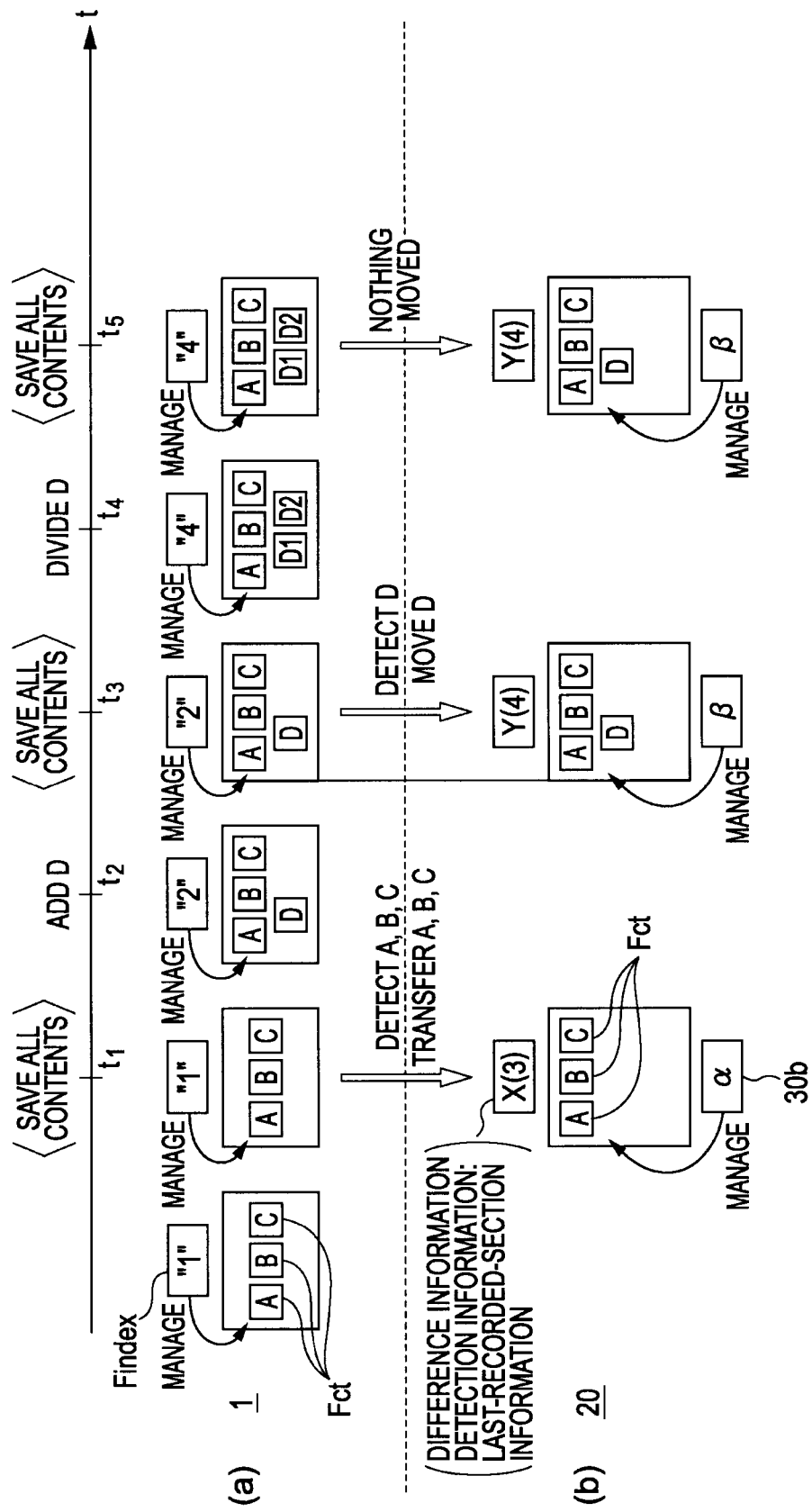
FIG. 37 is a drawing schematically illustrating back-up processing (simplified save-all-contents) according to a seventh embodiment.
Figure 38:
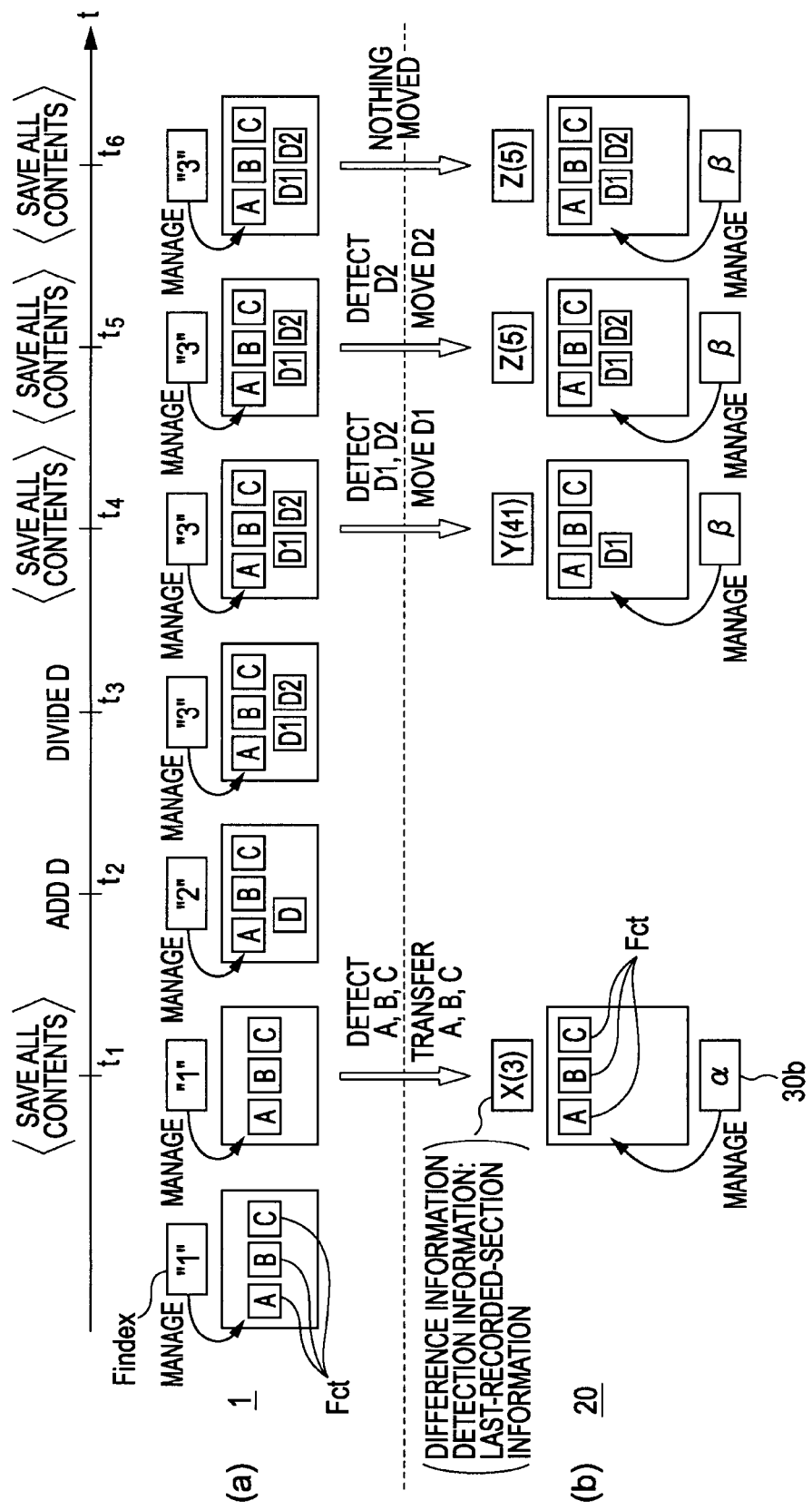
FIG. 38 is a drawing schematically illustrating back-up processing (simplified save-all-contents) according to the seventh embodiment.

FIGS. 37 and 38 schematically illustrate back-up processing (simplified save-all-contents) according to the seventh embodiment. As with the above-described FIGS. 7, 14, 17, 20, 23, and 27, (a) in FIGS. 37 and 38 illustrates state transition along the time axis t with regard to the index file Findex and content files Fct recorded to the HDD 14 of the digital video camera 1, and (b) in FIGS. 37 and 38 illustrates state transition along the same time axis t with regard to the index file Findex, content files Fct, and PC side management information 30b, recorded in the HDD 30 of the personal computer 20.

Note that FIG. 37 is a drawing illustrating an example of back-up processing in a case of a content file Fct having been recorded to the HDD 30 of the personal computer 20, and then the content file Fct divided at the digital video camera 1 side. Also, FIG. 38 is a drawing illustrating an example of back-up processing in a case of a content file Fct being divided at the digital video camera 1 side before having been recorded to the HDD 30 of the personal computer 20.

Note that in FIGS. 37 and 38, the transition of storage state of the content files Fct at the digital video camera 1 side from point-in-time t1 through point-in-time t6 and corresponding transition of the information in the index file Findex, and also the transition of storage state of the content files Fct at the PC 20 side, are generally the same as with the above-described back-up processing, so description of these will be omitted.

FIG. 37 will be described in detail now. In the first save-all-contents processing at point-in-time t1, the content files Fct saved at the digital video camera 1 side are the three of "A", "B", and "C", so the last-recorded-section information is "recording section information of C", for example. In this case, as shown in FIG. 37, at the PC 20 side, these content files "A", "B", and "C" are transferred and saved, and only the last-recorded-section information "recording section information of C" is held ("X(3)" in FIG. 37). Thus, there is no need to transfer and save all of the index file Findex saved at the digital video camera 1 side to the PC 20, as with the first through fifth embodiments.

Then, at the save-all-contents processing at point-in-time t3 following a content file "D" having been added at the digital video camera 1 side at point-in-time t2, the last-recorded-section information saved at the time of save-all-contents processing at point-in-time t1, and the recording section information of each of the content files Fct within the index file Findex held at the digital video camera 1 side at point-in-time t2, are compared, thereby identifying content files added from point-in-time t1 to point-in-time t3.

For example, at point-in-time t3, comparing the value of the recording order of the last-recorded-section information saved at the save-all-contents processing at point-in-time t1 with the that of the recording order of the content files Fct within the index file Findex held at the digital video camera 1 side at point-in-time t2, shows that there is a content file "C" present in the digital video camera 1 side, that has been correlated with recording order of the same value as the recording order of the last-recorded-section information. However, the content file "C" has not been divided, so the content creating date-and-time and recording time of the last-recorded-section information and the content creating date-and-time and recording time of the content file "C" are the same value. Thus, the content file "C" has already been saved in the PC 20, and accordingly is not transferred.

In the same way, comparing the value of the recording order of the last-recorded-section information with the that of the recording order of the content files Fct held at the digital video camera 1 side at point-in-time t3 shows that there is a content file "D" present in the digital video camera 1 side, that has been correlated with recording order of a greater value as the recording order of the last-recorded-section information. Accordingly, the content file "D" is transferred and saved, and only the last-recorded-section information "recording section information of D" is held ("Y(4)" in FIG. 37).

That is to say, the recording order of the content files Fct within the index file Findex held at the digital video camera 1 side in this case is "1", "2", "3", "4", for "A", "B", "C", and "D", respectively, with the content file "D" correlated with the recording order "4" which is greater than the recording order "3" of the last-recorded-section information being identified as the content file Fct added from the previous time.

In the case of this example, the file path C7 (see FIG. 6) is listed as information for identifying a content file Fct with a greater recording order value than that of the last-recorded-section information. However, the information for identifying a content file Fct is not restricted to the file path C7, and content ID C5 (FIG. 6) may be listed instead.

Upon a content file Fct which has been added since the previous time being identified, the PC 20 makes a transfer request to the digital video camera 1 side to transfer that content file Fct. In this case, the transfer request is for the content file "D". The transferred content file Fct ("D") is then saved in the HDD 30.

In this case as well, the PC 20 saves the recording section information the last in order as recording section information ("D" in this case) as the last-recorded-section information (difference information detecting information) ("Y(4)" in FIG. 37), based on the index file Findex held at the digital video camera 1 side.

In the save-all-contents processing at point-in-time t5 following the content file "D" having been divided into content files "D1" and "D2" at point-in-time t4, there is no movement of content file Fct from the digital video camera 1 side to the PC 20 side, as shown in FIG. 37. That is to say, in this case, there is no content file Fct having a greater recording order than the recording order of the last-recorded-section information, and also, while there are content file Fct at the digital video camera 1 having recording order of the same value as that of the recording order of the last-recorded-section information (i.e., content files "D1" and "D2"), the content creating date-and-time and the recording time of the last-recorded-section information is compared with the content creating date-and-time and the recording time content files "D1" and "D2", which shows that the last-recorded-section information is not recording section information behind the recording section information of the content files "D1" and "D2" in order, so there is no transfer thereof.

In this case, the PC 20 saves the last-recorded-section information based on the index file Findex transferred from the digital video camera 1 ("Y(4)" in FIG. 37).

Next, the specific operations of an example of back-up processing will be described with reference to FIG. 38. the transition in FIG. 38 through point-in-time t2 is the same as the transition shown in FIG. 37, so description thereof will be omitted here.

Following the content file "D" having been added at the digital video camera 1 side in point-in-time t2, the content file "D" is divided into content files "D1" and "D2" at point-in-time t3. In this case, the content files "D1" and "D2" following dividing are appropriated recording order with the same value, and content creating date-and-time and the recording time corresponding to each is correlated as recording section information.

Next, in the save-all-contents processing at point-in-time t4, the last-recorded-section information saved at the PC 20 side at the time of save-all-contents processing at point-in-time t1, and the recording section information of each content file Fct within the index file Findex held at the digital video camera 1 side at this point-in-time t3, are compared, and content files Fct correlated with recording section information behind the last-recorded-section information in order are identified.

That is to say, the recording order regarding each content file Fct in the index file Findex at the digital video camera 1 side is "1", "2", "3", "4", "4", for "A", "B", "C", "D1", and "D2", respectively. Now, the content file "C" has not been divided, so the recording section information of the content file "C" is the same as the last-recorded-section information. Accordingly, the content file "C" is not transferred. Also, the content files "D1" and "D2" are correlated with a recording order "4" which is greater than the recording order "4" of the last-recorded-section information, and accordingly are content files Fct correlated with recording section information behind the last-recorded-section information in order, and thus are identified as content files Fct added from the previous time.

In the case of the seventh embodiment, information for identifying a content file Fct which is correlated with recording section information behind the last-recorded-section information in order, and which has been added since the previous time, is listed in the simplified difference information list LSB-e in the same way as with the sixth embodiment, as shown in FIG. 28.

In the case of this example, the file path C7 is listed as information for identifying a content file Fct correlated with recording section information behind the last-recorded-section information in order. However, the information for identifying a content file Fct is not restricted to the file path C7, and content ID C5 may be listed instead.

Returning to FIG. 38, upon identifying content files Fct added to the simplified difference information list LSB-e from the previous time, the PC 20 gives a transfer request to the digital video camera 1 side to transfer the content files Fct. Here, the PC 20 gives a transfer request to the digital video camera 1 side to transfer the content files "D1" and "D2".

Now, let us say that at point-in-time t4, the back-up processing is terminated for one reason or another following having made the transfer request, and only the content file "D1" has been transferred of the content files "D1" and "D2". In this case, the transferred content file Fct ("D1") is saved at the HDD 30.

Also, the PC 20 saves the recording section information last in order (i.e., in this case, the recording section information of the content file "D1") as the last-recorded-section information (difference information detecting information), based on the index file Findex held at the digital video camera 1 side ("Y(41)" in FIG. 38).

In this way, in the event that the back-up processing has been terminated for one reason or another, a case can be conceived wherein at least just one file of the content files Fct to which recording order of the same value has been assigned is transferred, and the remaining content files are not transferred. Accordingly, with the seventh embodiment, the last-recorded-section information is recorded at the PC 20 side, so that proper back-up processing is executed even in the case that there are multiple content files assigned recording order of the same value.

Let us say that at the point-in-time t5 following the back-up processing having been terminated at point-in-time t4, save-all-contents processing is further executed. In the save-all-contents processing at the point-in-time t5, the last-recorded-section information saved at the PC 20 side at the time of save-all-contents processing at point-in-time t4 is compared with the recording section information of each content file Fct in the index file Findex held at the digital video camera 1 side at this point-in-time t5, and content files Fct correlated with recording section information behind the last-recorded-section information in order is identified.

That is to say, the recording order regarding each content file Fct in the index file Findex at the digital video camera 1 side is "1", "2", "3", "4", "4", for "A", "B", "C", "D1", and "D2", respectively. Now, the content files "D1" and "D2" are correlated with the recording order "4" which is the same value as the recording order "4" of the last-recorded-section information. Accordingly, the content creating date-and-time and the recording time of the last-recorded-section information is compared with the content creating date-and-time and the recording time of the content files "D1" and "D2", whereby the content file "D2" is identified as a content file Fct correlated with recording section information behind the last-recorded-section information in order. That is to say, the content file "D2" is identified as a content file Fct which has been added since the previous time.

Here, information for identifying a content file Fct which has been added since the previous time is listed in the simplified difference information list LSB-e, as shown in FIG. 28.

In the case of this example, the file path C7 is listed as information for identifying a content file Fct correlated with recording section information behind the last-recorded-section information in order. However, the information for identifying a content file Fct is not restricted to the file path C7, and content ID C5 may be listed instead.

Returning to FIG. 38, upon identifying content files Fct added to the simplified difference information list LSB-e from the previous time, the PC 20 gives a transfer request to the digital video camera 1 side to transfer the content files Fct. Here, the PC 20 gives a transfer request to the digital video camera 1 side to transfer the content file "D2".

In this case, the transferred content file Fct ("D2") is saved in the HDD 30. Also, the PC 20 saves the recording section information last in order (i.e., in this case, the recording section information of the content file "D2") as the last-recorded-section information (difference information detecting information), based on the index file Findex held at the digital video camera 1 side ("Z(5)" in FIG. 38).

Next, in the save-all-contents processing at point-in-time t6 following the transfer processing of the content file "D2" having been performed at point-in-time t5, there is no moving of content files Fct from the digital video camera 1 side to the PC 20 side. That is to say, in this case, there is no content file Fct at the digital video camera 1 side correlated with recording section information behind the last-recorded-section information in order, so the simplified difference information list LSB-e is empty, and accordingly, no transfer request is made to the digital video camera 1 side.

Also, the PC 20 saves the recording section information of the content file "D2", based on the index file Findex held at the digital video camera 1 side ("Z(5)" in FIG. 38).

With the simplified save-all-contents processing according to the seventh embodiment, all content files Fct which have been the object of saving to the PC 20 side in the past can be saved at the PC 20 side, in the same way as with the sixth embodiment.

Also, only the difference files are actually transferred in this case, and compared to the case of realizing saving by overwriting all contents and copying, the save-all-contents processing can be performed faster. Also the content files Fct to be transferred can be reduced, whereby the processing load can also be alleviated.

Also, according to the simplified save-all-contents in this case in particular, only the recording section information needs to be compared for generating difference information. Accordingly, difference information can be obtained at a faster speed than the case of comparing the index files Findex for previous and present back-up times as with the third embodiment, whereby the save-all-contents processing can be performed at a faster speed in this way.

7-2. Processing Operations

Figure 39:
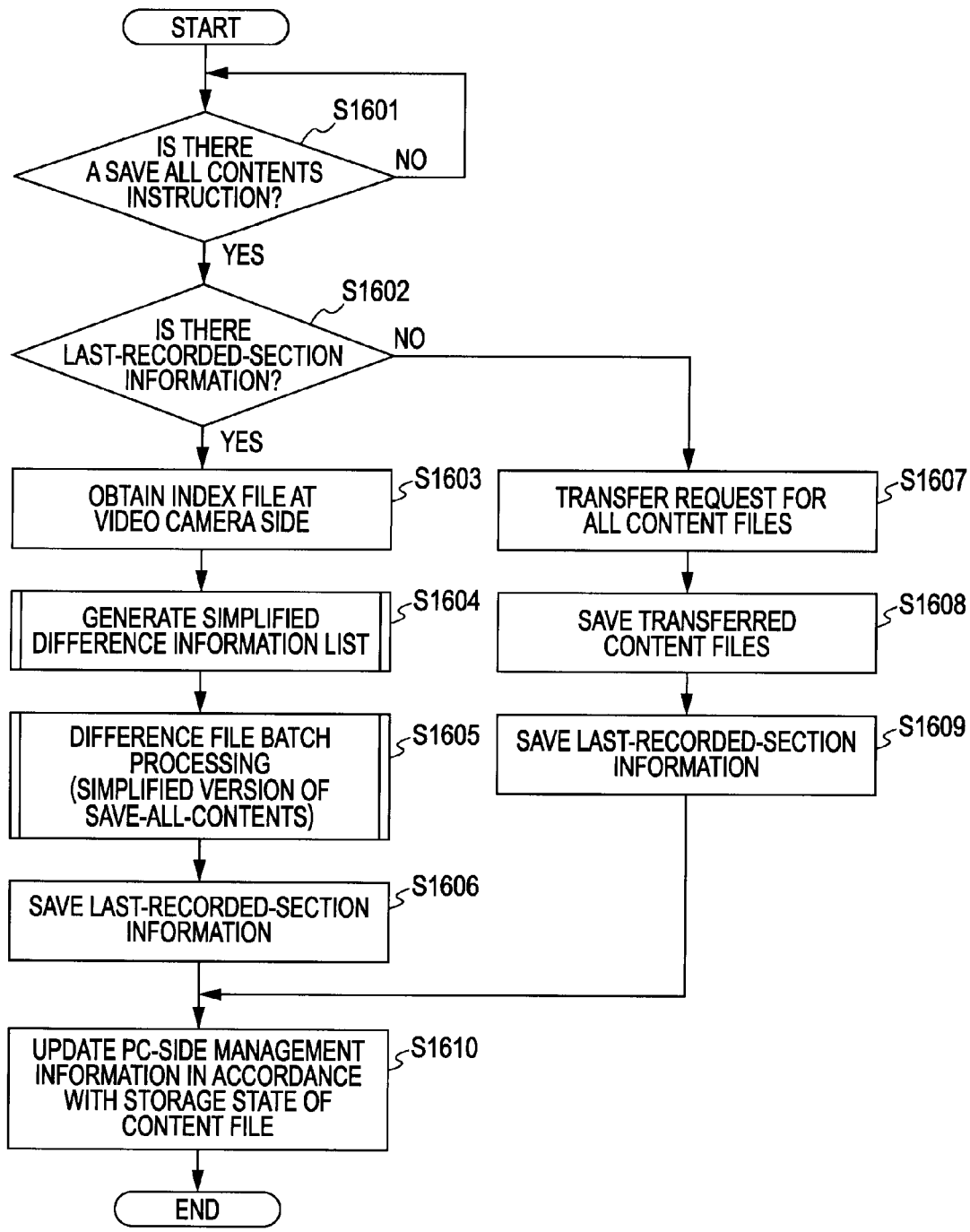
FIG. 39 is a flowchart illustrating the overall flow of simplified save-all-contents processing according to the seventh embodiment.
Figure 40:
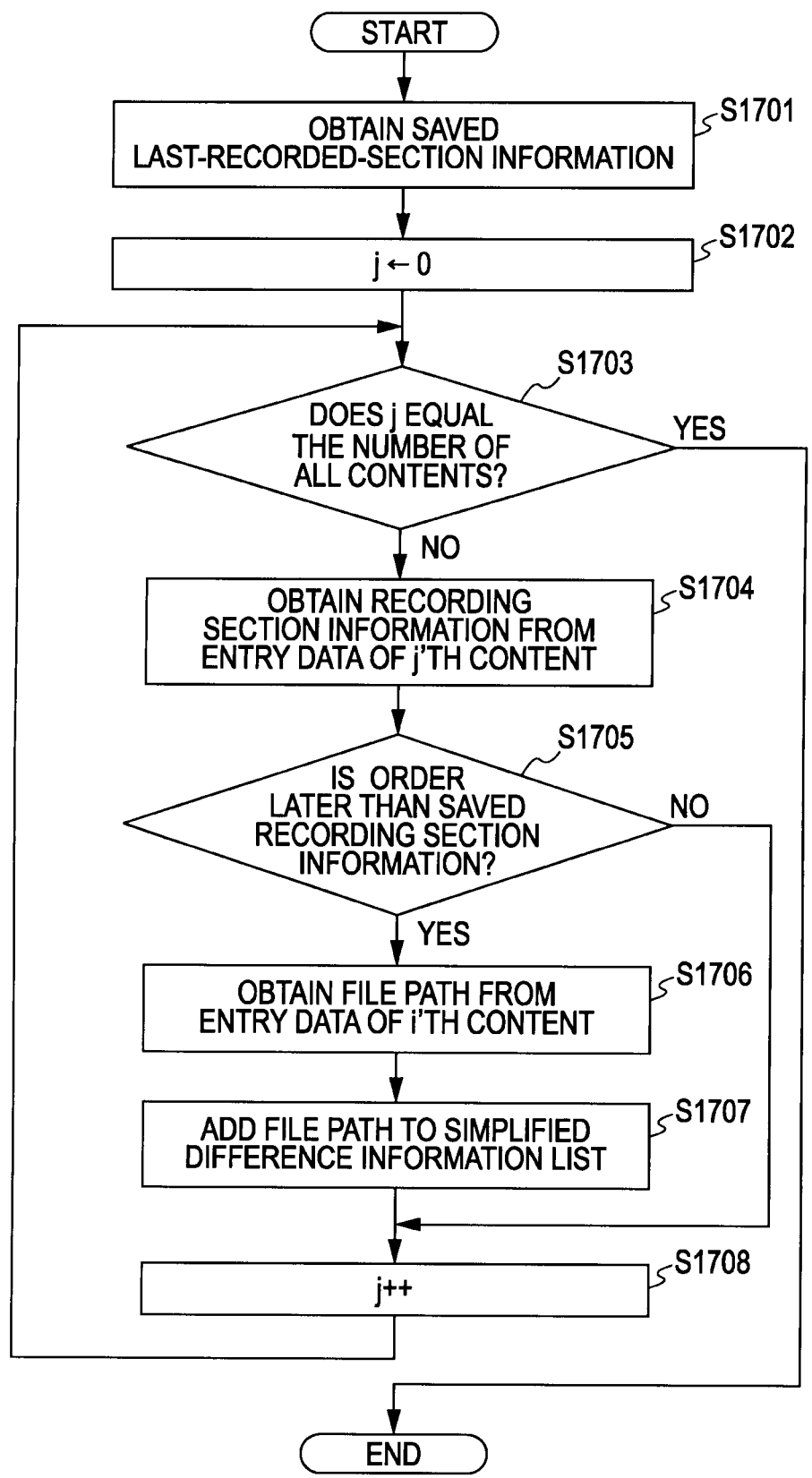
FIG. 40 is a flowchart illustrating simplified difference information list generating processing.

FIGS. 39 and 40 show the processing operations for realizing the operations of the simplified save-all-contents according to the above description.

Figure 41:
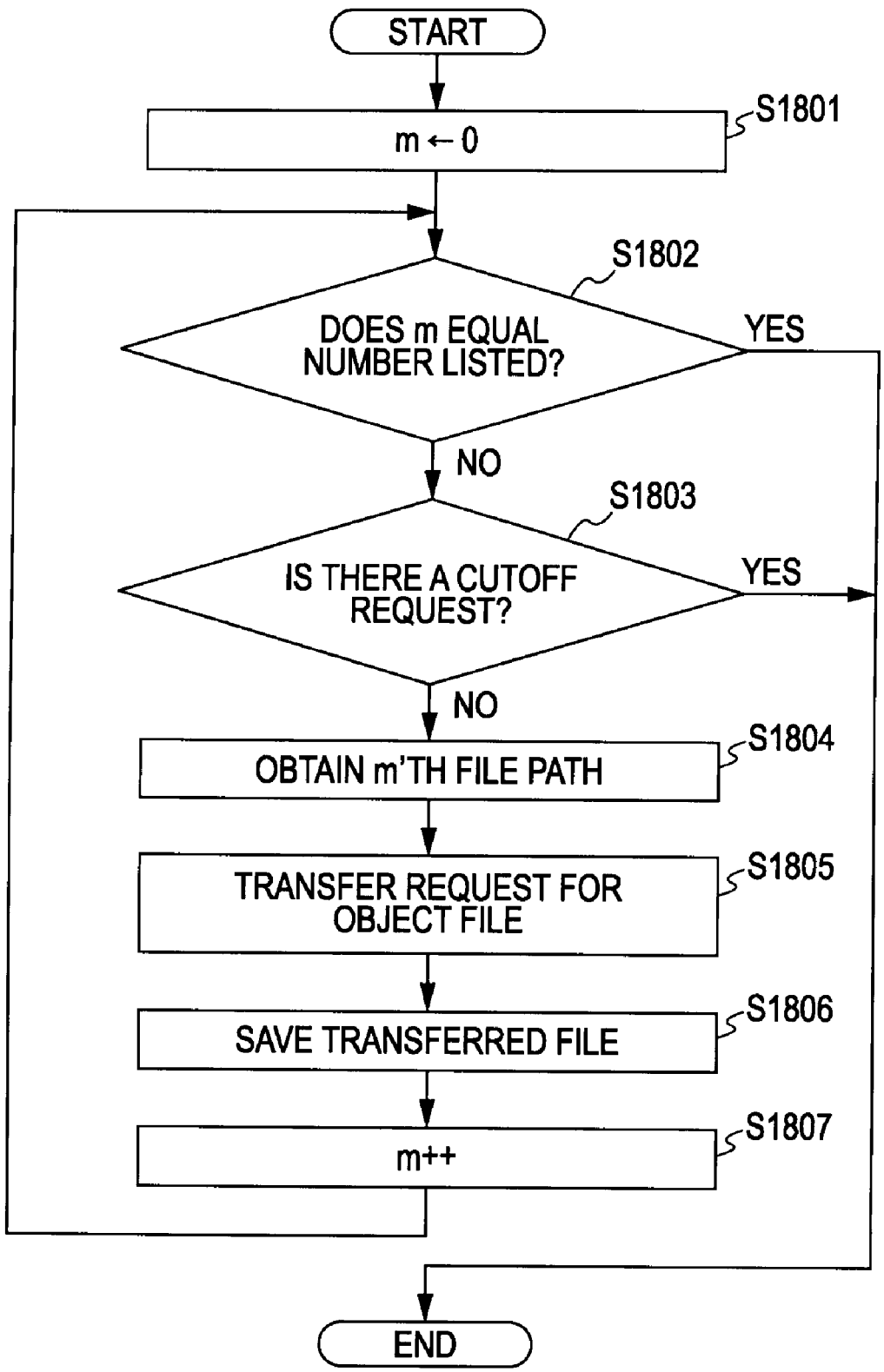
FIG. 41 is a flowchart illustrating what is being processed in difference file group processing (simplified save-all-contents)
Figure 42:
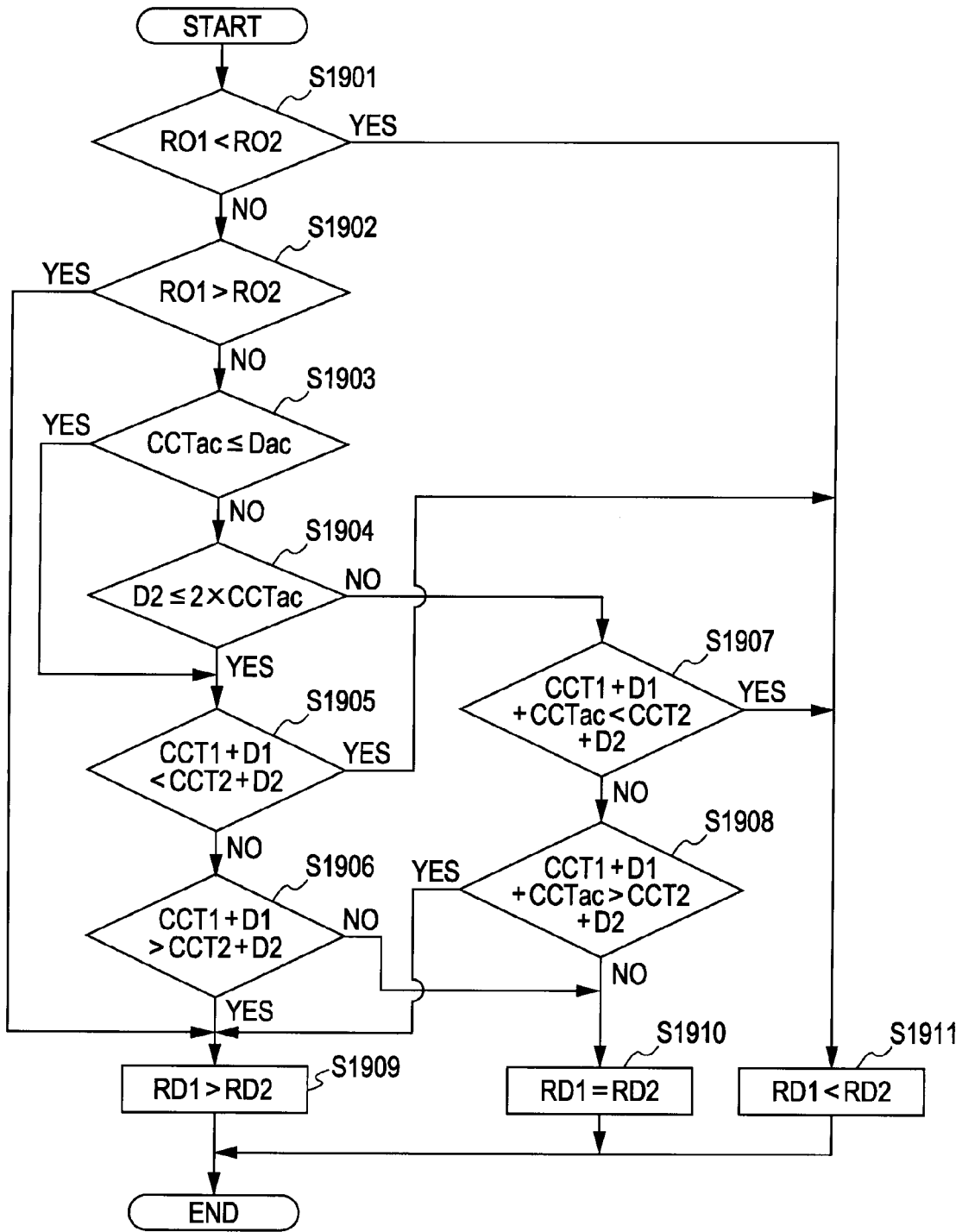
FIG. 42 is a flowchart illustrating what is being processed in determination processing.

With these drawings, FIG. 39 shows an overall flow of the simplified save-all-contents processing. Also, FIG. 40 shows the content for the simplified difference information list generating processing serving as step S1604 in FIG. 39. FIG. 41 shows the processing of the difference file group processing (simplified save-all-contents) as step S1605 shown in FIG. 39. Further, FIG. 42 illustrates the processing in step S1705 shown in FIG. 40.

Note that the processing operations shown in these drawings are to be executed by the CPU 21 based on the back-up processing program 30a.

Also, with FIG. 39, the digital video camera 1 and personal computer 20 are assumed to already be in a state of being connected so as to be capable of data communication.

Also, the processing operations in this case are shown only for the personal computer 20 side, but on the digital video camera 1 side in this case, processing to transfer the content files Fct/index file Findex according to a request from the PC 20 side is performed. Also, as can be understood from the descriptions up to now, as a premise in this case, a recording order is generated for every creation of content file Fct (includes content files Fct after updating) in the HDD 14 on the digital video camera 1 side, and this is stored as content ID C5 within the entry data corresponding to the index file Findex, and also, the content creating date-and-time and the recording time of the last-recorded-section information are stored in the entry data.

First, with FIG. 39, instructions for save-all-contents processing is awaited in step S1601. This step S1601 is the same as step S601 in the case of save-all-contents processing shown in FIG. 18, described earlier.

In the case that affirmative results are obtained that there is instruction for saving all contents, determining processing is performed in step S1602 as to whether or not last-recorded-section information has been backed-up. This is to determine whether or not the last-recorded-section information has been backed-up, as with the processing in step S602 of FIG. 18, as to whether or not the index file Findex had been already backed-up, whereby determination is made as to whether or not processing for saving all contents has been already made in the past.

In the case that negative results are obtained that the last-in-recording-order is not backed-up, this is the first save-all-contents processing, in which case the flow is advanced to step S1607 to perform a transfer request for all content files, and also processing is executed to save the content files transferred in the following step S1608.

Following this, processing is executed in step S1609 in this case to save the last-recorded-section information. That is to say, in step S1609, a transfer request is performed to the digital video camera 1 side, and the index file Findex is transferred, whereupon the recording section information which is last in order in the entry data (each of the management file slots Sm) in the transferred index file Findex is saved as the last-recorded-section information. The saving destination for this last-recorded-section information may be the HDD 30, for example.

Upon saving the last-recorded-section information in step S1609, the flow is advanced to step S1610, and the processing to update the PC 20 side management information 30b is executed according to the storage states of the content files. That is to say, with the simplified save-all-contents processing, the content files Fct stored in the HDD 30 are managed by the PC side management information 30b on the PC 20 side.

Also, in step S1602, in the case that affirmative results are obtained that a last-recorded-section information has been saved, this is a case wherein save-all-contents processing has already be performed, so in that case the flow is advanced to step S1603, and processing is executed to obtain the index file at the digital video camera 1 side. That is to say, a transfer request is performed to the digital video camera 1 side and the index file Findex is transferred, and this is temporarily held by the memory unit 22 or the like, for example.

Following this, in the following step S1604, the simplified difference information list generating processing is executed.

FIG. 40 shows the detailed content of the simplified difference information list generating processing as step S1604.

With FIG. 40, first in step S1701, the saved last-recorded-section information is obtained. Following this in the next step S1702, the pointer value j is reset to 0. The pointer value j serves as a pointer to indicate the entry data object from each entry data (management file slot Sm) which is entered within the index file Findex obtained from the digital video camera 1 side in step S1603. In this sense, the pointer value j has been denoted with the same symbol with regard to the discrepancy detection information list LDd for back-up this time, as described earlier.

In the following step S1703, determining processing is performed as to whether or not the pointer value j matches the all contents count. That is to say, determination processing is performed as to whether or not the pointer value j matches the count of entry data entered in the obtained index file Findex.

In the case that negative results are obtained that the pointer value j does not match the all contents count, this is a case wherein processing to be described below regarding all entry data is not yet performed, in which case processing subsequent to step S1704 is executed.

First, in step S1704, the recording section information is obtained from the entry data of the j'th content. That is to say, the recording section information indicated by the pointer value j is obtained.

Following this, in step S1705, determination processing is performed as to whether or not the recording section information thus obtained is behind the last-recorded-section information in order. In the event that affirmative results are obtained that the recording section information is behind the last-recorded-section information in order, the file path is obtained from the entry data of the j'th content in step S1706. That is to say, the file path C7 within the entry data indicated by the pointer value j is obtained.

In the following step S1707, processing is executed to add the file path to the simplified difference information list. That is to say, the information of the obtained file path C7 is listed in the simplified difference information list LSB-e described with FIG. 28. The simplified difference information list LSB-e is temporarily held in the memory unit 22 or the like, for example. The determination processing in step S1705 will be described in detail with reference to FIG. 42.

After the file path is added to the simplified difference information list in step S1707, the pointer value j is incremented in the following step S1708, and the flow is returned to step S1703.

On the other hand, in the case that negative results are obtained in step S1705, that the recording section information is not later than the last-recorded-section information in order, the flow is advanced to step S1708, and after the pointer value j is incremented, the flow is returned to step S1703. That is to say, the content file Fct having recording section information which is the same or before the last-recorded-section information is a content file Fct saved already on the PC 20 side, so the information of the file path C7 thereof is not added to the simplified difference information list LSB-e.

In the event that affirmative results are obtained in step S1703 that the pointer value j matches the all-contents count, the comparison with the last-recorded-section information regarding all of the entry data within the index file Findex obtained from the digital video camera 1 side is completed, and the generating of the simplified difference information list LSB-e is completed. Accordingly, in the case that affirmative results are thus obtained in step S1703, the flow is advanced to the step S1605 shown in FIG. 39.

FIG. 41 shows the content of the difference file group processing (simplified save-all-contents) as step S1605 shown in FIG. 39.

In FIG. 41, first in step S1801 the pointer value m is reset to 0. This pointer value m serves as a pointer for indicating the file path C7 out of the file paths C7 to be listed in the simplified difference information list LSB-e.

In the following step S1802, determining processing is performed as to whether or not the pointer value m matches the list count. That is to say, determination is made as to whether or not the pointer value m matches the list count of the file paths C7 in the simplified difference information list LSB-e.

In the case that negative results are obtained in step S1802 that the pointer value m does not match the list count in the simplified difference information list LSB-e, this indicates that processing to be described below regarding all listed file paths C7 (content files Fct) has not been performed, in which case the flow is advanced to follow step S1803.

Next, in step S1803, determination is made regarding whether or not there has been a termination request for the back-up processing. In the event that there has been a termination request for the back-up processing, the difference file group processing (simplified save-all-contents) is ended, and the processing is advanced to step S1606 in FIG. 39. In the event that there is no termination request for the back-up processing, the flow proceeds to step S1804.

In step S1804, the m'th file path is obtained. That is to say, the file path C7 indicated by the pointer value m in the simplified difference information list LSB-e is obtained.

Next, in step S1805, a transfer request for an object file is performed. That is to say, a transfer request for the content file Fct specified by the obtained file path C7 is made to the digital video camera 1 side.

Following this, in step S1806, processing is executed to save the transferred files. Thus the content files Fct held only at the digital video camera 1 side can be transferred and saved at the PC 20 side.

Upon executing the saving process in step S1806, the pointer value m is incremented in step S1807, and the flow is returned to the previous step S1802.

In the case that affirmative results are obtained that the pointer value m has matched the list count in step S1802, this is a case wherein the transfer request and saving processing for all of the files listed in the simplified difference information list LSB-e is completed, in which case the difference information file group processing (simplified save-all-contents) is ended, and the flow is advanced to step S1606 in FIG. 39.

In FIG. 39, in step S1606, processing is executed to update the last-recorded-section information. That is to say, the content ID within each entry data in the index file Findex obtained from the digital video camera 1 side in the step S1603 is referenced, and the recording section information with the last order is obtained as the new last-recorded-section information. Following this, processing is executed wherein the value of the last-recorded-section information already saved is updated to the value of the newly obtained last-recorded-section information.

Upon executing the updating processing of the last-in-recording-order in step S1606, the flow is advanced to step S1610 described above, and processing is executed to update the PC side management information 30b according to the storage state of the content file.

FIG. 42 is a drawing showing the determining process in step S1705 shown in FIG. 40.

A sequence relation will be described wherein for example, the last-recorded-section information is "RD1={RO1, CCT1, D1}", and the recording section information to be compared is "RD2={RO2, CCT2, D2}".

In step S1901 or step S1902 in FIG. 42, the recording order (RD1) of the last-recorded-section information and the recording order (RD2) of the recording section information to be compared are compared and the size relation therebetween is determined.

In the case that determination is made in step S1901 that "RO1<RO2", the flow is advanced to step S1911, wherein the sequence relation between the last-recorded-section information (RD1) and the recording section information to be compared (RD2) is determined to be "RD1<RD2" and the process is ended.

On the other hand, in the case that determination is made in step S1902 that "RO>RO2", the flow is advanced to step S1909, wherein the sequence relation between the last-recorded-section information (RD1) and the recording section information to be compared (RD2) is determined to be "RD1>RD2" and the process is ended.

In a case wherein neither "RO1<RO2" nor "RO1>RO2" is applicable in step S1901 or S1902, this is a case of "RO1=RO2". In such a case, the flow is advanced to step S1903, wherein the precision of the content create date-and-time (CCTac) and the precision of the recording time (Dac) are compared and the size relation therebetween is determined.

In the case that "CCTac≦Dac" is determined in step S1903, the flow is advanced to step S1905, the total value of the content create date-and-time and the recording time are compared and the size relation therebetween is determined. Also, in the case that "CCTac>Dac" is determined in step S1903, the flow is advanced to step S1904.

In the case that "D2≦2×CCTac" is determined in step S1904, the flow is advanced to step S1905, the total value of the content create date-and-time and the recording time are compared and the size relation therebetween is determined.

In the case that "CCT1+D1<CCT2+D2" is determined in step S1905, the flow is advanced to step S1911, wherein the sequence relation between the last-recorded-section information (RD1) and the recording section information to be compared (RD2) is determined to be "RD1<RD2" and the process is ended.

On the other hand, in the case that "CCT1+D1<CCT2+D2" is not determined in step S1905, the flow is advanced to step S1906. In the case that "CCT1+D1<CCT2+D2" is determined in step S1906, the flow is advanced to step S1909, wherein the sequence relation between the last-recorded-section information (RD1) and the recording section information to be compared (RD2) is determined to be "RD1<RD2" and the process is ended.

Also, in the case that "CCT1+D1<CCT2+D2" is not determined in step S1905, and "CCT1+D1>CCT2+D2" is not determined in step S1906, this is a case of "CCT1+D1=CCT2+D2". In this case, the flow is advanced to step S1910, wherein the sequence relation between the last-recorded-section information (RD1) and the recording section information to be compared (RD2) is determined to be "RD1=RD2" and the process is ended.

In the case that "D2≦2×CCTac" is not determined in step S1904, this is a case of "D2>2×CCTac". In this case, the flow is advanced to step S1907, wherein "CCT1+D1+CCTac" and "CCT2+D2" are compared and the size relation therebetween is determined.

In the case that "CCT1+D1+CCTac<CCT2+D2" is determined in step S1907, the flow is advanced to step S1911, wherein the sequence relation between the last-recorded-section information (RD1) and the recording section information to be compared (RD2) is determined to be "RD1<RD2" and the process is ended.

On the other hand, in the case that "CCT1+D1+CCTac<CCT2+D2" is not determined in step S1907, the flow is advanced to step S1908. In the case that "CCT1+D1+CCTac>CCT2+D2" is determined in step S1908, the flow is advanced to step S1909, wherein the sequence relation between the last-recorded-section information (RD1) and the recording section information to be compared (RD2) is determined to be "RD1>RD2" and the process is ended.

Also, in the case that "CCT1+D1+CCTac<CCT2+D2" is not determined in step S1907, and "CCT1+D1+CCTac>CCT2+D2" is not determined in step S1908, this is a case of "CCT1+D1+CCTac=CCT2+D2". In this case, the flow is advanced to step S1910, wherein the sequence relation between the last-recorded-section information (RD1) and the recording section information to be compared (RD2) is determined to be "RD1=RD2" and the process is ended.

Note that with the sequence relation of the last-recorded-section information (RD1) and the recording section information to be compared (RD2) in step S1909, in the case that "RD1>RD2" is determined, the recording section information to be compared (RD2) is determined to be earlier in the sequence than is the last-recorded-section information (RD1).

Also, with the sequence relation of the last-recorded-section information (RD1) and the recording section information to be compared (RD2) in step S1910, in the case that "RD1=RD2" is determined, the recording section information to be compared (RD2) is determined to be in the same order within the sequence as the last-recorded-section information (RD1).

Further, with the sequence relation of the last-recorded-section information (RD1) and the recording section information to be compared (RD2) in step S1911, in the case that "RD1<RD2" is determined, the recording section information to be compared (RD2) is determined to be later in the sequence than is the last-recorded-section information (RD1).

Note that as can be understood from the description of FIGS. 39 through 42, the seventh embodiment is also arranged such that a difference information list is generated, following which transfer request for each file listed sequentially, and transfer file saving are performed, but in the case also the transfer request and saving process for the file can be performed each time a difference file is specified without generating a difference information list.

Also, an arrangement may be made wherein a transfer request and saving processing can be performed for all files at once which are listed in the difference list.

Also, with the seventh embodiment, a case for realizing recording sequence information with recording section information is exemplified, but the content ID C5 from a combination of the file path C7 and file update date-and-time described in each of the embodiments can also be employed as recording sequence information.

Thus, according to the seventh embodiment, even in a case wherein the same value is assigned to multiple content as the recording order showing the recording sequence of the index file, appropriate back-up processing can be executed.

Note that with the embodiments according to the present invention, an example is shown for executing back-up processing based on the control of the personal computer 20 side, in a case wherein the digital video camera 1 and personal computer 20 are connected, but in the case of executing the back-up processing, an arrangement may be made to execute back-up processing based on the control of the digital video camera 1 side. That is to say, with the digital video camera 1, a back-up processing program similar to the back-up processing program 30*a* is stored in the HDD 14, for example, and based on this back-up processing program, the CPU 10 can execute the various types of back-up processing shown with the embodiments of the present invention.

8. Modified Example

The description up to now has been according to the embodiments of the invention, but the present invention should not be limited to the embodiments described up to now.

For example with the embodiments, a case has been exemplified wherein file relating information other than a file identifier (content ID) is entered into the first management information (index file Findex) as entry data, but this can be suitably employed with the present invention also in a case of management information wherein the file relating information other than the file identifier is not entered.

Also, with the embodiments, an arrangement is made wherein a backed-up content file Fct from the digital video camera 1 side is managed by a PC side management information 30*b* which is separated from the index file Findex, but an arrangement may be made to manage the various content files Fct with the index file Findex backed-up from the digital video camera 1 side, whether or not such separate management information is employed.

For example in the case that synchronizing processing is performed, if the content files Fct are stored with the same directory configuration on the HDD 14 side and the HDD 30 side, the content files Fct accurately stored in the HDD 30 by the index file Findex which is backed-up from the digital video camera 1 side on the PC 20 side can be managed.

Although not exemplified in the embodiments up to now, the synchronizing and save-all-contents processing, and the restoring processing of the previous synchronizing state can be combined. To confirm, if the restoring process is in the previous synchronizing state, the processing to associate with the various back-up points-in-time and save the index file Findex does not need to be performed.

Additionally, for example the save-all-contents processing (third embodiment) and the restoring processing of the previous synchronizing state can be combined.

Also, with the embodiments, a case wherein the recording/playback device of the present invention is an imaging device such as a digital video camera 1 or the like is exemplified, but the recording/playback device in the present invention can widely include that which manages the various content files (not necessarily the AV files or still image files exemplified with the embodiments) recorded in a predetermined first recording medium.

Also, a case wherein the information processing device is exemplified as the personal computer 20, but the present embodiment can be applicable to the information processing device having at least communication means to enable data communication between the external recording/playback device (imaging device or the like), and recording/playback means to enable the recording playback of the data as to a predetermined second recording medium, and should not be limited to a personal computer.

Note that the embodiments of the present invention show one example to specify the present invention, and as shown below have correlating relations with the invention particulars within the scope of the claims, but the invention is not restricted to these, and various modifications may be made within the scope of the claims.

Note that the processing procedures described with the embodiments of the present invention may be carried out as a method having the series of procedures, or as a program for causing a computer to execute the series of procedures and a recording medium storing the program.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   a first recording medium for recording a content file which is image data which has been imaged;
   management information storage means for storing first management information for managing the content file recorded in said first recording medium; and
   communication means for performing data communication with an information processing device including a second recording medium for recording a predetermined content file;
   wherein, in a state of being capable of data communication with said information processing device by said communication means, said imaging device is controlled so as to
      detect difference information relating to the storage state of the content file recorded in said first recording medium, based on the results of comparing
         present first management information which is first management information stored in said management information storage means, with
         past first management information which is first management information which has been recorded before said present first management information and which is first management information of the point-in-time at which the content file recorded in said first recording medium was saved to said second recording medium, and
      record, in said second recording medium, said content file recorded in said first recording medium, based on said detected difference information.

2. The imaging device according to claim 1, wherein said first management information is management information managed by a file identifier for uniquely identifying each of the content files recorded in said first recording medium;
   and wherein said imaging device is controlled so as to
      detect, as said difference information,
         content files added to said first recording medium and content files deleted from said first recording medium during at least a period from a point-in-time at which said past first management information was obtained to a point in time at which said present first management information was obtained,
      based on the results of comparing
         said file identifier entered in said present first management information with
         said file identifier entered in said past first management information,
      record, in said second recording medium, content files added to said first recording medium, and
      delete, from said second recording medium, content files corresponding to content files deleted from said first recording medium.

3. The imaging device according to claim 1, wherein said first management information is management information managed by a file identifier for uniquely identifying each of the content files recorded in said first recording medium;
   and wherein, in the event that a predetermined instruction is performed, said imaging device is controlled so as to
      detect, as said difference information,
         content files added to said first recording medium and content files deleted from said first recording medium during at least a period from a point-in-time at which said past first management information was obtained to a point in time at which said present first management information was obtained,
      based on the results of comparing
         said file identifier entered in said present first management information with
         said file identifier entered in said past first management information,
      delete, from said first recording medium, content files added to said first recording medium, and
      record, in said first recording medium, content files recorded in said second recording medium corresponding to content files deleted from said first recording medium.

4. The imaging device according to claim 1, wherein said first management information is management information managed by a file identifier for uniquely identifying each of the content files recorded in said first recording medium;
   and wherein said imaging device is controlled so as to
      detect, as said difference information,
         content files added to said first recording medium during at least a period from a point-in-time at which said past first management information was obtained to a point in time at which said present first management information was obtained,
      based on the results of comparing
         said file identifier entered in said present first management information with
         said file identifier entered in said past first management information, and
      record, in said second recording medium, content files added to said first recording medium.

5. The imaging device according to claim 1, said information processing device further comprising
   second management information storage means for storing second management information which manages each content file recorded in said second recording medium as
      a synchronizing content file recorded synchronously with said first recording medium or as
      an all-content saving content file not recorded synchronously with said first recording medium,
   wherein said first management information is management information managed by a file identifier for uniquely identifying each of the content files recorded in said first recording medium;
   and wherein said imaging device is controlled so as to
      detect, as said difference information,
         content files added to said first recording medium and content files deleted from said first recording medium during at least a period from a point-in-time at which said past first management information was obtained to a point in time at which said present first management information was obtained,
based on the results of comparing
said file identifier entered in said present first management information with
said file identifier entered in said past first management information,
record, in said second recording medium, content files added to said first recording medium,
update said second management information such that said content files are managed as said synchronizing content files, and
update said second management information such that said content files, recorded in said second recording medium corresponding to content files deleted from said first recording medium, are managed as said all-content saving files.

6. The imaging device according to claim 1, further comprising
recording point-in-time recording means;
wherein said first management information is management information managed by a file identifier for uniquely identifying each of the content files recorded in said first recording medium;
and wherein said imaging device is controlled so as to
detect, as said difference information,
content files added to said first recording medium and content files deleted from said first recording medium
during at least a period from a point-in-time at which said past first management information was obtained to a point in time at which said present first management information was obtained,
based on the results of comparing
said file identifier entered in said present first management information with
said file identifier entered in said past first management information,
record, in said second recording medium, content files added to said first recording medium, and
record, in said recording point-in-time recording means, said present first management information, correlated with said recording point in time;
and wherein, in the event that a predetermined instruction is performed for selecting said recording point-in-time, said imaging device is controlled so as to
detect, as said difference information,
content files added to said first recording medium and content files deleted from said first recording medium
during at least a period from said selected point-in-time to a point in time at which said present first management information was obtained,
based on the results of comparing
said file identifier entered in said present first management information with
said file identifier entered in said past first management information recorded in said recording point-in-time recording means correlated with said selected recording point-in-time,
delete, from said first recording medium, content files added to said first recording medium, and
record, in said first recording medium, content files recorded in said second recording medium corresponding to content files deleted from said first recording medium.

7. The imaging device according to claim 1, wherein said first management information includes a file identifier for uniquely identifying each of the content files recorded in said first recording medium, and also file-related information relating to these content files;
and wherein said imaging device is controlled so as to detect difference information relating to the storage state of the content files recorded in said first recording medium during at least a period from a point-in-time at which said past first management information was obtained to a point in time at which said present first management information was obtained, based on the results of comparing
said file identifier and said file-related information entered in said present first management information with
said file identifier and said file-related information entered in said past first management information.

8. An imaging device comprising:
a first recording medium for recording a content file which is image data which has been imaged;
management information storage means for storing first management information for managing the content file recorded in said first recording medium;
communication means for performing data communication with an information processing device including a second recording medium for recording a predetermined content file; and
control means for performing control for saving, in said second recording medium, said content file recorded in said first recording medium;
said control means effecting control so as to, in a state of being capable of data communication with said information processing device by said communication means,
detect difference information relating to the storage state of the content file recorded in said first recording medium, based on the results of comparing
present first management information which is first management information stored in said management information storage means, with
past first management information which is first management information which has been recorded before said present first management information and which is first management information of the point-in-time at which the content file recorded in said first recording medium was saved to said second recording medium, and
record, in said second recording medium, said content file recorded in said first recording medium, based on said detected difference information.

9. An imaging device comprising:
a first recording medium for recording a content file which is image data which has been imaged;
a management information storage unit for storing first management information for managing the content file recorded in said first recording medium; and
a communication unit for performing data communication with an information processing device including a second recording medium for recording a predetermined content file;
wherein, in a state of being capable of data communication with said information processing device by said communication unit, said imaging device is controlled so as to
detect difference information relating to the storage state of the content file recorded in said first recording medium, based on the results of comparing present first management information which is first management information stored in said management information storage unit, with past first management information which is first management information which has been recorded before said present first management information and which is first management information of the point-in-time at which the content file recorded in said first recording medium was saved to said second recording medium, and record, in said second recording medium, said content file recorded in said first recording medium, based on said detected difference information.

10. An imaging device comprising:

a first recording medium for recording a content file which is image data which has been imaged;

a management information storage unit for storing first management information for managing the content file recorded in said first recording medium;

a communication unit for performing data communication with an information processing device including a second recording medium for recording a predetermined content file; and a control unit for performing control for saving, in said second recording medium, said content file recorded in said first recording medium;

a said control unit effecting control so as to, in a state of being capable of data communication with said information processing device by said communication unit, detect difference information relating to the storage state of the content file recorded in said first recording medium, based on the results of comparing present first management information which is first management information stored in said management information storage unit, with past first management information which is first management information which has been recorded before said present first management information and which is first management information of the point-in-time at which the content file recorded in said first recording medium was saved to said second recording medium, and record, in said second recording medium, said content file recorded in said first recording medium, based on said detected difference information.

* * * * *